United States Patent
Oshima et al.

(10) Patent No.: US 10,543,764 B2
(45) Date of Patent: Jan. 28, 2020

(54) VEHICLE SEAT AND STIFFNESS SETTING METHOD FOR VEHICLE SEAT

(75) Inventors: Rumiko Oshima, Novi, MI (US);
Shigeki Ishiwata, Mitaka (JP);
Masahiro Egami, Hadano (JP);
Akinari Hirao, Yokohama (JP);
Atsushi Takamatsu, Chigasaki (JP);
Takayoshi Nagano, Sagamihara (JP);
Mitsuhito Ito, Chigasaki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 88 days.

(21) Appl. No.: 13/822,247

(22) PCT Filed: Sep. 30, 2011

(86) PCT No.: PCT/JP2011/072591
§ 371 (c)(1),
(2), (4) Date: Mar. 11, 2013

(87) PCT Pub. No.: WO2012/043807
PCT Pub. Date: Apr. 5, 2012

(65) Prior Publication Data
US 2013/0175838 A1  Jul. 11, 2013

(30) Foreign Application Priority Data

Oct. 1, 2010 (JP) .................. 2010-223340
Oct. 1, 2010 (JP) .................. 2010-223341
Oct. 1, 2010 (JP) .................. 2010-223342
Mar. 28, 2011 (JP) .................. 2011-069127

(51) Int. Cl.
*B60N 2/64* (2006.01)

(52) U.S. Cl.
CPC .................. *B60N 2/64* (2013.01)

(58) Field of Classification Search
USPC ............... 297/216.14, 354.11, 452.37
See application file for complete search history.

(56) References Cited

U.S. PATENT DOCUMENTS 3,070,402 A * 12/1962 Stanton ............... A47C 31/02
297/452.21
3,675,970 A * 7/1972 Bereday ............... 297/452.55
4,291,916 A * 9/1981 Chardon ............... 297/367 R
(Continued)

FOREIGN PATENT DOCUMENTS

| CN | 1433323 A | 7/2003 |
|---|---|---|
| CN | 1592593 A | 3/2005 |

(Continued)

OTHER PUBLICATIONS

Chinese Office Action dated Dec. 1, 2014, (with English Translation) 19 pages.

(Continued)

*Primary Examiner* — David E Allred
(74) *Attorney, Agent, or Firm* — Foley & Lardner LLP

(57) ABSTRACT

A vehicle seat (1) includes a seat cushion (2) and a seat back (3), in which the seat cushion (2) is given a stiffness distribution in a front-rear direction in such a way that a front part of the seat cushion is provided with a low stiffness region (PSc) which is more flexible than a rear part of the seat cushion being a high stiffness region (PHc).

29 Claims, 33 Drawing Sheets

(56) References Cited

U.S. PATENT DOCUMENTS

| | | | | |
|---|---|---|---|---|
| 4,521,053 A * | 6/1985 | de Boer | ............... | A47C 1/022 |
| | | | | 297/291 |
| 4,522,447 A * | 6/1985 | Snyder et al. | ........... | 297/452.27 |
| 4,653,806 A * | 3/1987 | Willi | ................. | A47C 1/03255 |
| | | | | 297/300.5 |
| 4,673,216 A * | 6/1987 | Alfer | ..................... | A47C 7/022 |
| | | | | 297/423.1 |
| 4,848,837 A * | 7/1989 | Volkle | ................... | A47C 1/031 |
| | | | | 297/300.1 |
| 4,940,284 A * | 7/1990 | Nagasaka | ............... | B60N 2/66 |
| | | | | 297/284.4 |
| 5,297,848 A * | 3/1994 | Grinnell | ................ | A47C 7/425 |
| | | | | 297/219.1 |
| 5,439,270 A * | 8/1995 | Owen | ..................... | 297/452.27 |
| 5,544,942 A * | 8/1996 | Vu Khac et al. | ........ | 297/452.37 |
| 5,558,399 A * | 9/1996 | Serber | ................. | B60N 2/4221 |
| | | | | 297/216.1 |
| 5,666,672 A * | 9/1997 | Birsel | ....................... | E03D 9/08 |
| | | | | 4/236 |
| 6,022,074 A * | 2/2000 | Swedenklef | ........ | B60N 2/2222 |
| | | | | 297/216.13 |
| 6,419,313 B1 | 7/2002 | Newman | | |
| 6,478,379 B1 * | 11/2002 | Ambasz | ................... | 297/354.11 |
| 6,488,335 B1 * | 12/2002 | Cioncada | .................. | 297/300.2 |
| 6,869,142 B2 * | 3/2005 | Heidmann | ......... | A47C 1/03255 |
| | | | | 297/300.1 |
| 6,871,913 B2 * | 3/2005 | Malsch et al. | ................. | 297/410 |
| 7,134,716 B2 * | 11/2006 | Wieclawski | ............. | 297/216.12 |
| 7,475,943 B1 * | 1/2009 | Huang | ....................... | 297/284.4 |
| 7,585,030 B2 * | 9/2009 | Galbreath et al. | ........ | 297/452.27 |
| 7,971,939 B2 | 7/2011 | Fujita et al. | | |
| 8,141,957 B2 * | 3/2012 | McClung et al. | ........ | 297/452.27 |
| 8,287,047 B2 | 10/2012 | Fujita | | |
| 8,348,339 B2 | 1/2013 | Onuma et al. | | |
| 8,911,014 B2 * | 12/2014 | Nitsuma | .............. | B60N 2/4228 |
| | | | | 297/216.13 |
| 9,211,819 B2 * | 12/2015 | Nitsuma | .............. | B60N 2/4228 |
| 9,381,840 B2 * | 7/2016 | Tobata | .................... | B60N 2/16 |
| 2002/0135219 A1 * | 9/2002 | Rogers | ................. | A47D 15/006 |
| | | | | 297/467 |
| 2004/0051358 A1 * | 3/2004 | Bodnar | ..................... | A47C 7/28 |
| | | | | 297/300.1 |
| 2005/0017390 A1 | 1/2005 | Sugiyama et al. | | |
| 2005/0093352 A1 * | 5/2005 | Yasuda | ................ | B60N 2/2222 |
| | | | | 297/284.1 |
| 2005/0140193 A1 * | 6/2005 | Skelly | ..................... | A47C 7/503 |
| | | | | 297/284.9 |
| 2005/0151405 A1 * | 7/2005 | Dowty | ..................... | B60N 2/62 |
| | | | | 297/317 |
| 2005/0184571 A1 * | 8/2005 | Dowty | ..................... | B60N 2/449 |
| | | | | 297/331 |
| 2006/0055214 A1 * | 3/2006 | Serber | ................... | B60N 2/0745 |
| | | | | 297/216.1 |
| 2006/0103204 A1 * | 5/2006 | Walker | ................. | B60N 2/6671 |
| | | | | 297/284.4 |
| 2006/0169863 A1 | 8/2006 | Ohtsubo et al. | | |
| 2007/0108810 A1 * | 5/2007 | Nishimoto | ............... | A47D 15/006 |
| | | | | 297/219.12 |
| 2008/0012407 A1 * | 1/2008 | Ebe | ................ | 297/229 |
| 2008/0092907 A1 * | 4/2008 | Walker | .................. | A47C 7/021 |
| | | | | 128/845 |
| 2009/0051206 A1 * | 2/2009 | Fujita | .................... | B60N 2/7094 |
| | | | | 297/452.49 |
| 2010/0140998 A1 * | 6/2010 | Walker | ................... | A47C 7/022 |
| | | | | 297/284.1 |
| 2011/0148157 A1 * | 6/2011 | Braun-Fischer | ..... | B60N 2/4228 |
| | | | | 297/216.13 |
| 2011/0272978 A1 * | 11/2011 | Nitsuma | .................. | 297/216.12 |
| 2012/0001465 A1 * | 1/2012 | Rinne | ...................... | A47C 3/20 |
| | | | | 297/284.3 |
| 2012/0098305 A1 * | 4/2012 | Yamaki | ................ | B60N 2/4235 |
| | | | | 297/216.14 |
| 2014/0070582 A1 * | 3/2014 | Mastio | ................ | A47C 1/033 |
| | | | | 297/284.2 |
| 2014/0077560 A1 * | 3/2014 | Hirao | ....................... | 297/354.11 |
| 2014/0183924 A1 * | 7/2014 | Cvek | ..................... | A47C 9/002 |
| | | | | 297/452.18 |
| 2014/0265501 A1 * | 9/2014 | Line | .................... | B60N 2/0232 |
| | | | | 297/341 |
| 2014/0306504 A1 * | 10/2014 | Boy | ........................ | B60N 2/62 |
| | | | | 297/313 |
| 2015/0102644 A1 * | 4/2015 | Rajasingham | ....... | B60N 2/2884 |
| | | | | 297/216.11 |
| 2015/0150379 A1 * | 6/2015 | Muraguchi | .............. | A47C 7/40 |
| | | | | 297/445.1 |

FOREIGN PATENT DOCUMENTS

| | | | | |
|---|---|---|---|---|
| DE | 10 2005 059 991 A1 | 12/2006 | | |
| EP | 157105 A2 * | 10/1985 | ............... | B60N 1/00 |
| EP | 1 832 204 A1 | 9/2007 | | |
| EP | 1 905 404 A2 | 4/2008 | | |
| FR | 2904797 A1 | 2/2008 | | |
| JP | 59-066636 U | 5/1984 | | |
| JP | 61-029635 U | 2/1986 | | |
| JP | 04-237646 A | 8/1992 | | |
| JP | 06-005551 U | 1/1994 | | |
| JP | 07-034753 U | 6/1995 | | |
| JP | 07257250 A * | 10/1995 | | |
| JP | 08-080771 A | 3/1996 | | |
| JP | 10-033297 A | 2/1998 | | |
| JP | 11-253267 A | 9/1999 | | |
| JP | 2000-037266 A | 2/2000 | | |
| JP | 3012765 B2 * | 2/2000 | ............. | A47C 7/405 |
| JP | 2001-025418 A | 1/2001 | | |
| JP | 2001-037594 A | 2/2001 | | |
| JP | 2002-300936 A1 | 10/2002 | | |
| JP | 2003-127728 A | 5/2003 | | |
| JP | 3097837 U | 2/2004 | | |
| JP | 2005-287935 A | 10/2005 | | |
| JP | 3719186 B2 | 11/2005 | | |
| JP | 2006-218882 A | 8/2006 | | |
| JP | 4144073 B2 | 9/2008 | | |
| JP | 2009-165588 A | 7/2009 | | |
| JP | 2009-292426 A | 12/2009 | | |
| JP | 2010-046409 A | 3/2010 | | |
| JP | 2010-088702 A | 4/2010 | | |
| WO | WO-2006/037970 A1 | 4/2006 | | |
| WO | WO 2007/077699 A1 | 7/2007 | | |

OTHER PUBLICATIONS

M. P. Reed et al. "Design and Development of the Aspect Manikin", SAE Technical Paper Series, International Congress and Exposition, Detroit, Michigan, 1999-01-0963; Mar. 1-4, 1999; pp. 1-18.

SAE International Surface Vehicle Recommended Practice, "(R)Human Physical Dimension", Issued Jun. 6, 1962; superseding J833 May 1989; SAE J833 cancelled May 2003; pp. 1-4.

SAE International, Surface Vehicle Standard, "H-Point Machine (HPM-||) Specifications and Procedure for H-Point Determination—Auditing Vehicle Seats", Issued Jun. 2002, revised Jan. 2010; J4002 Jan. 2010, pp. 1-57.

* cited by examiner

FIG. 4
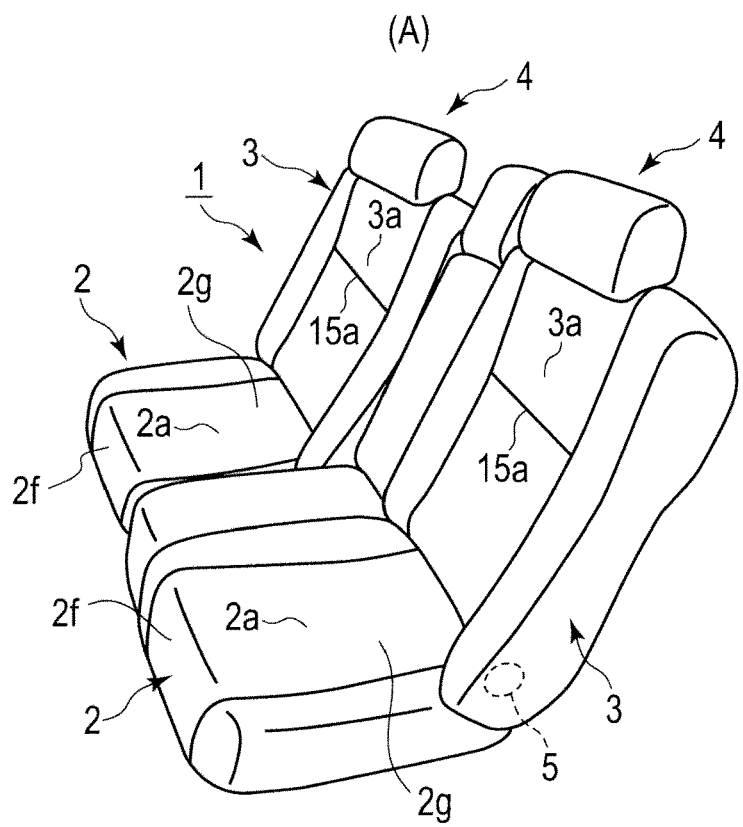
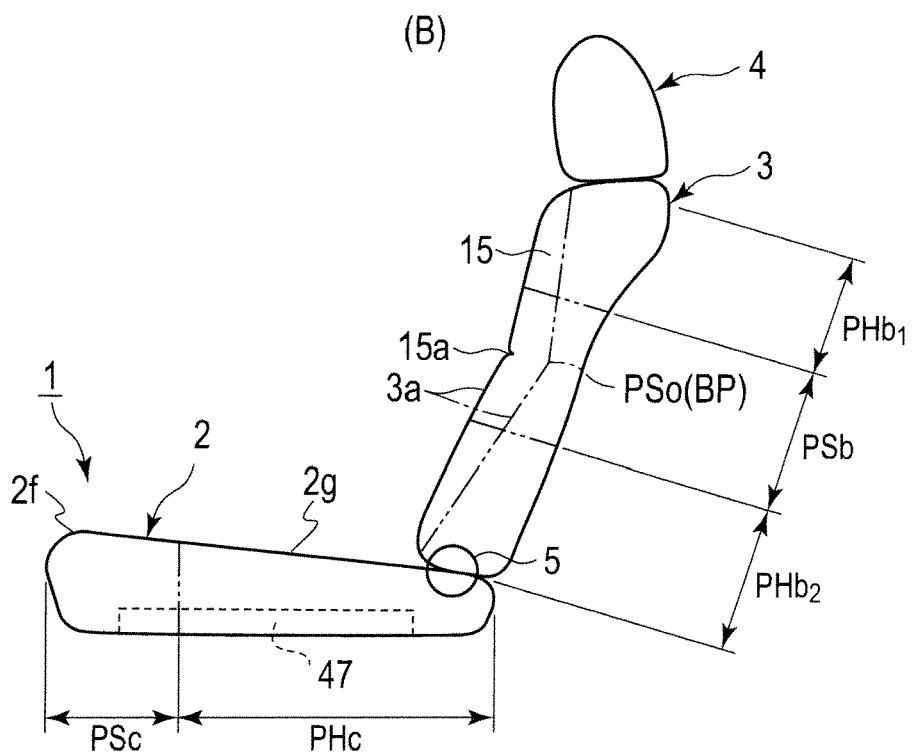

FIG. 6
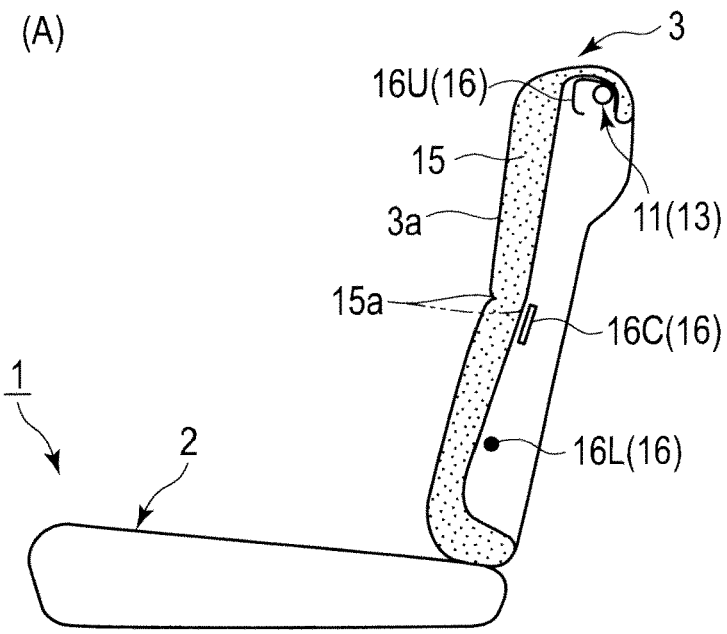
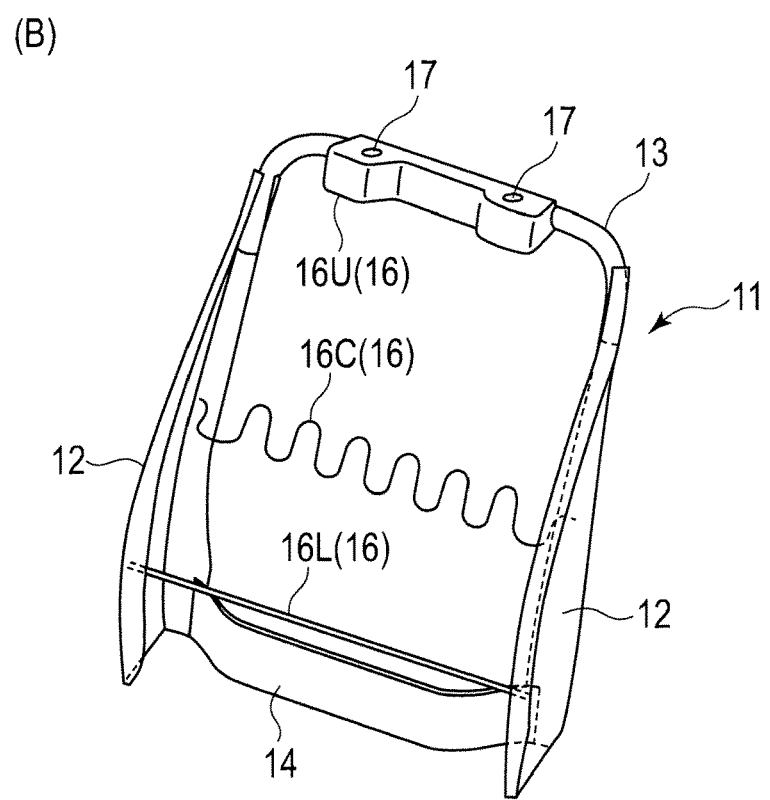

FIG. 7
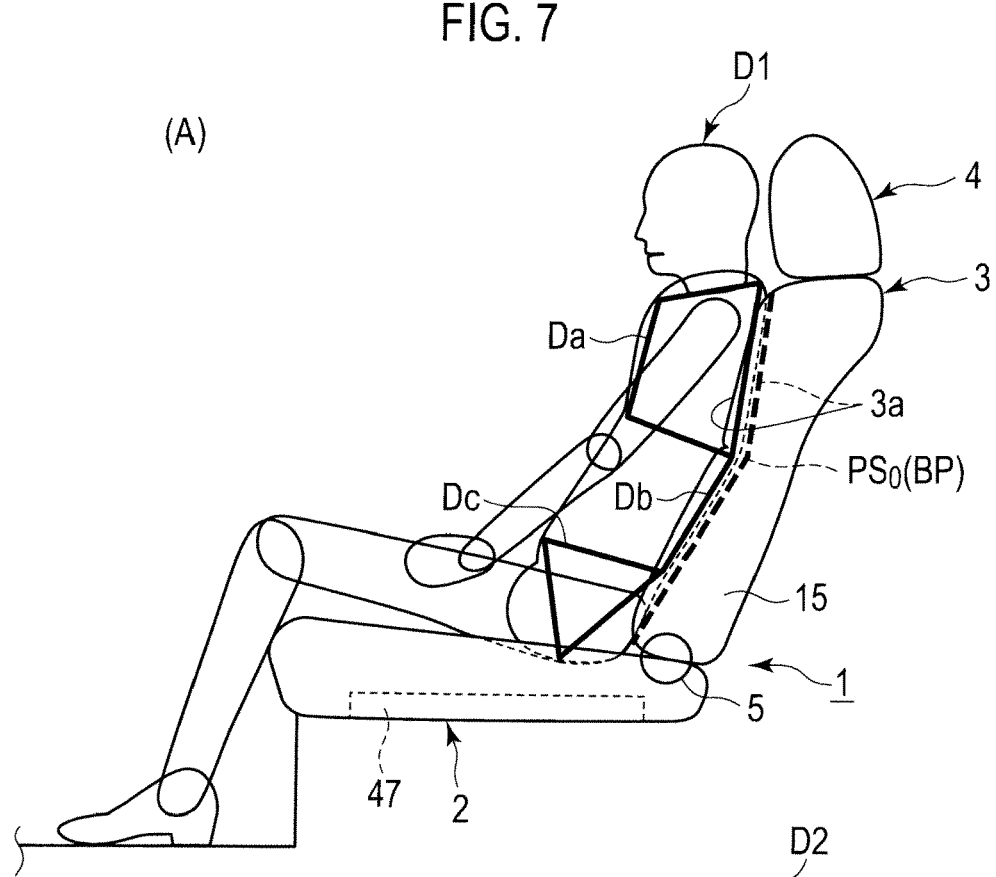
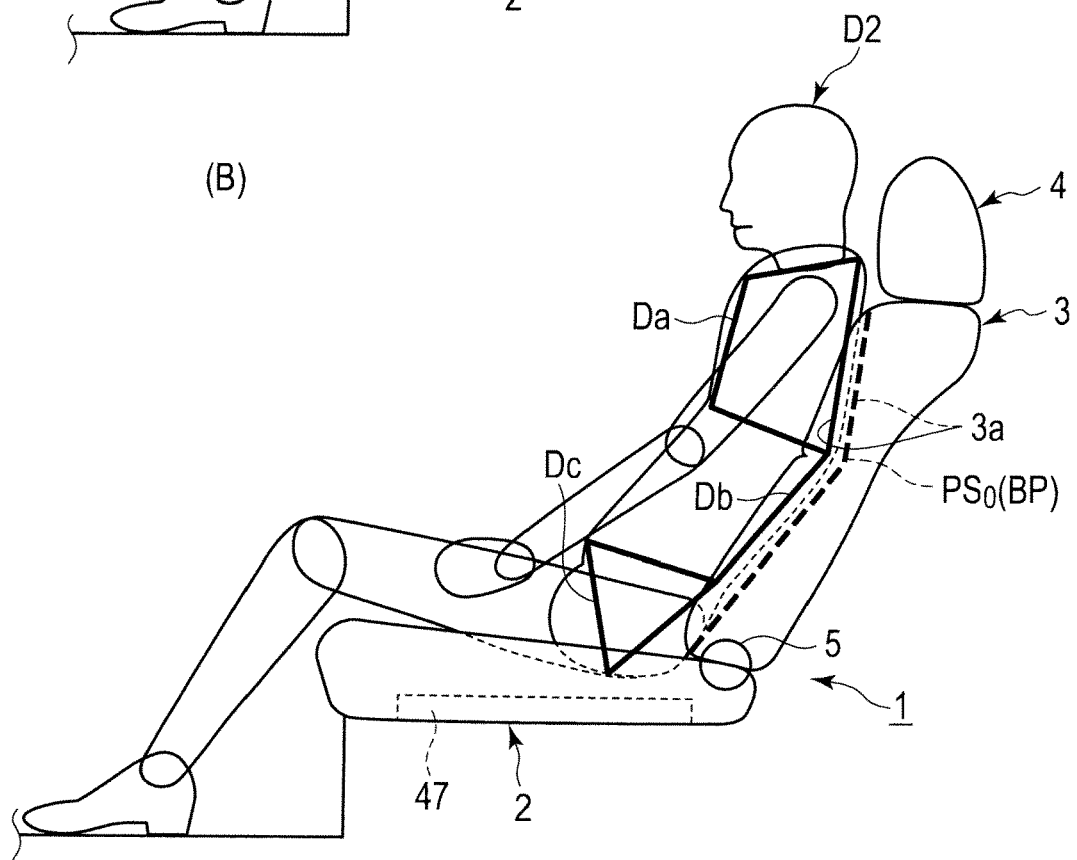

FIG. 8
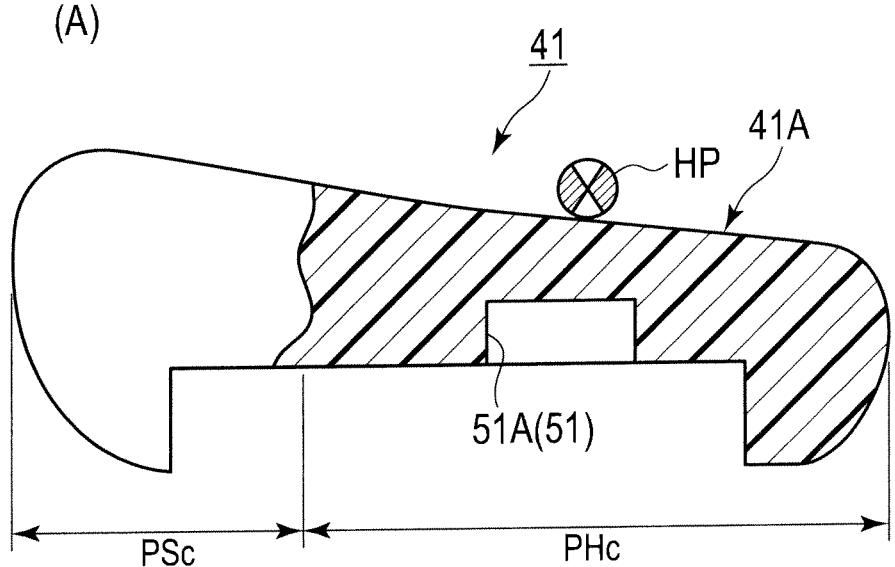
(A)
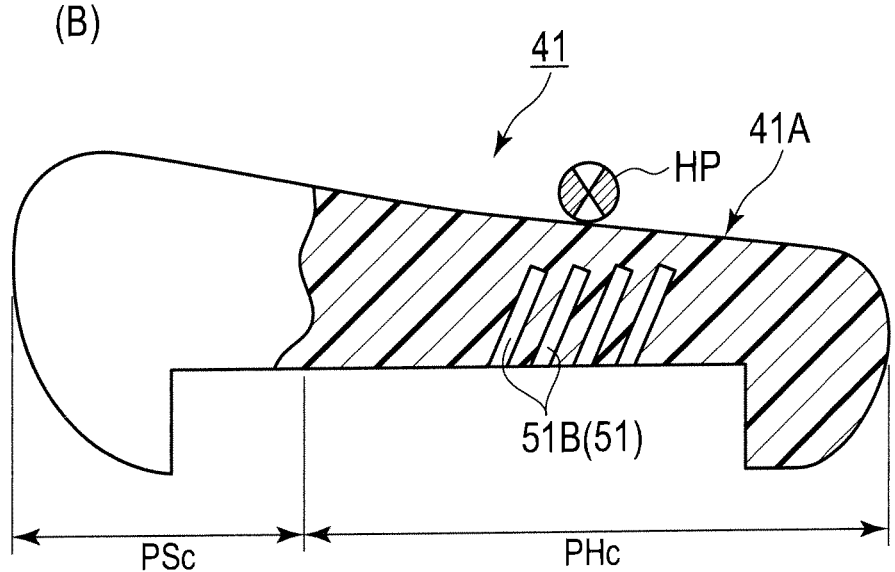
(B)

FIG. 9
(A)
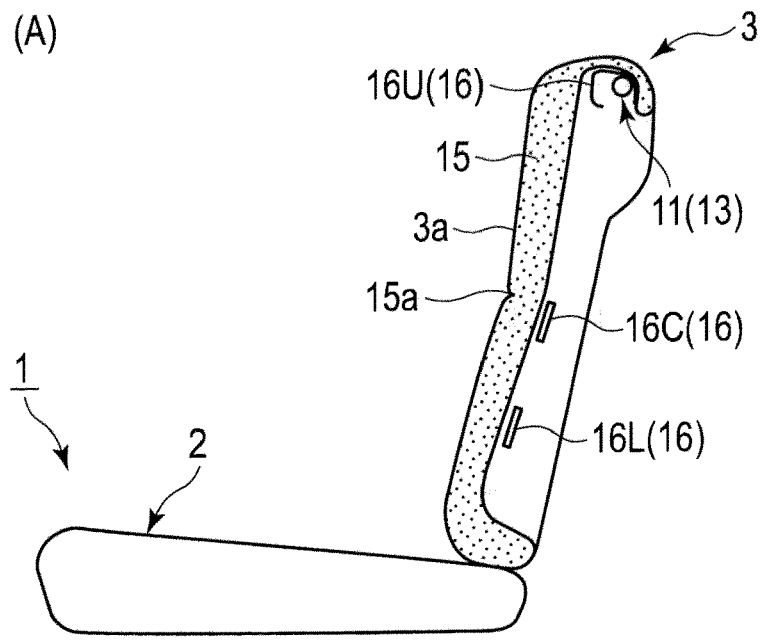
(B)
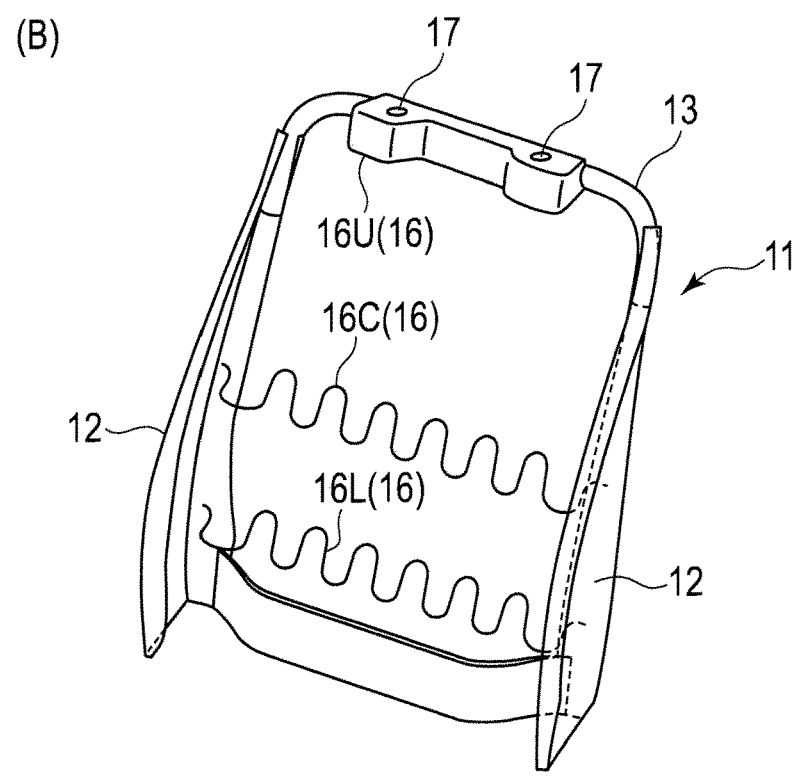

FIG. 10
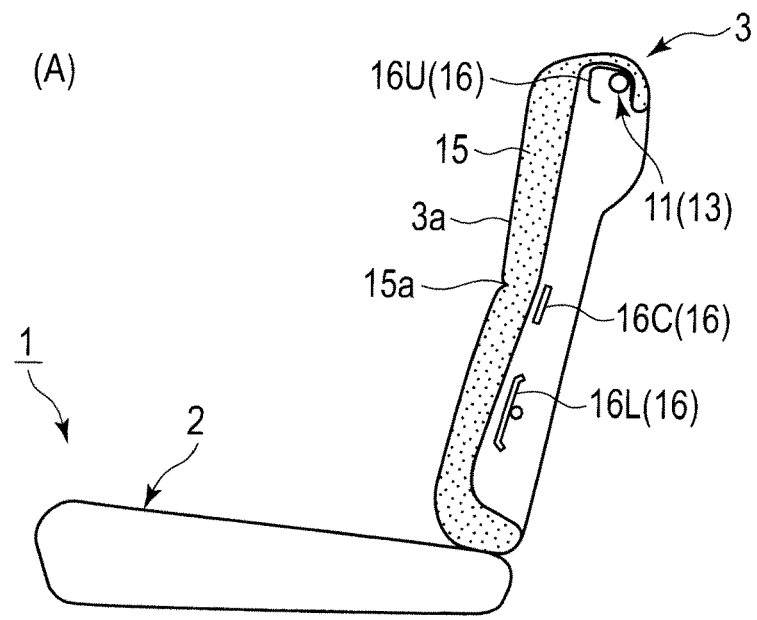
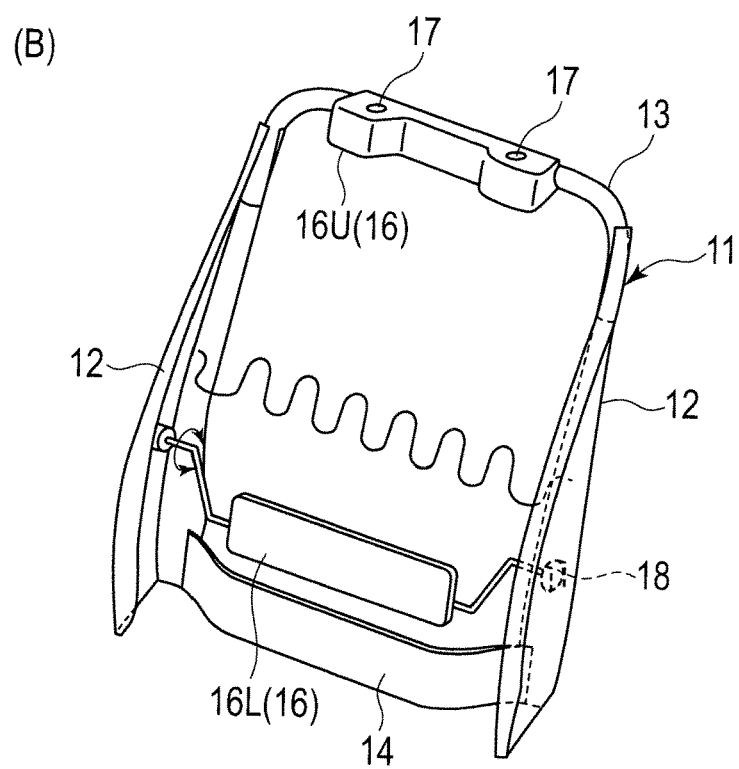

FIG. 11
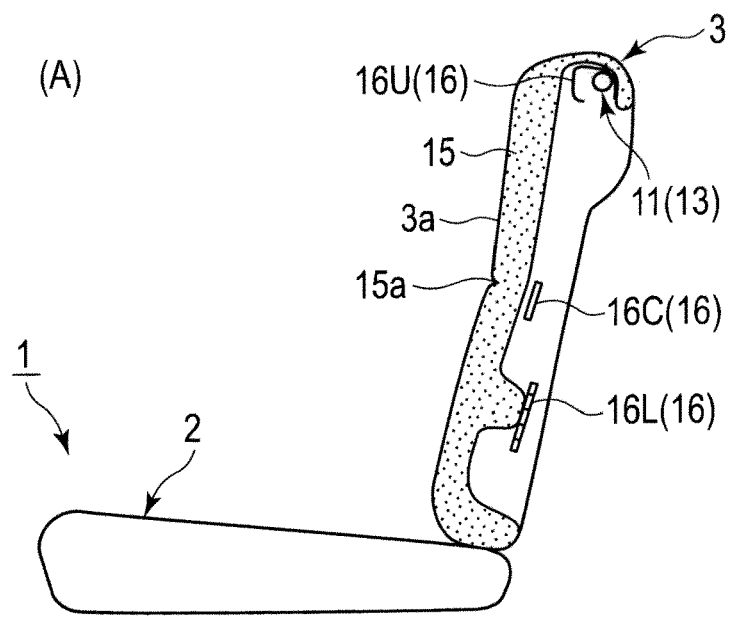
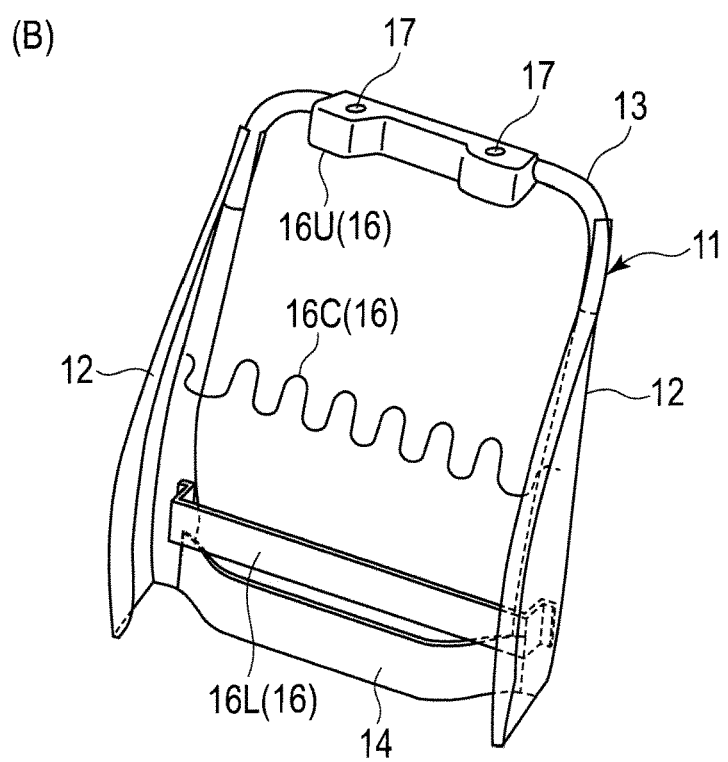

FIG. 28
(A)
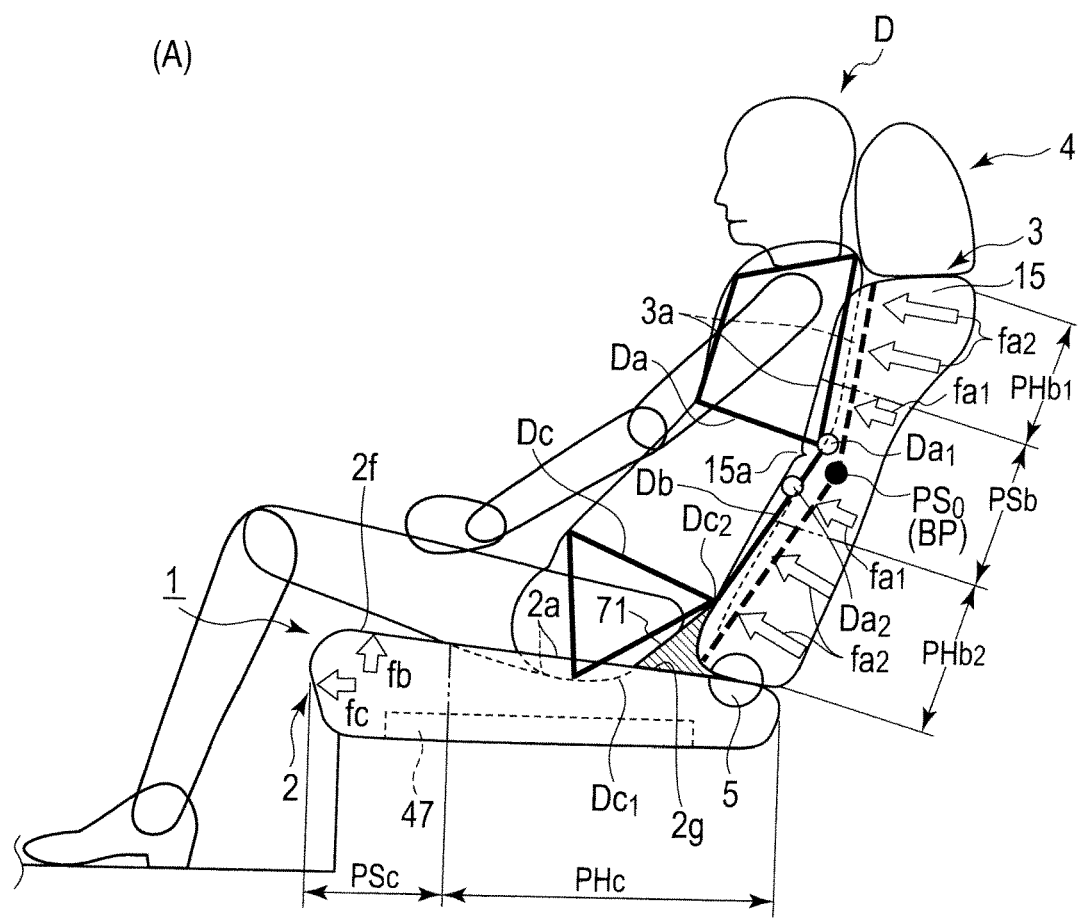
(B)
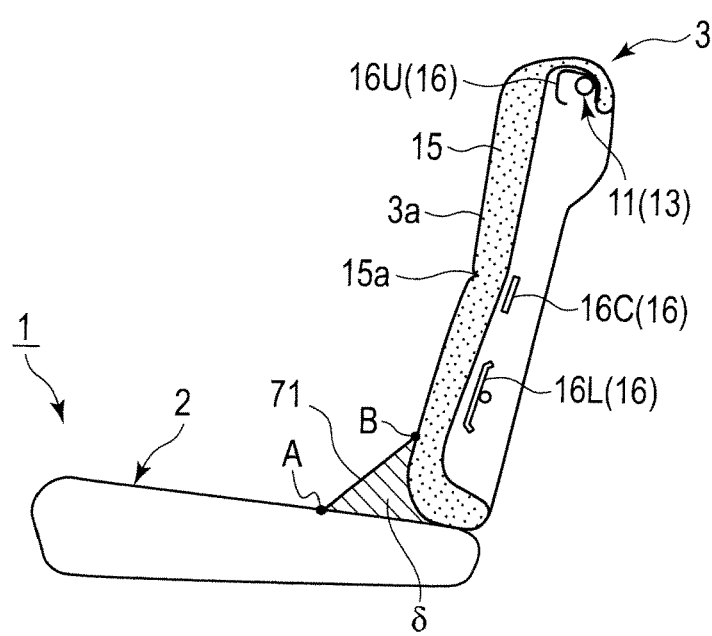

FIG. 29
(A)
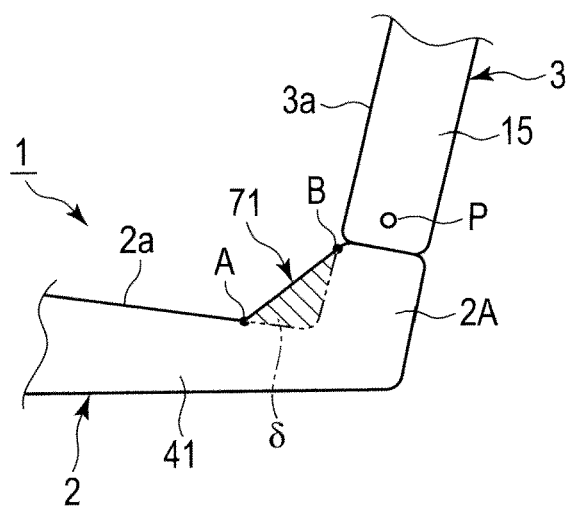
(B)
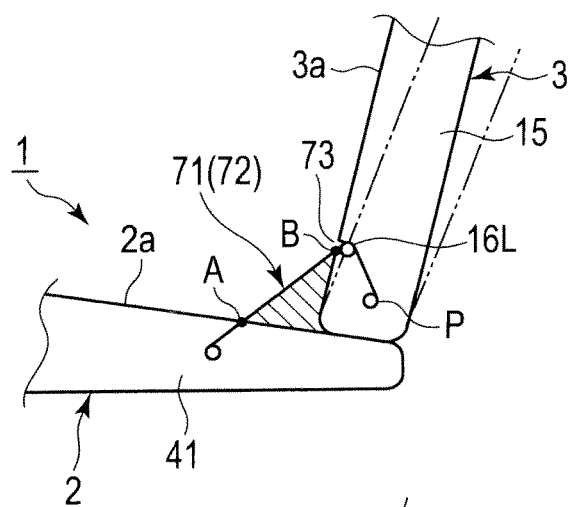
(C)
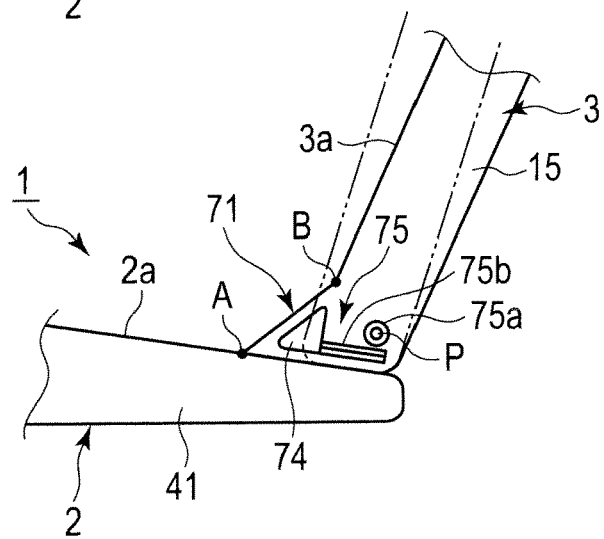

FIG. 37
(A)
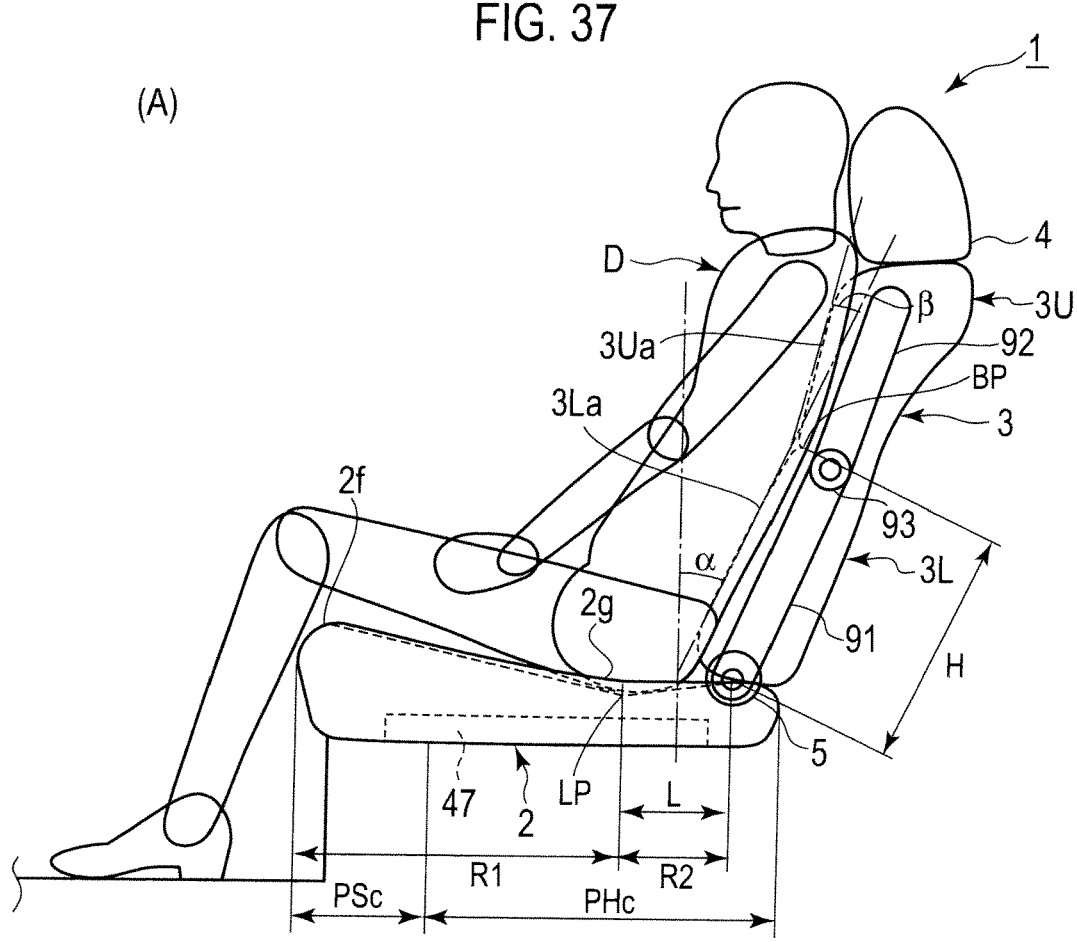
(B)
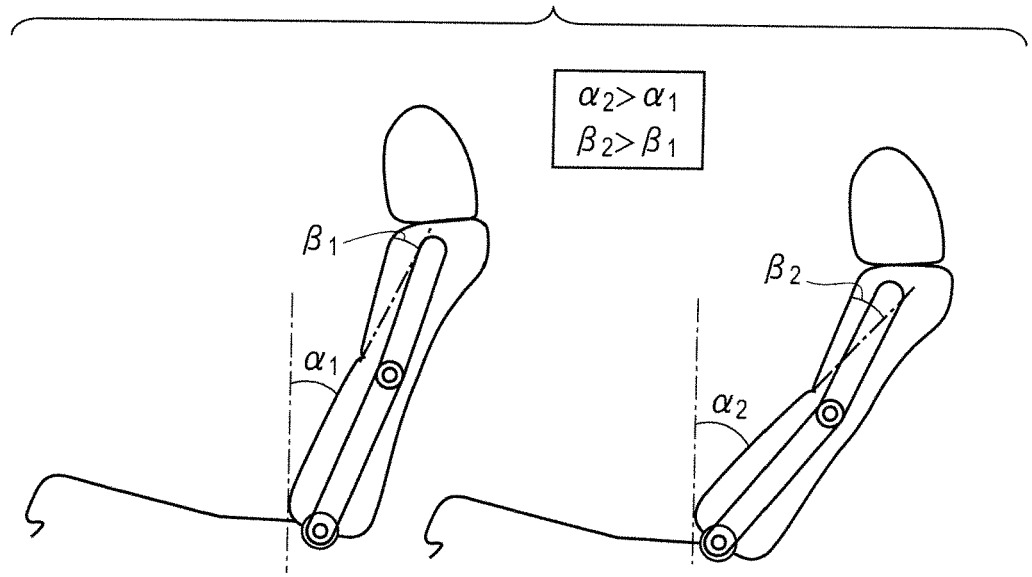
$\alpha_2 > \alpha_1$
$\beta_2 > \beta_1$

VEHICLE SEAT AND STIFFNESS SETTING METHOD FOR VEHICLE SEAT

TECHNICAL FIELD

The present invention relates to a vehicle seat and a stiffness setting method for a vehicle seat.

BACKGROUND ART

Patent Document 1 discloses a technique intended to improve vibration absorbing characteristics. In this technique, a seat cushion is designed such that a first human body support portion, which comes below the ischial tuberosity of a human body, has a smaller dynamic spring constant than a second human body support portion, which comes below the thighs, thereby taking a vibration removal action by using the second human body support portion as a motion supporting point. In addition, Patent Document 2 discloses a similar technique.

PRIOR ART DOCUMENT

Patent Document

Patent Document 1: WO2007/077699
Patent Document 2: JP-A No. 2005-287935

SUMMARY OF INVENTION

Technical Problem

In the techniques of Patent Documents 1 and 2, however, the spring constant on the front side of the seat cushion is set large, so that an occupant feels high pressure on the posterior lower legs and the posterior knees, and therefore cannot obtain seating comfort.

An objective of the present invention is to provide a vehicle seat capable of providing seating comfort to an occupant by reducing a feeling of pressure on the occupant.

Solution to Problem

A first aspect of the present invention is a vehicle seat including a seat cushion and a seat back. The seat cushion is given a stiffness distribution in a front-rear direction in such a way that a front part of the seat cushion is provide with a low stiffness region which is more flexible than a rear part of the seat cushion being a high stiffness region.

A second aspect of the present invention is a stiffness setting method for a vehicle seat including a seat cushion and a seat back, the method comprising giving the seat cushion a stiffness distribution in a front-rear direction in such a way that a front part of the seat cushion is provided with a low stiffness region which is more flexible than a rear part of the seat cushion being a high stiffness region.

Part (A) of FIG. 4 is a perspective view and part (B) of FIG. 4 is a side view showing a vehicle seat for rear seat according to a second embodiment of the present invention.

Figure 5:
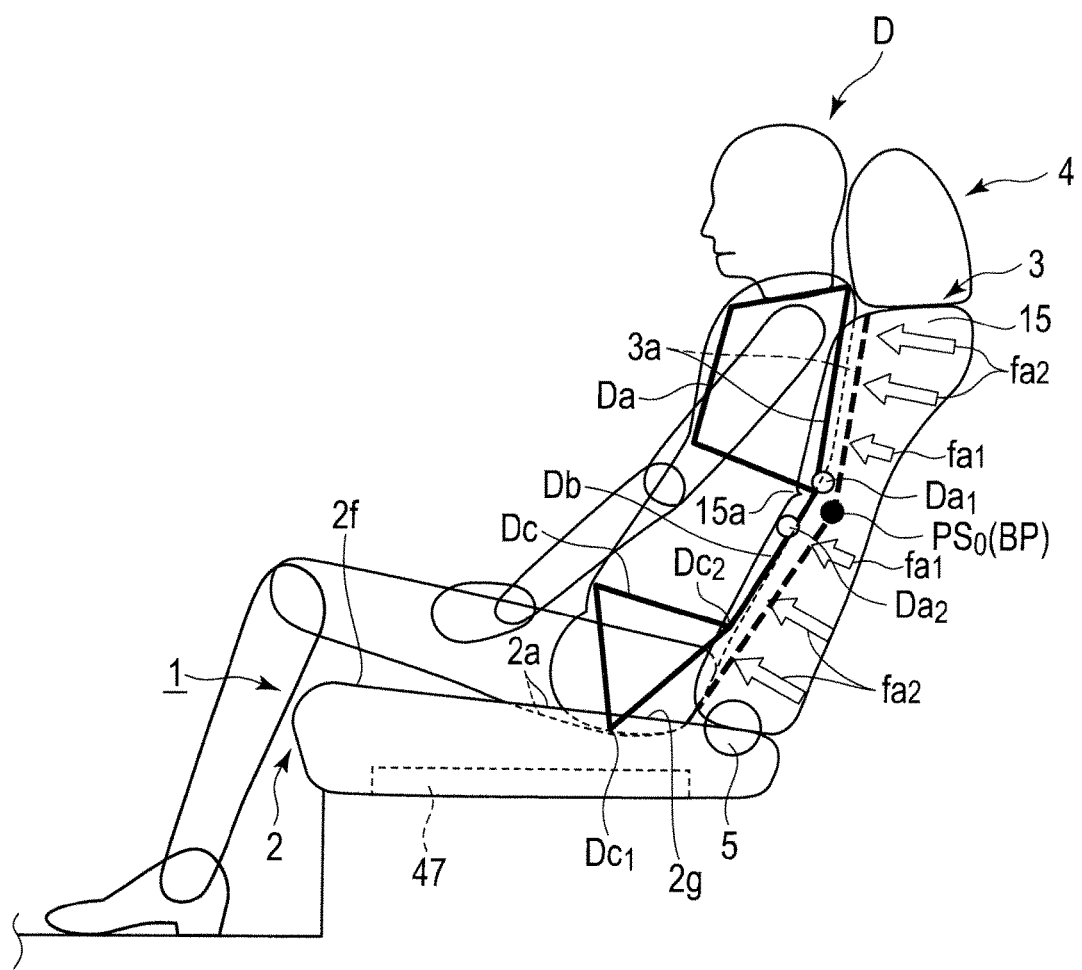

FIG. 5 is a view showing functions of the vehicle seat according to the second embodiment.

Parts (A) and (B) of FIG. 6 are views showing a seat back according to the second embodiment, part (A) of FIG. 6 showing a cross-sectional view of the seat back and part (B) of FIG. 6 showing a perspective view of a seat back frame.

Parts (A) and (B) of FIG. 7 are side views showing a modified aspect of the seat back bent in the middle according to the second embodiment, part (A) of FIG. 7 showing the case of a small body size and part (B) of FIG. 7 showing the case of a large body size.

Parts (A) and (B) of FIG. 8 are views showing examples of hardness adjustment at a hip point in the seat cushion according to the second embodiment.

Parts (A) and (B) of FIG. 9 are views showing a seat back according to a first modified example of the second embodiment, part (A) of FIG. 9 showing a cross-sectional view of the seat back and part (B) of FIG. 9 showing a perspective view of a seat back frame.

Parts (A) and (B) of FIG. 10 are views showing a seat back according to a second modified example of the second embodiment, part (A) of FIG. 10 showing a cross-sectional view of the seat back and part (B) of FIG. 10 showing a perspective view of a seat back frame.

Parts (A) and (B) of FIG. 11 are views showing a seat back according to a third modified example of the second embodiment, part (A) of FIG. 11 showing a cross-sectional view of the seat back and part (B) of FIG. 11 showing a perspective view of a seat back frame.

Figure 12:
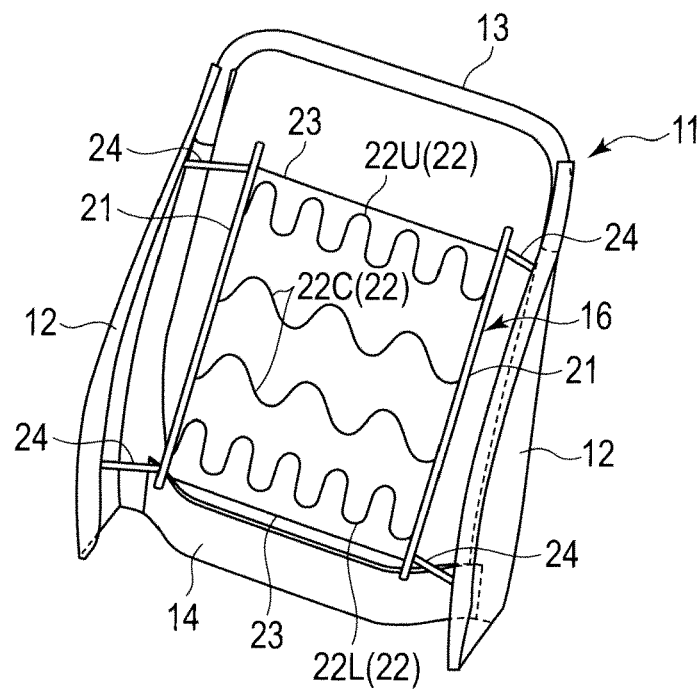

FIG. 12 is a perspective view showing a seat back frame of a seat back according to a fourth modified example of the second embodiment.

Figure 13:
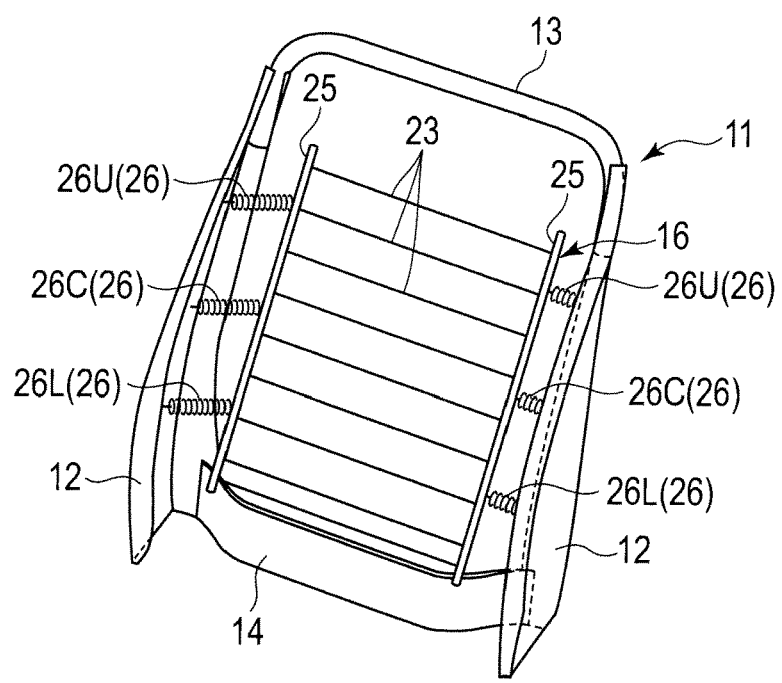

FIG. 13 is a perspective view showing a seat back frame of a seat back according to a fifth modified example of the second embodiment.

Figure 14:
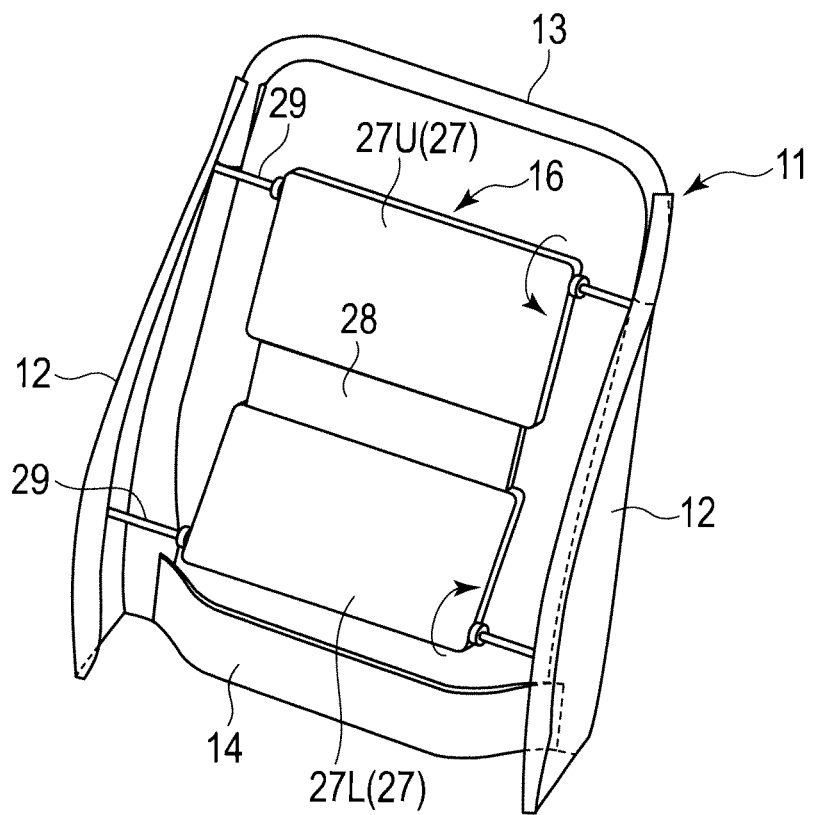

FIG. 14 is a perspective view showing a seat back frame of a seat back according to a sixth modified example of the second embodiment.

Figure 15:
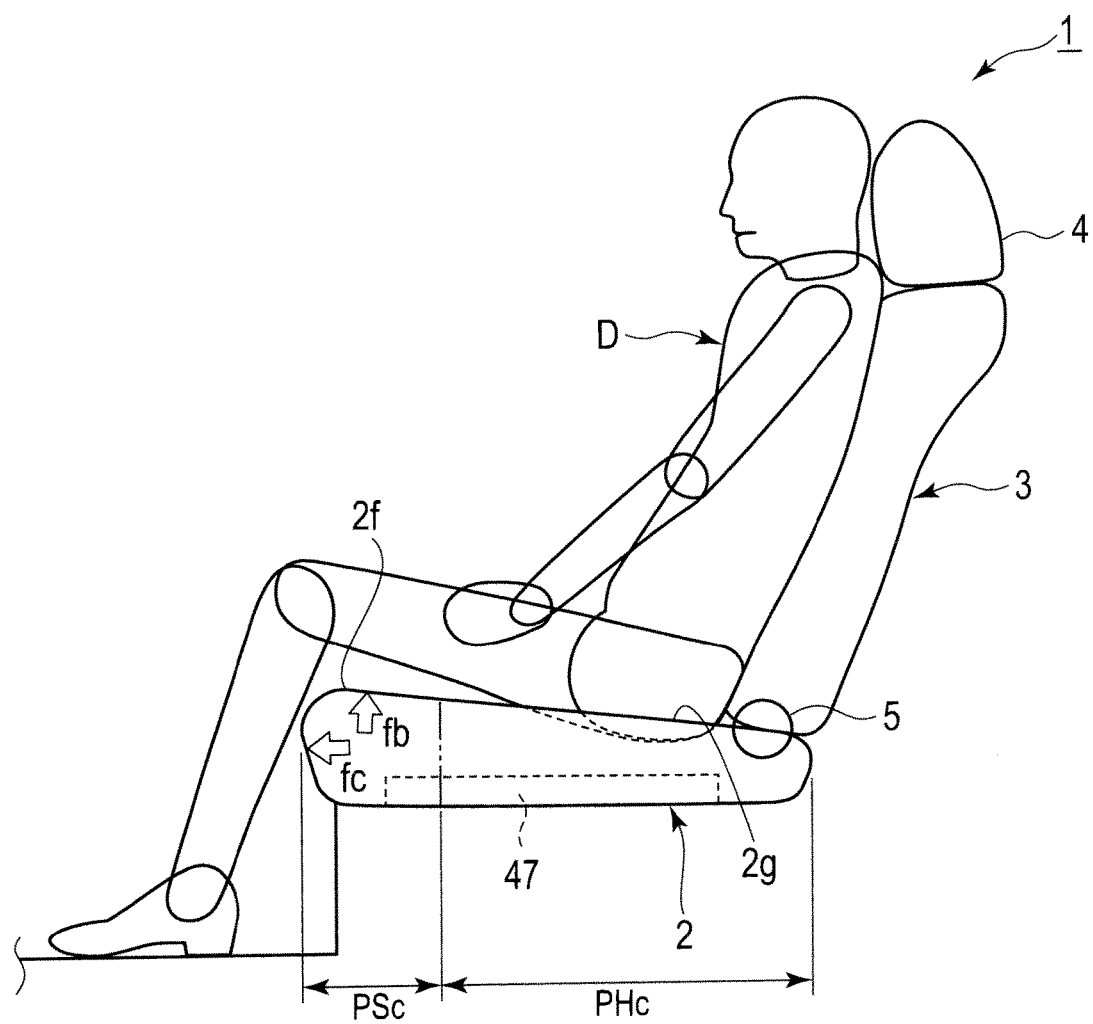

FIG. 15 is a side view showing a vehicle seat for rear seat according to a third embodiment of the present invention.

Figure 16:
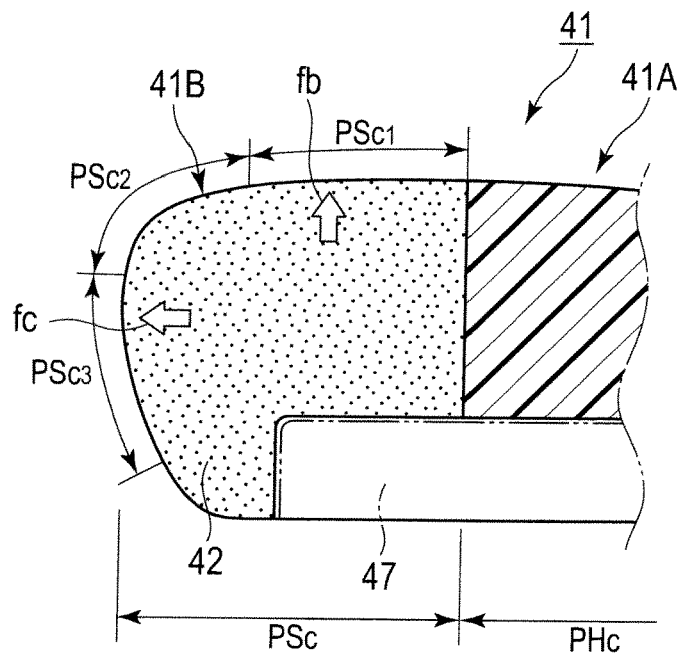

FIG. 16 is a cross-sectional view showing a front part of a seat cushion according to the third embodiment.

Figure 17:
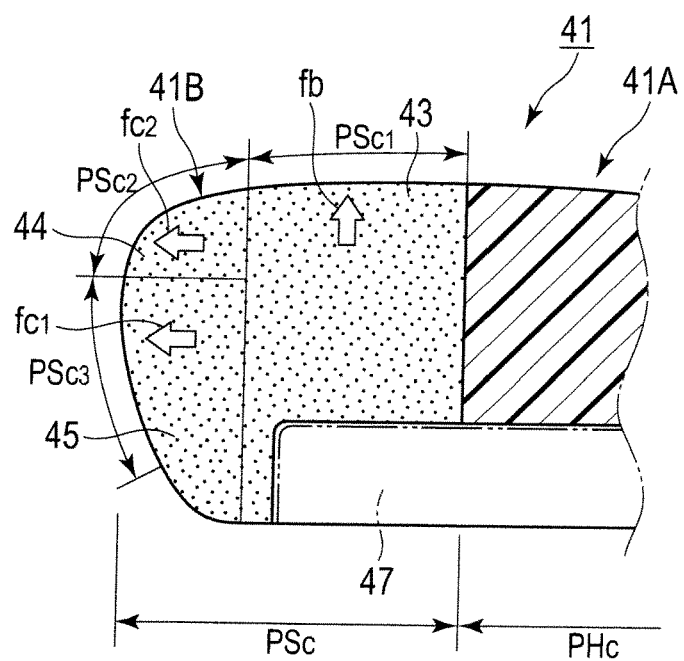

FIG. 17 is a cross-sectional view showing a front part of a seat cushion according to a first modified example of the third embodiment.

Figure 18:
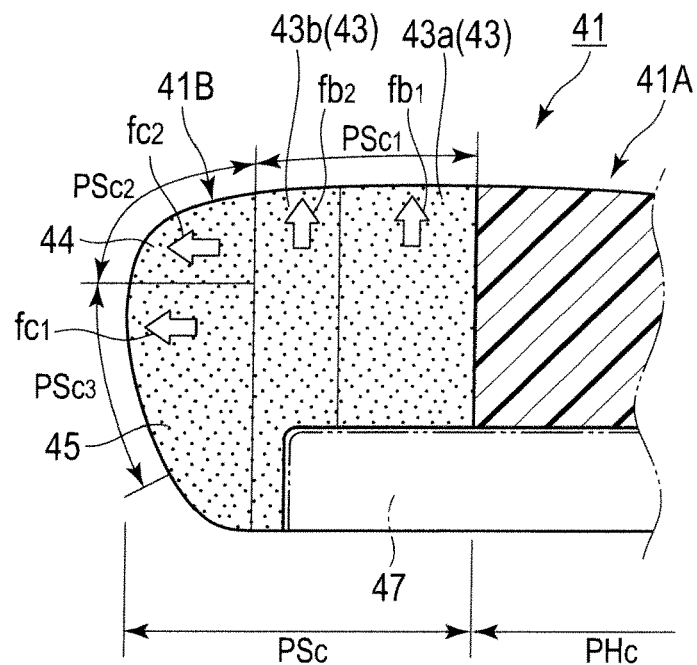

FIG. 18 is a cross-sectional view showing a front part of a seat cushion according to a second modified example of the third embodiment.

Figure 19:
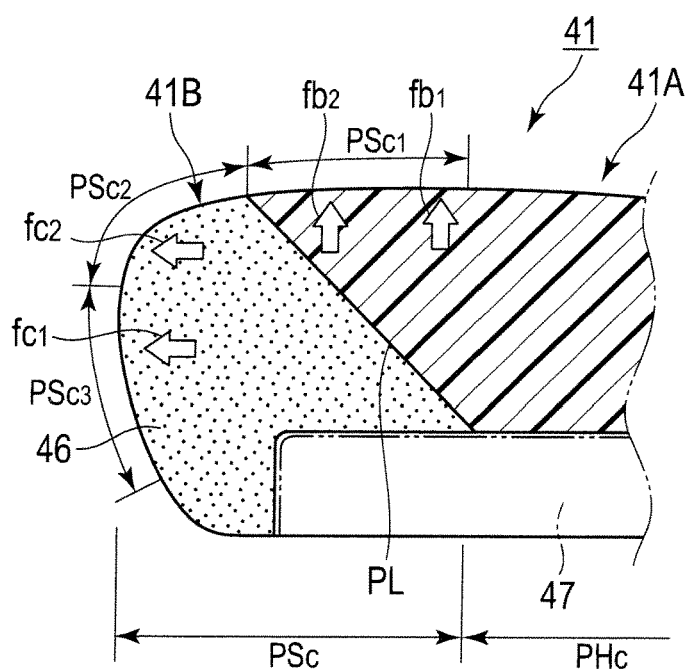

FIG. 19 is a cross-sectional view showing a front part of a seat cushion according to a third modified example of the third embodiment.

Figure 20:
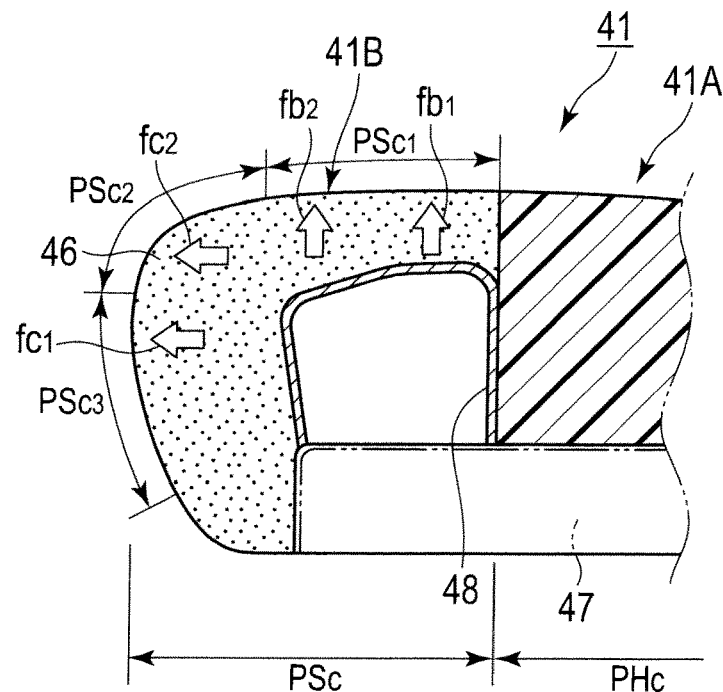

FIG. 20 is a cross-sectional view showing a front part of a seat cushion according to a fourth modified example of the third embodiment.

Figure 21:
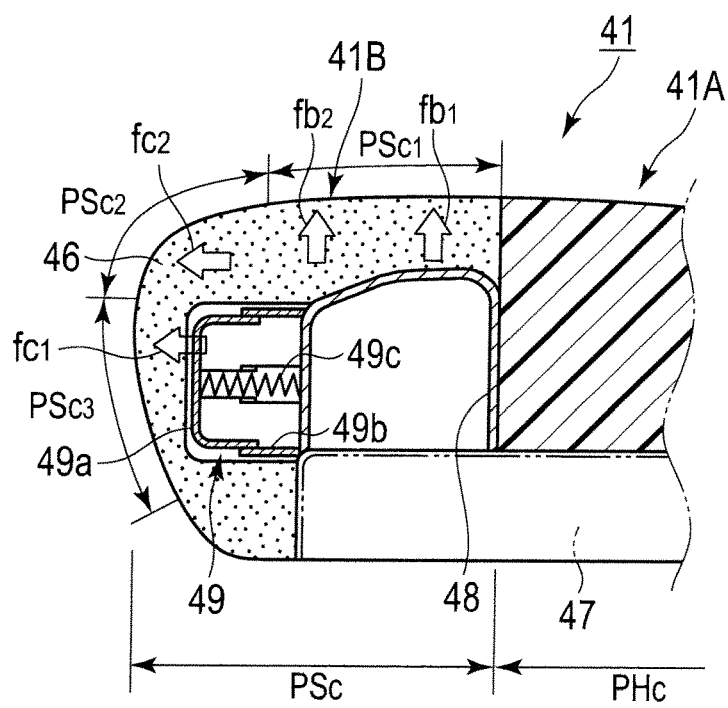

FIG. 21 is a cross-sectional view showing a front part of a seat cushion according to a fifth modified example of the third embodiment.

Figure 22:
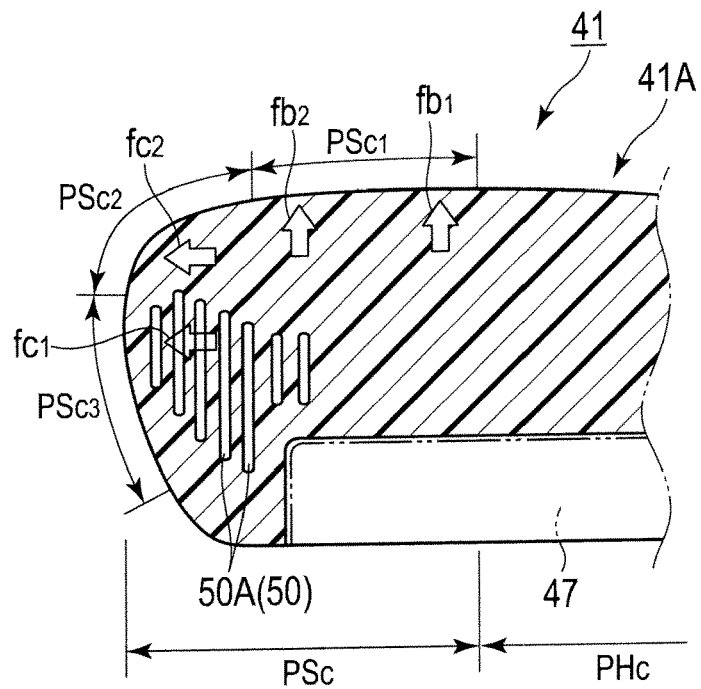

FIG. 22 is a cross-sectional view showing a front part of a seat cushion according to a sixth modified example of the third embodiment.

Figure 23:
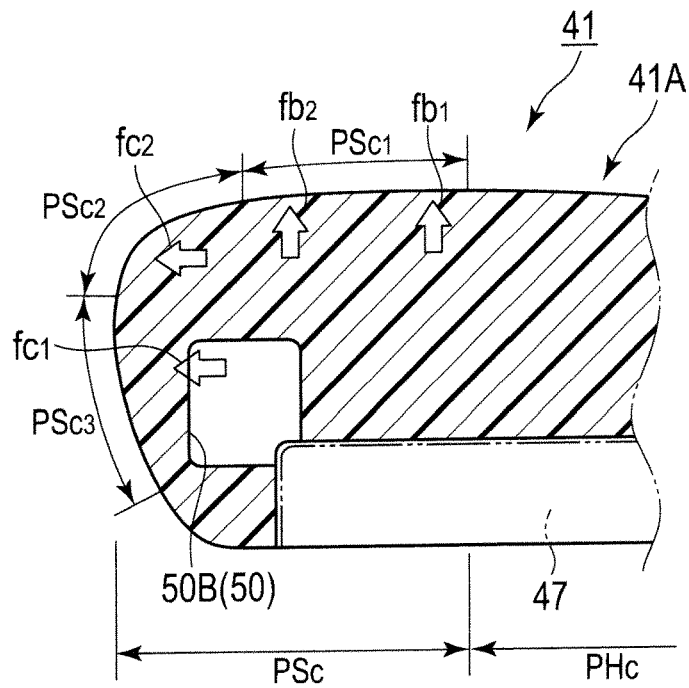

FIG. 23 is a cross-sectional view showing a front part of a seat cushion according to a seventh modified example of the third embodiment.

Figure 24:
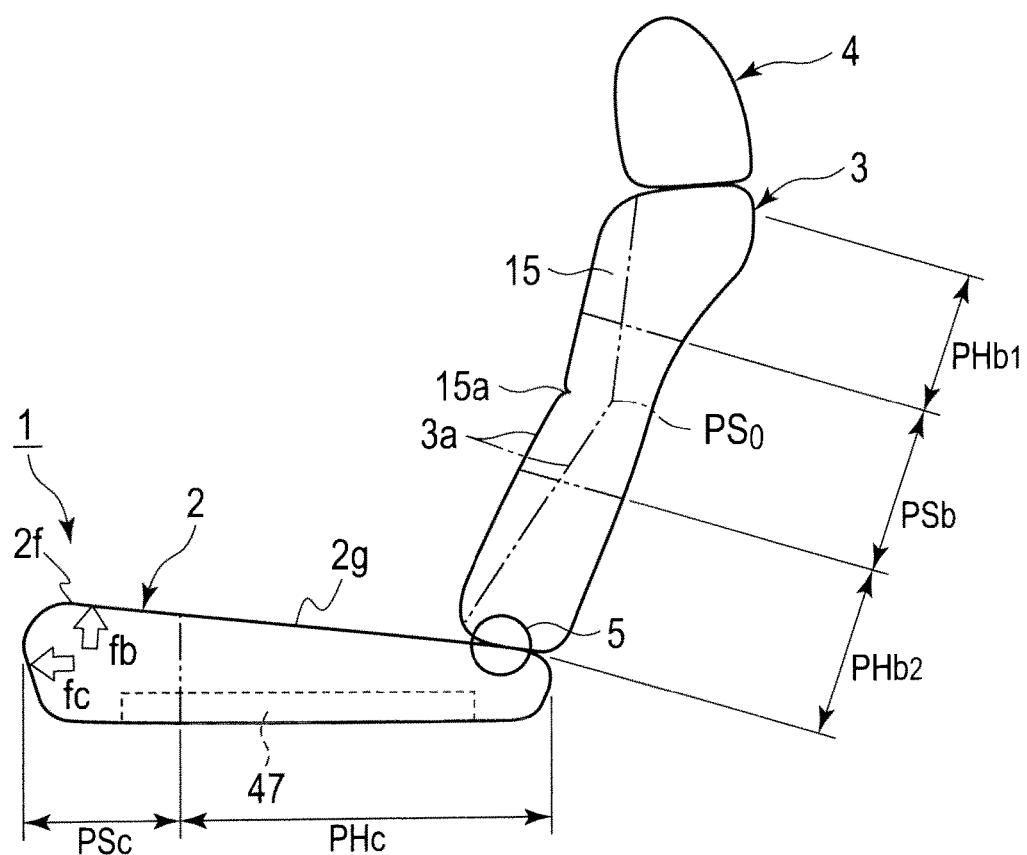

FIG. 24 is a side view showing a vehicle seat for rear seat according to a fourth embodiment of the present invention.

Figure 25:
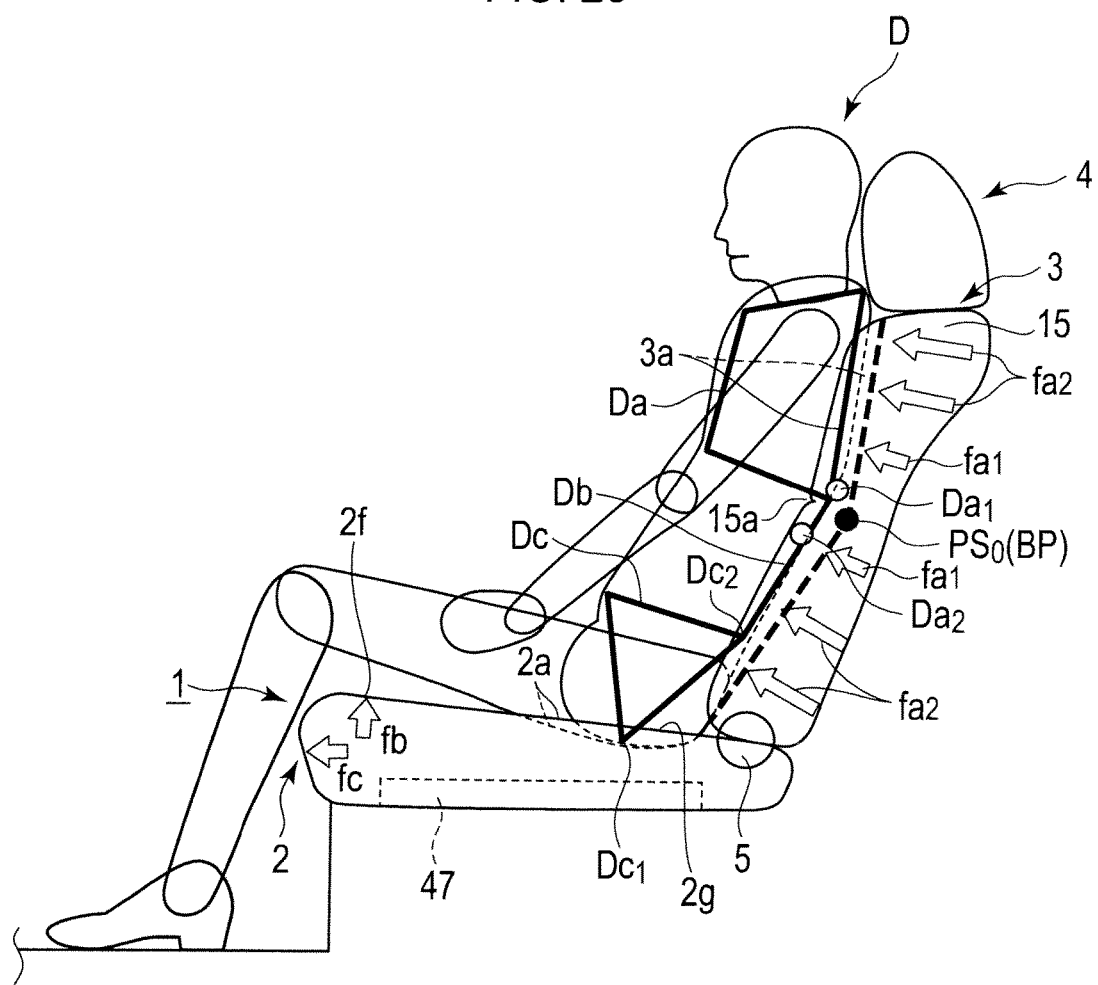

FIG. 25 is a view showing functions of the vehicle seat according to the fourth embodiment.

Figure 26:
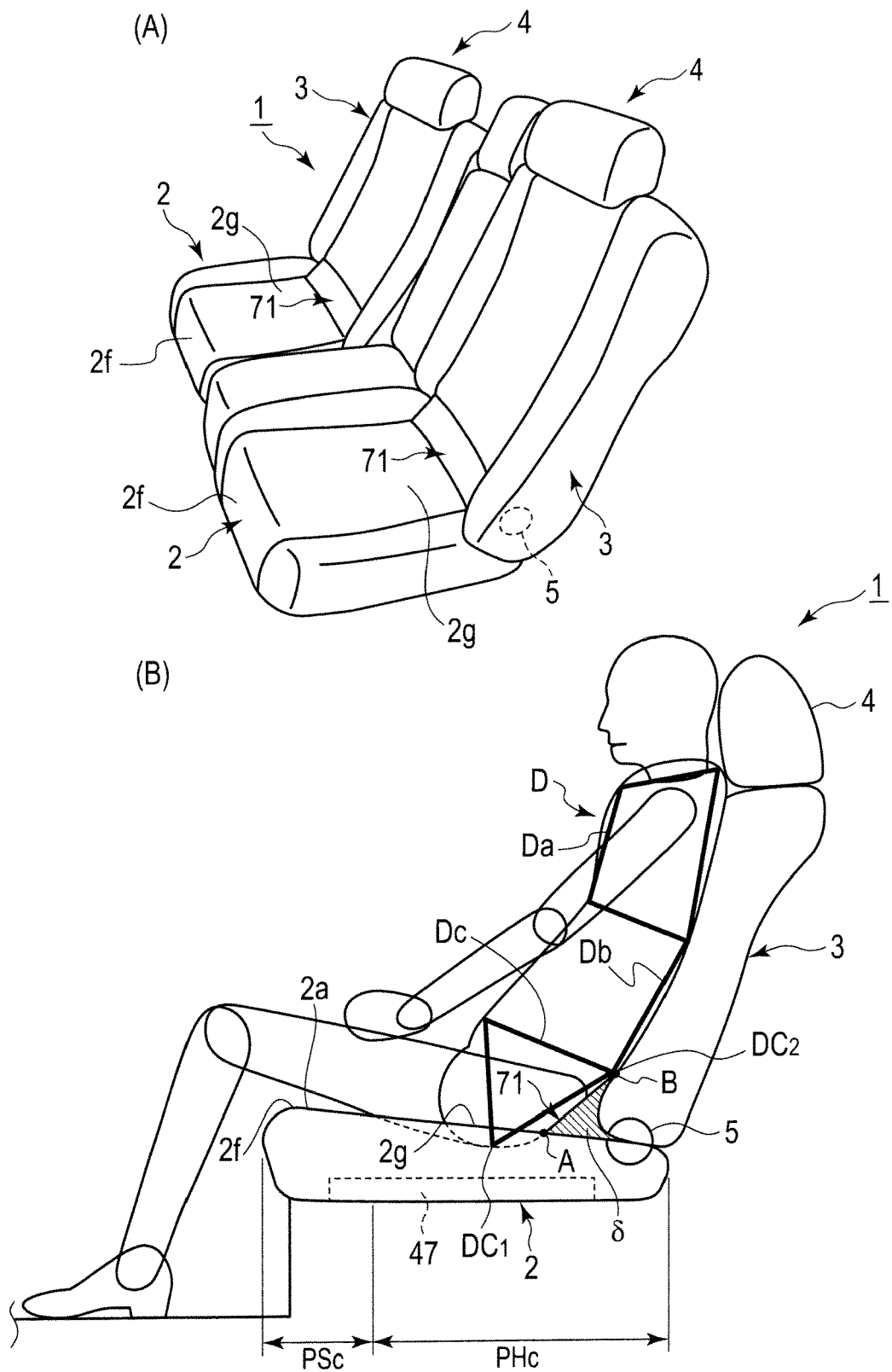

Part (A) of FIG. 26 is a perspective view and part (B) of FIG. 26 is a side view showing a vehicle seat for rear seat according to a fifth embodiment of the present invention.

Figure 27:
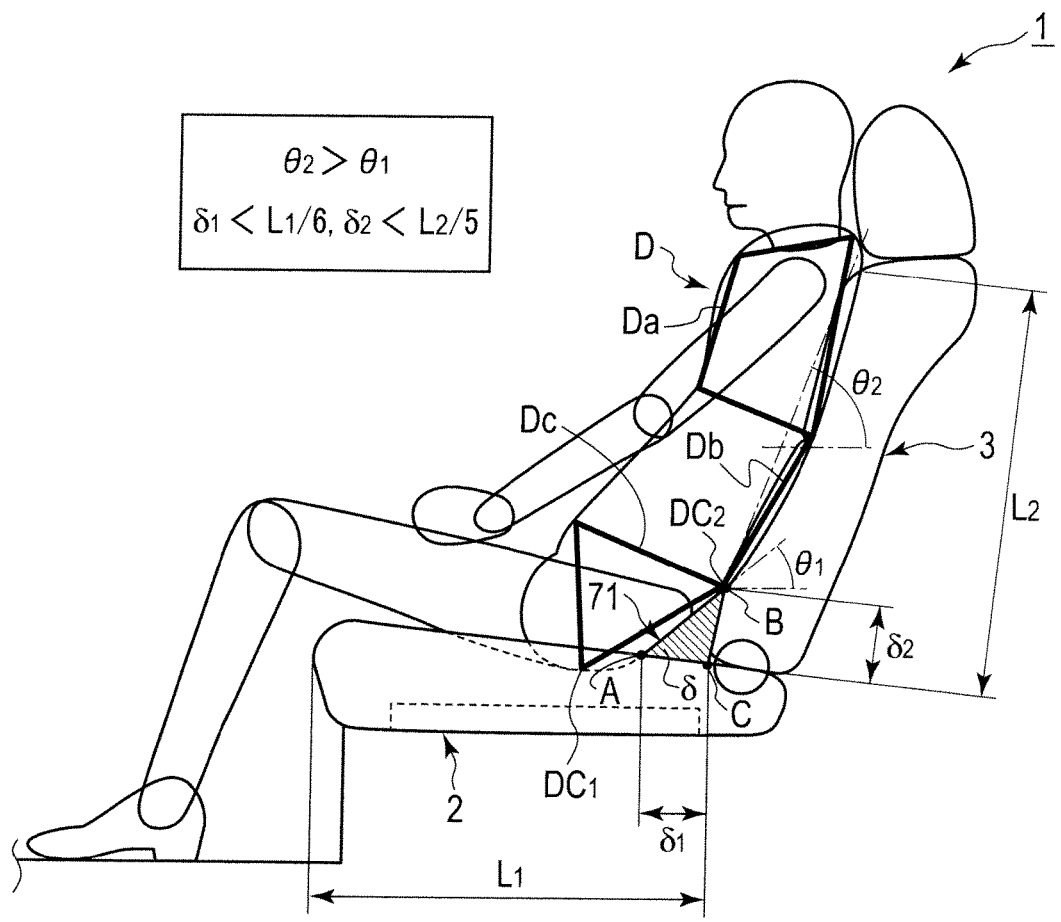

FIG. 27 is a view showing a configuration of an inclined surface according to the fifth embodiment.

Parts (A) and (B) of FIG. 28 are views showing a vehicle seat according to a first modified example of the fifth embodiment, part (A) of FIG. 28 showing a view showing functions of the vehicle seat and part (B) of FIG. 28 showing a side view showing a configuration of a main part.

Parts (A) to (C) of FIG. 29 are views showing other configuration examples of the inclined surface according to the fifth embodiment.

Figure 30:
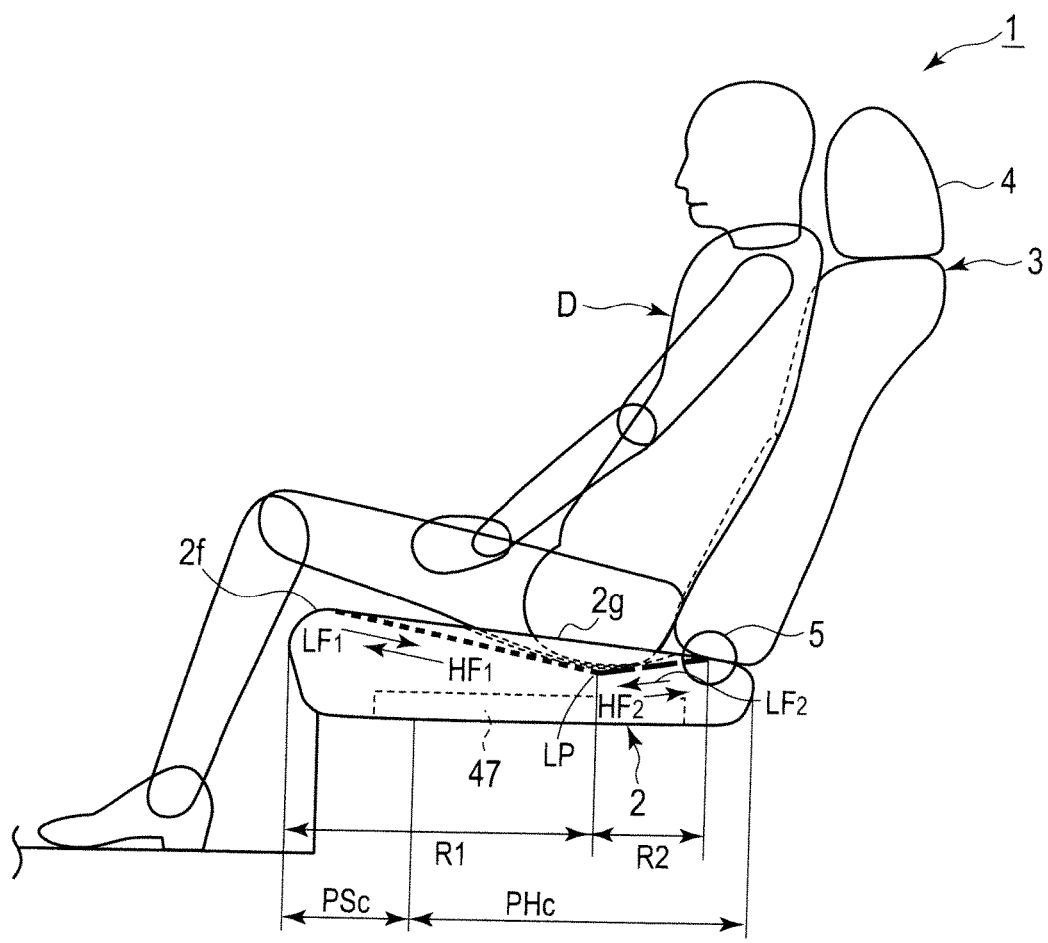

FIG. 30 is a side view showing a vehicle seat for rear seat according to a sixth embodiment of the present invention.

Figure 31:
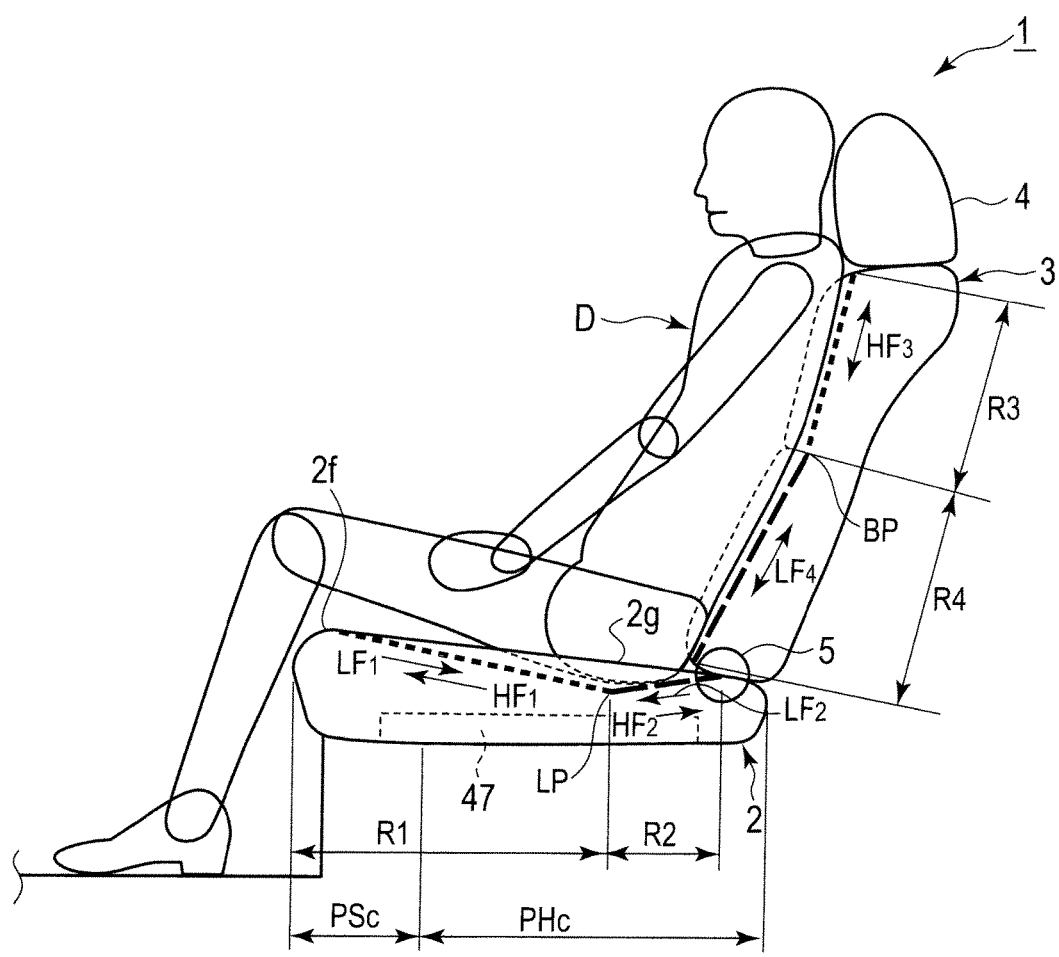

FIG. 31 is a side view showing a vehicle seat according to a first modified example of the sixth embodiment.

Figure 32:
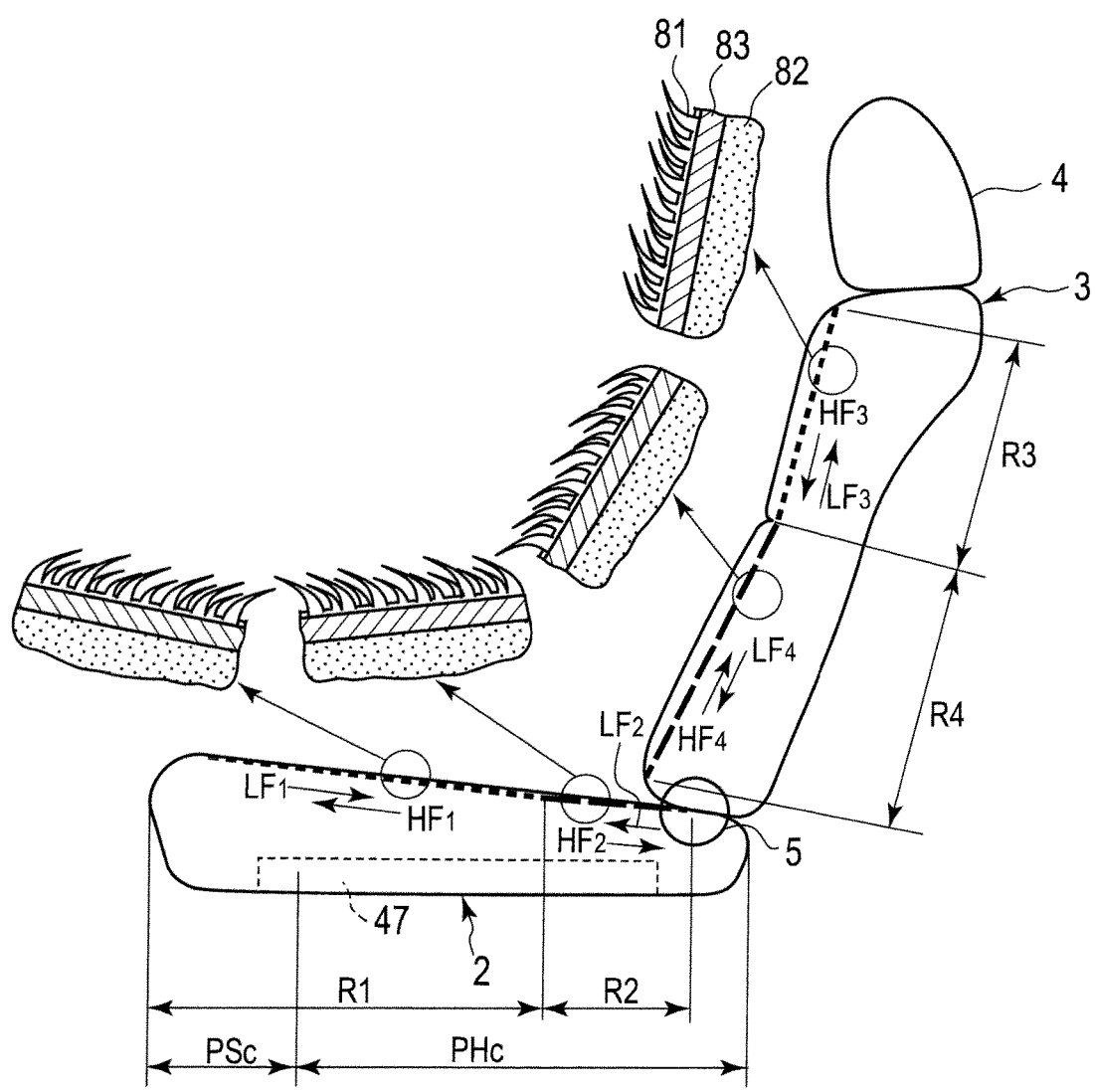

FIG. 32 is a side view showing a configuration example of a friction coefficient distribution according to a second modified example of the sixth embodiment.

Figure 33:
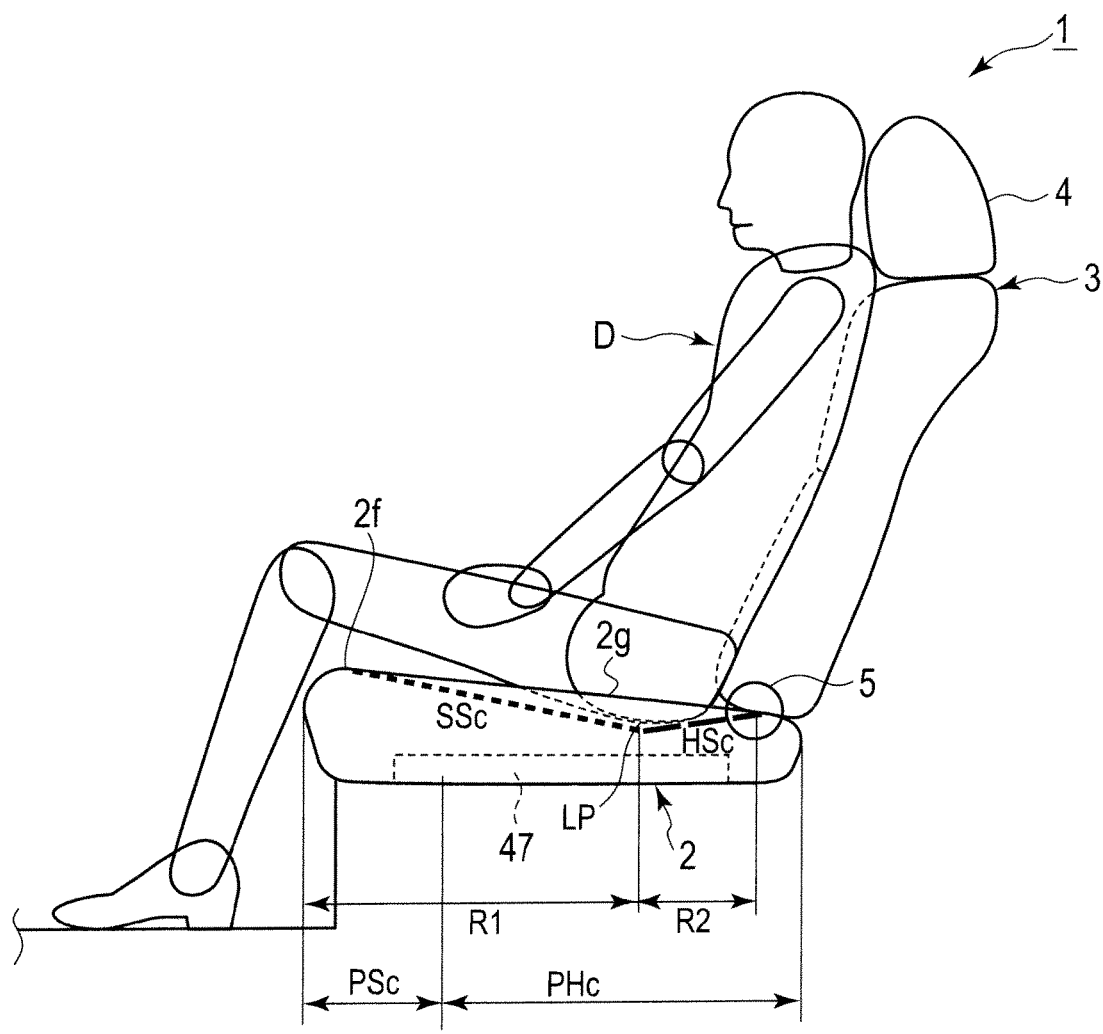

FIG. 33 is a side view showing a vehicle seat according to a third modified example of the sixth embodiment.

Figure 34:
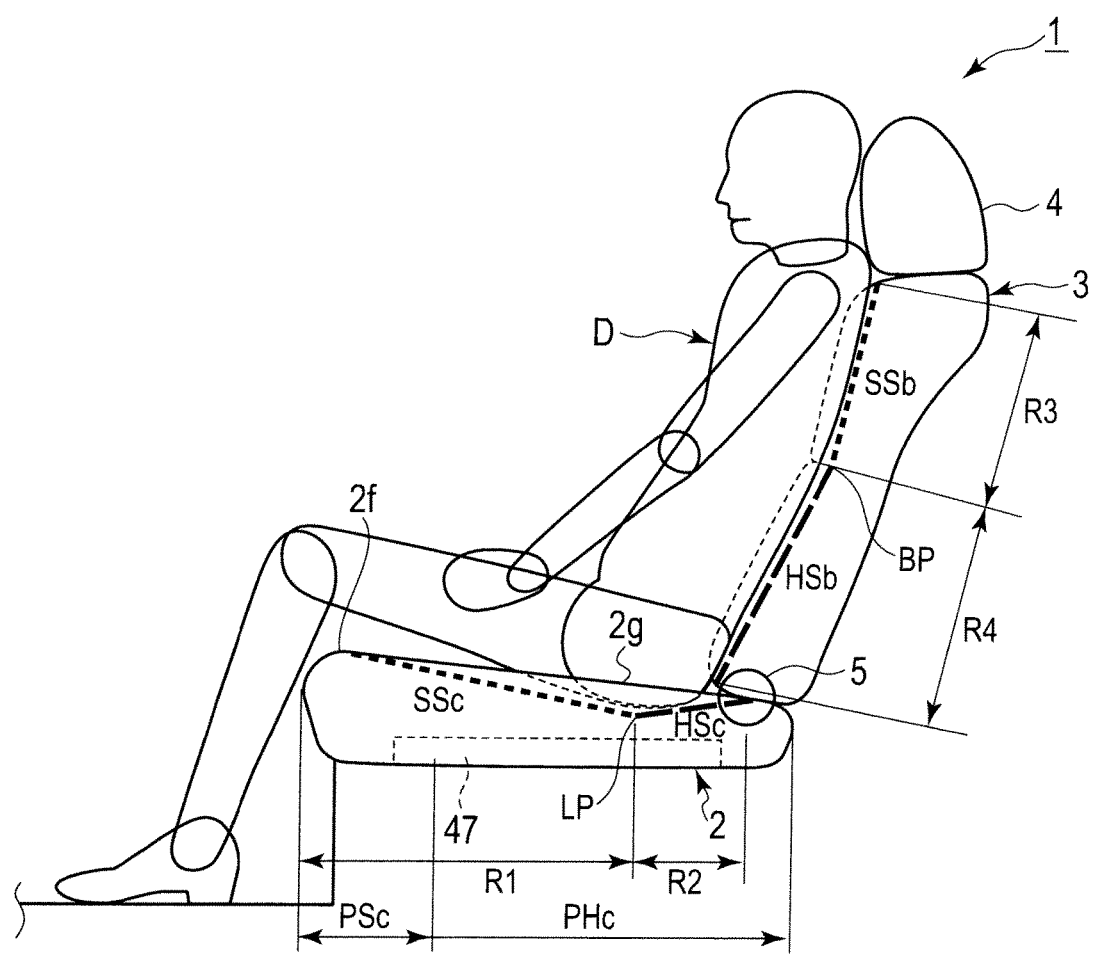

FIG. 34 is a side view showing a vehicle seat according to a fourth modified example of the sixth embodiment.

Figure 35:
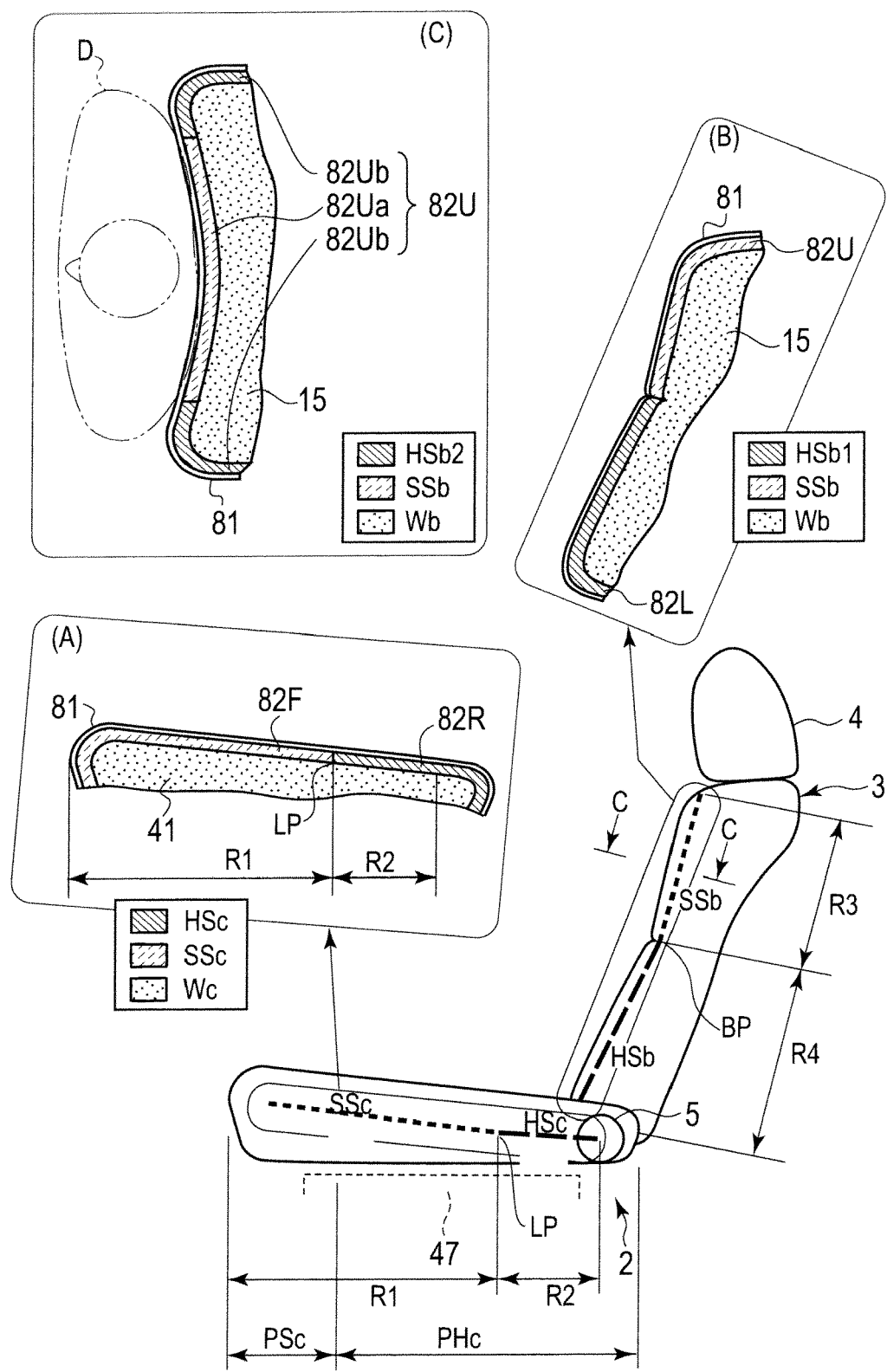

Parts (A) to (C) of FIG. 35 are side views showing a configuration example of a surface stiffness distribution according to a fifth modified example of the sixth embodiment, part (A) of FIG. 35 showing an enlarged sectional view of a surface structure of a seating surface, part (B) of FIG. 35 showing an enlarged sectional view of a surface structure of a backrest surface, and part (C) of FIG. 35 showing an enlarged sectional view taken along the line C-C.

Figure 36:
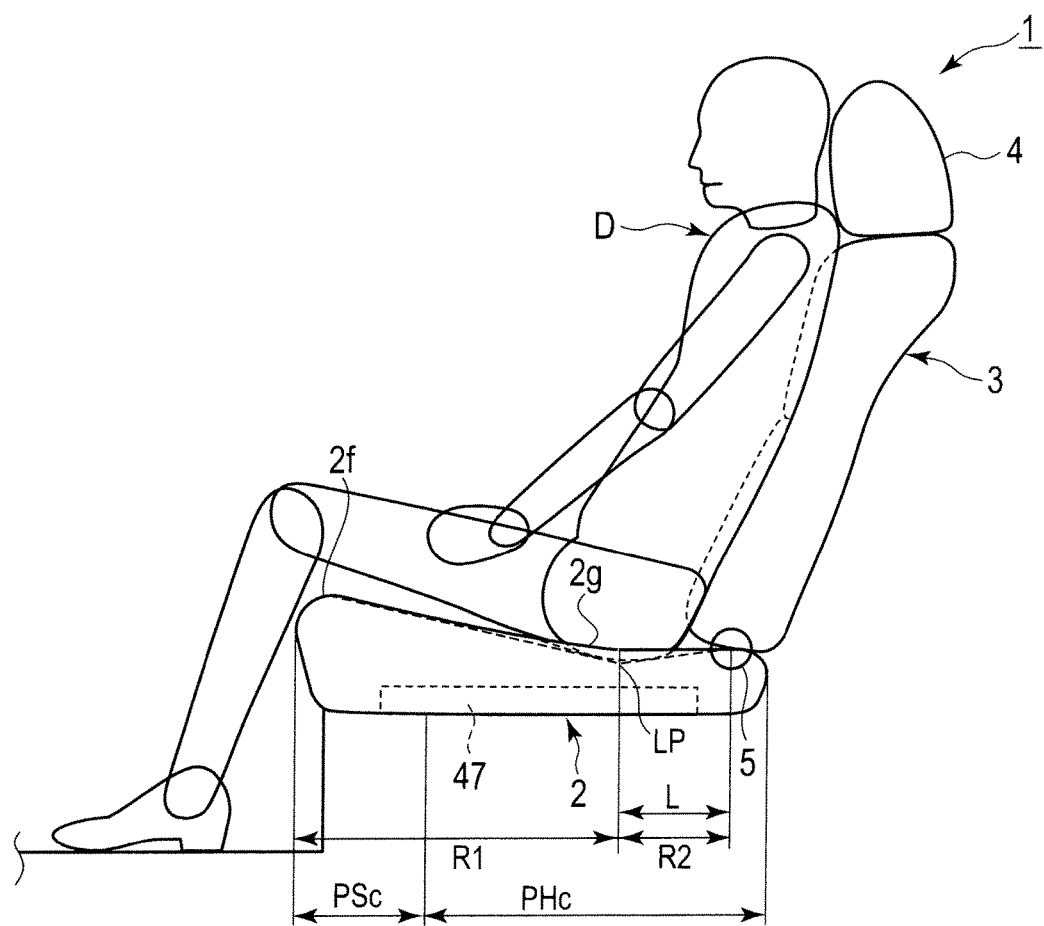

FIG. 36 is a side view showing a vehicle seat for rear seat according to a seventh embodiment of the present invention.

Parts (A) and (B) of FIG. 37 are views showing a vehicle seat according to a modified example of the seventh embodiment, part (A) of FIG. 37 showing a side view of the vehicle seat and part (B) of FIG. 37 showing a modified aspect of the seat back bent in the middle.

Figure 38:
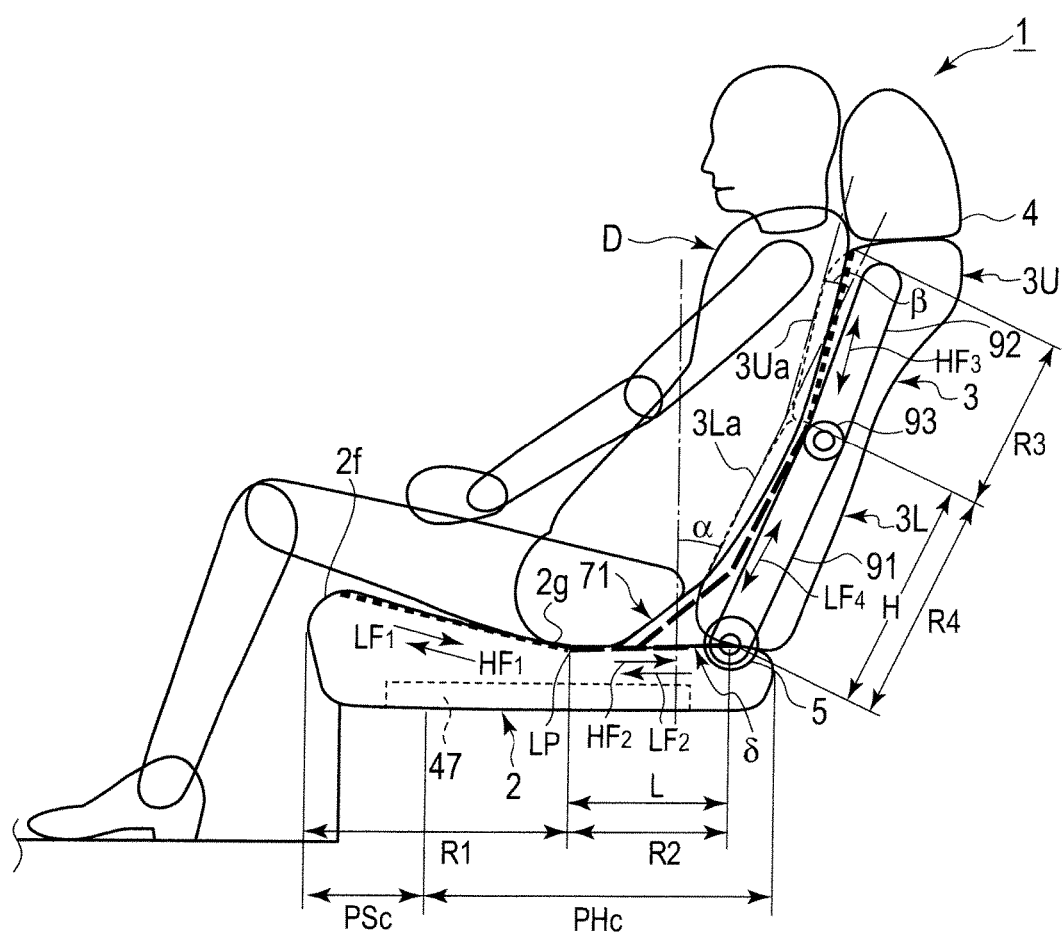

FIG. 38 is a side view showing a vehicle seat for rear seat according to an eighth embodiment of the present invention.

DESCRIPTION OF EMBODIMENTS

With reference to the drawings, embodiments of the present invention are described below. Each of the embodiments is an example where the present invention is applied to a rear seat of a vehicle such as an automobile. Note that, in the description of the drawings, the same parts are denoted by the same reference numerals, and repetitive description is omitted. Moreover, ratios of dimensions in the drawings may be exaggerated for convenience of explanation and thus may be different from actual ones.

First Embodiment

Figure 1:
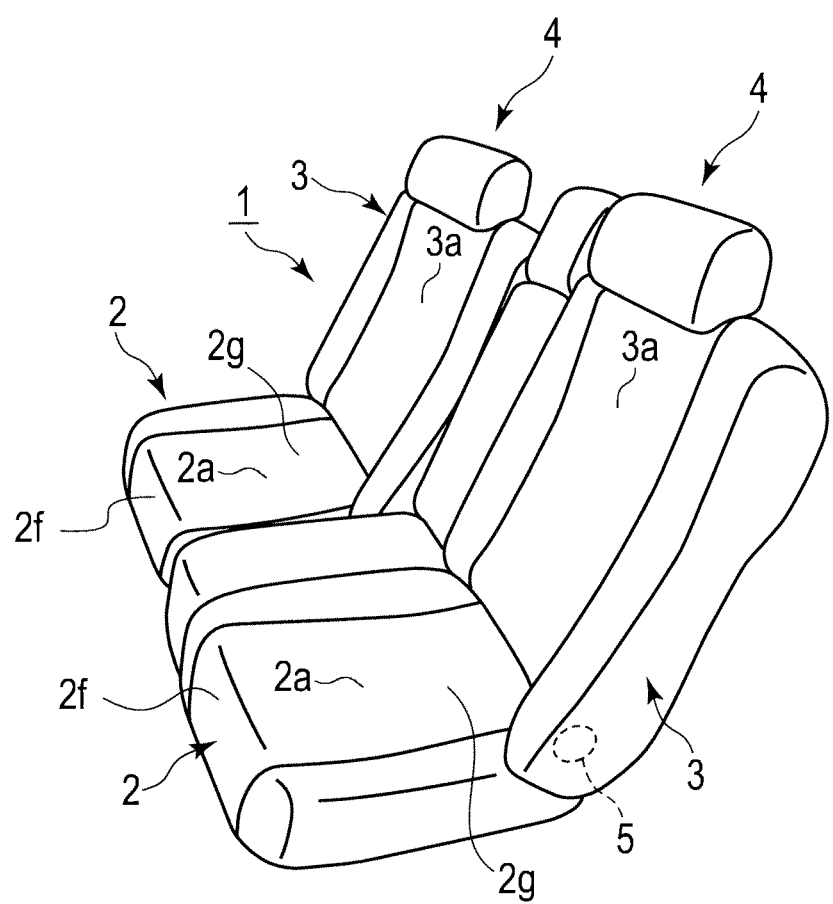
FIG. 1 is a perspective view showing a vehicle seat for rear seat according to a first embodiment of the present invention.
Figure 2:
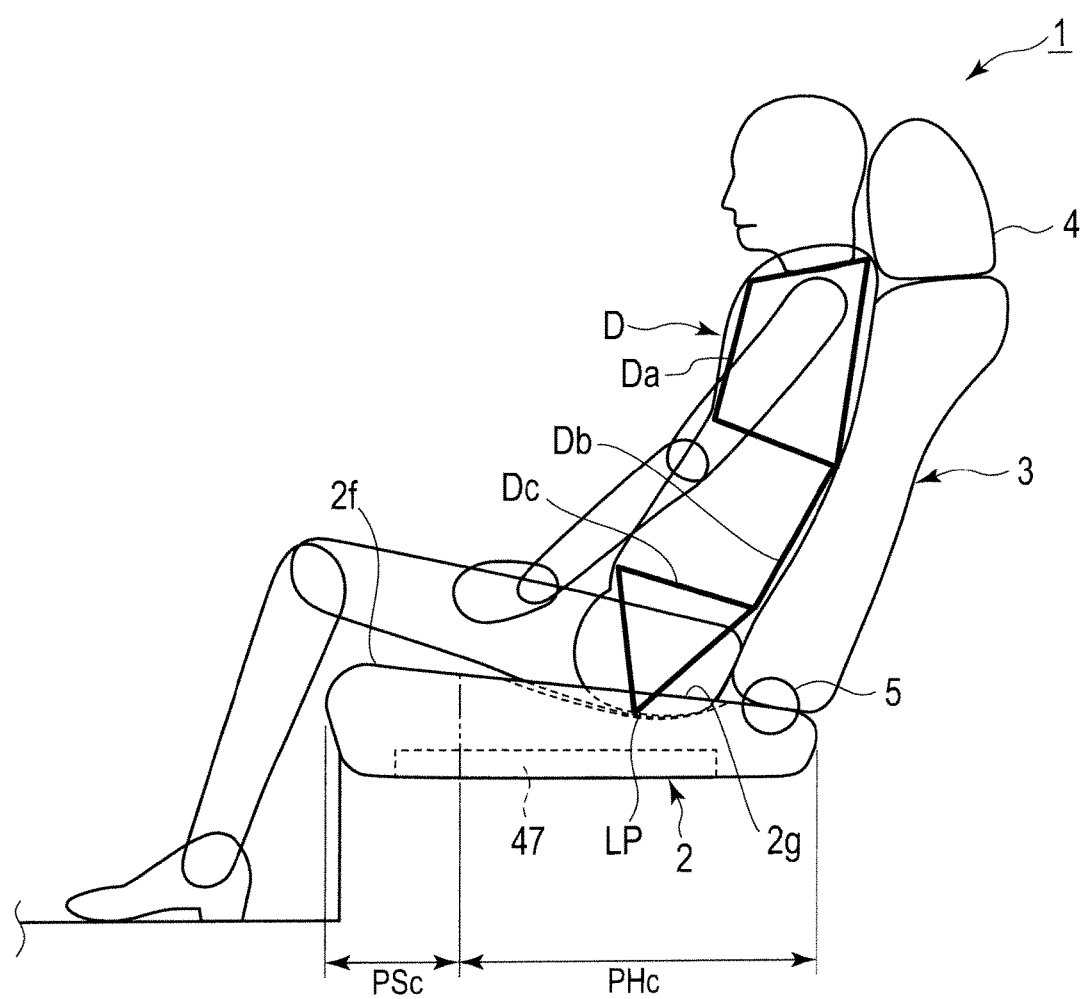
FIG. 2 is a side view of the vehicle seat according to the first embodiment.
Figure 3:
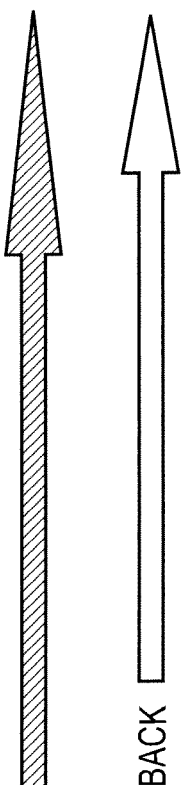
FIG. 3 is a diagram showing a relationship between functions of the vehicle seat according to the present invention and actions taken by an occupant for seating.

With reference to FIGS. 1 to 3, description is given of a vehicle seat 1 for rear seat according to a first embodiment of the present invention.

The vehicle seat 1 for rear seat according to this embodiment mainly includes a seat cushion 2 and a seat back 3 as shown in FIG. 1. The seat back 3 is connected to a rear end portion of the seat cushion 2 via a reclining mechanism 5 so as to incline in a front-rear direction. A headrest 4 is provided at an upper end portion of the seat back 3.

As shown in FIG. 2, the seat cushion 2 includes at least a front part 2f and a rear part 2g. The front part 2f is a part including a front end portion of the seat cushion 2, and covers a range within about ⅙ to ⅓ of the thigh length (length from the great trochanter to the knee joint) of an occupant D from the front end of the seat cushion 2 in the side view of the seat cushion 2. On the other hand, the rear part 2g is a part positioned immediately behind the front part 2f (i.e., the part other than the front part 2f).

The front part 2f of the seat cushion 2 is set as a low stiffness region PSc, while the rear part 2g of the seat cushion 2 is set as a high stiffness region PHc having stiffness higher than that of the low stiffness region PSc. Thus, a stiffness distribution having the low stiffness region PSc and the high stiffness region PHc in a front-rear direction is imparted to the seat cushion 2.

The stiffness of the low stiffness region PSc and the high stiffness region PHc is adjusted accordingly by setting a spring constant of a pad material of the seat cushion 2 to be described later. For example, a preferable spring constraint for the high stiffness region PHc is a standard spring constant usually required for the vehicle seat cushion, which allows the bases of the thighs of the occupant D to be firmly and elastically supported with the hip of the occupant D, which is the gravity center thereof, received as the load center. Meanwhile, a spring constant for the low stiffness region PSc is set to an appropriate one which allows the lower thighs of the occupant D to be supported flexibly to an extent not making the occupant D feel uncomfortable due to sinking of the pad material.

The mechanical properties such as stiffness of the respective areas PSc and PHc as well as positions, sizes, ranges and the like thereof are set based on the dimensions, weight and the like of each part of the body of the occupant D. For such reference dimensions, weight and the like of each part of the body of the occupant D, 50 percentile of adult male of the country where production, sale, use and the like of the vehicle seat 1 are conducted can be adopted. Note that, in second to eighth embodiments and modified examples thereof to be described later, dimensions and the like of each part of the vehicle seat 1 or mechanical properties such as stiffness thereof may also be set based on the dimensions, weight and the like of each part of the body of the occupant D. In such a case, again, reference dimensions, weight and the like of the occupant D can also be set in the same manner as in the case of this embodiment.

FIG. 3 is a diagram showing a relationship between a series of actions taken by the occupant D for seating seated in the vehicle seat 1 and the functions of the vehicle seat 1.

Here, a series of actions taken by the occupant D for seating in the vehicle seat 1 are described sequentially along with the upper part of FIG. 3. First, the occupant D gets into the rear seat of the vehicle.

Next, the occupant D is seated. More specifically, the occupant D places his/her hip on a seating surface 2a of the seat cushion 2. In this event, the occupant D puts the hip on the seating surface 2a while leaving his/her left and right legs in positions at the time of getting into the rear seat (examples of the positions of the legs at the time of getting into the rear seat include, for example, a state where any one of the left and right legs is positioned inside a foot space in the rear seat and the other leg is positioned outside the vehicle, a state where the both legs are placed in the foot space while keeping the toes facing inward in a vehicle width direction, and the like). Thus, usually, the body of the occupant D faces in a direction oblique to the front-rear direction of the vehicle seat 1.

Next, the occupant D turns around by rotating the body around the hip while moving the hip placed on the seating surface 2a of the seat cushion 2 to a predetermined position on the seating surface 2a, thereby adjusting the body direction to the front-rear direction of the vehicle seat 1.

Thereafter, the occupant D leans back on the seat back 3 by inclining his/her upper body backward. In this event, the back of the occupant D comes into contact with a backrest surface 3a.

Next, the occupant D presses his/her back against the backrest surface 3a of the seat back 3 to support the backbone on the seat back 3. In this event, the occupant D may move the hip on the seating surface 2a while pressing the back against the backrest surface 3a.

Lastly, the occupant D reduces a load of the hip by pushing the floor surface with the legs while pressing the back against the backrest surface 3a of the seat back 3, for example, and thus makes final adjustments for the position of a hip point HP. The hip point HP means a point corresponding to the hip joint of the occupant D.

During the process where the occupant D gets seated and then turns around after getting into the rear seat in the above series of actions for seating, mainly the seat cushion 2 in the vehicle seat 1 comes into contact with the body of the occupant D, thus causing a reaction force (contact force) to act on the body of the occupant D. To be more specific, when the occupant D gets seated, the rear part 2g (the high stiffness region PHc) of the seat cushion 2 receives the hip of the occupant D. Furthermore, also during the turnaround of the occupant D, the rear part 2g supports the movement and rotation of the hip on the seat cushion 2.

During the subsequent process from the backrest contact to the HP final adjustment, the seat back 3 causes a reaction force to act on the back of the occupant D through the backrest surface 3a. Meanwhile, the seat cushion 2 causes a reaction force to act on the lower body below the hip, such as the thighs, knees and leg regions of the occupant D through the seating surface 2a.

For the series of actions taken by the occupant D for seating, the vehicle seat 1 according to this embodiment exerts the following functions while allowing the reaction forces to act on the body of the occupant D.

<HP Guide Function>

During seating, the occupant D sits on the seat by bending the knee joints while positioning the knee joints in front of the hip joints. Since the lower portion below the knees of the occupant D seated is supported by the rear seat floor, the load applied to the seat cushion 2 is concentrated on the region right below the hip. Thus, the seat cushion 2 is deformed such that the region right below the hip sinks more deeply than the region therearound. Due to this sinking deformation, the front side of the seating surface 2a in front of the region right below the hip forms an inclined surface which is inclined (inclined backward) upward toward the front. Thus, the occupant D after the turnaround naturally results in a posture with his/her knees bent upward (hereinafter referred to as the knee-bent posture).

Since the gravity center of the occupant D in the knee-bent posture further shifts backward, the load tends to be further concentrated on the region right below the hip. In the vehicle seat 1 according to this embodiment, the high stiffness region PHc is provided in the rear part 2g of the seat cushion 2, and relatively high stiffness is imparted to the high stiffness region PHc. Thus, a sinking amount of the cushion pad in the region right below the hip of the occupant D is adequately suppressed. Accordingly, resistance to the backward movement of the hip is reduced, thus facilitating backward movement of the occupant D on the seating surface 2a. Moreover, the high stiffness region PHc suppresses excessive sinking of the cushion pad also when the occupant D turns around. Thus, resistance to the turnaround of the occupant D is also reduced. Furthermore, in the vehicle seat 1 according to this embodiment, the low stiffness region PSc is provided in the front part 2f of the seat cushion 2, and the front part 2f is deformed with a relatively small load when the knees or lower legs of the occupant D come into contact therewith. Thus, the resistance to the movement or turnaround of the occupant D on the seating surface 2a (clinging or the like of the front part during backward movement or turnaround) is further reduced.

As described above, in the vehicle seat 1 according to this embodiment, the front part 2f of the seat cushion 2 is set as the low stiffness region PSc and the rear part 2g is set as the high stiffness region PHc. This structure suppresses the resistance to the series of actions (particularly, backward movement and turnaround of the occupant D on the seat cushion 2) taken by the occupant D after getting into the rear seat until the completion of the turnaround, thereby easily guiding the hip point HP of the occupant D to an optimum position.

<Space Expansion Function>

After the occupant D turns around on the seating surface 2a and moves the hip point HP further backward on the seating surface 2a, the occupant D leans back on the seat back 3 to support the back bone on the seat back 3, and then finally makes final adjustment on the position of the hip point HP. During this process, the lower thighs, the posterior knees, the posterior lower legs, and the like of the occupant D may be pressed against the front part 2f of the seat cushion 2 with a relatively high pressure. When the occupant D is a small-build person, in particular, the pressure tends to get higher since the lengths of the thighs are relatively short. In the vehicle seat 1 according to this embodiment, the low stiffness region PSc is provided in the front part 2f of the seat cushion 2. Since the low stiffness region PSc can be deformed with a relatively small load, the occupant D can position the hip further backward on the seating surface 2a. As a result, an actual foot space of the vehicle seat 1 is expanded.

Moreover, in the final adjustment of the position of the hip point HP, the occupant D may shift the position of the hip point HP with the load of the hip reduced by pushing the floor surface with the legs while pressing the back against the backrest surface 3a of the seat back 3. In the vehicle seat 1 according to this embodiment, the low stiffness region PSc is provided in the front part 2f of the seat cushion 2. Since the low stiffness region PSc is deformed with a relatively small load, the occupant D can easily stretch his/her legs when pushing the floor surface with the legs.

Meanwhile, when the occupant D is a large-build person, the seat cushion 2 sinks more deeply than in the case of the small-build person. Thus, the inclination angle of the seating surface 2a in front of the hip is also increased. In the vehicle seat 1 according to this embodiment, the high stiffness region PHc is provided in the rear part 2g of the seat cushion 2, and the resistance to the backward movement of the occupant D is suppressed. Thus, the hip of the occupant D is readily guided backward along the seating surface 2a largely inclined, and the occupant D is readily guided to the knee-bent posture. Accordingly, a knee room positioned in front of the knees of the occupant D is secured at an early stage after the start of the seating action. As a result, an effect that is equivalent to actually expanding a knee room can be achieved.

<HP Shift Prevention Function>

Even after the final adjustment of the position of the hip point HP by the occupant D, the load (pressure) applied to the seating surface 2a by the occupant D can be changed by the movement of the occupant D himself/herself, vibration of the vehicle generated during running, and the like. In the vehicle seat 1 according to this embodiment, the high stiffness region PHc is provided in the rear part 2g of the seat cushion 2, and the stiffness of the cushion pad below the hip of the occupant D is higher. Thus, even when the load applied to the seating surface 2a is changed, variations in the sinking amount of the cushion pad are suppressed. As a result, a positional shift in the hip point HP is more surely prevented.

Moreover, the occupant D is in the knee-bent posture while seated in the vehicle seat 1, and the gravity center thereof is closer to the back side. Thus, the hip of the occupant D tends to slide further backward. In the vehicle seat 1 according to this embodiment, the high stiffness region PHc is provided in the rear part 2g of the seat cushion 2, thus reducing the resistance to the backward movement of the occupant D on the seating surface 2a. Accordingly, the hip of the occupant D is likely to slide further backward. Meanwhile, the vehicle seat 1 includes the seat back 3, and the hip trying to move further backward is received from the back by the seat back 3. Thus, the hip of the occupant D is stably held at a position where the backward sliding force and the forward pressing force of the seat back 3 are balanced with each other. As a result, the positional shift in the hip point HP is more surely prevented.

As described above, in the seating surface 2a of the vehicle seat 1, the rearward inclined surface is formed at the position in front of the region right below the hip by the sinking deformation in seating. Thus, the seating surface 2a has a maximum deformation part LP between the rearward inclined surface and the backrest surface 3a of the seat back 3. The maximum deformation part LP is a point where a deformation amount (sinking amount) caused by the load by the seating is at its maximum or a point set to have a maximum deformation amount. In the vehicle seat 1, the maximum deformation part LP is positioned approximately in the center in the front-rear direction of the high stiffness region PHc. The vehicle seat 1 supports the pelvis Dc of the occupant D with the maximum deformation part LP, and thus the pelvis Dc is stably held in a constant posture. Thus, the positional shift in the hip point HP is more surely prevented.

As described above, the vehicle seat 1 according to the first embodiment includes the seat cushion 2 and the seat back 3. Moreover, the low stiffness region PSc which is more flexible than the rear part 2g that is the high stiffness region PHc is provided in the front part 2f of the seat cushion 2, thereby imparting a stiffness distribution in the front-rear direction to the seat cushion 2. Thus, the above three functions, i.e., the HP guide function, the space expansion function and the HP shift prevention function can be simultaneously achieved during the series of actions taken by the occupant D for seating in the vehicle seat 1.

Moreover, in the vehicle seat 1 according to this embodiment, the low stiffness region PSc which is more flexible than the rear part 2g that is the high stiffness region PHc is provided in the front part 2f of the seat cushion 2. Thus, the vehicle seat 1 can provide good seating comfort by firmly supporting the bases of the thighs with the hip of the occupant D, which is the gravity center thereof, received as the load center, and also by flexibly supporting the lower thighs by the low stiffness region PSc. Particularly, reduction in a feeling of pressure on the posterior lower legs and the posterior knees of the occupant D allows the occupant to get the seating comfort.

Second Embodiment

With reference to FIGS. 4 to 8, description is given of a vehicle seat 1 for rear seat according to a second embodiment of the present invention. This embodiment is an example where a stiffness distribution described below is imparted to the seat back 3 in the vehicle seat 1 of the first embodiment.

As shown in FIGS. 4 and 5, in a seat back 3 according to this embodiment, a low stiffness region PSb having a support reaction force $fa_1$ for the occupant D is set in the vertical center portion thereof. Here, the support reaction force is a force that the occupant D receives from a surface (e.g., the backrest surface 3a) on which the occupant D is supported. The support reaction force can be determined based on the maximum deformation amount (sinking amount) of a supporting surface in a state where a pressing surface having a predetermined shape and size is pressed against the supporting surface with a predetermined pressure. If the maximum deformation amount of a supporting surface X is larger than that of a supporting surface Y when a pressing surface having a predetermined shape and size is pressed with a predetermined pressure, the support reaction force of the supporting surface X is smaller than that of the supporting surface Y.

Moreover, in the seat back 3 according to this embodiment, high stiffness regions $PHb_1$ and $PHb_2$ each having a larger support reaction force $fa_2$ for the occupant D than the support reaction force $fa_1$ of the low stiffness region PSb are set, adjacent to the low stiffness region PSb in the vertical direction, in upper and lower portions of the seat back 3. Thus, the seat back 3 is given a stiffness distribution having different reaction force characteristics in the vertical direction.

Note that it is preferable that the high stiffness regions $PHb_1$ and $PHb_2$ have a standard spring constant normally required for the vehicle seat back, which allows the corresponding body part of the occupant D to be firmly and elastically supported with less sinking due to elastic deformation when the occupant D leans back on the backrest surface 3a of the seat back 3. On the other hand, the low stiffness region PSb is set to have an appropriate spring constant which allows relatively flexible elastic deformation and sinking against a backrest load acting on the seat back 3. The backrest load is a load applied to the backrest surface 3a of the seat back 3 by the back of the occupant D in a seated state.

Thus, the backrest surface 3a of the seat back 3 can be bent in the middle at the foregoing low stiffness region PSb at any of various middle bend angles, in a shallow V shape in the side view, for example, according to the backrest load of the occupant D.

In this embodiment, as shown in FIG. 5, the high stiffness region $PHb_1$ in the upper portion of the seat back 3 is formed to approximately correspond to a chest Da of the occupant D, and the high stiffness region $PHb_2$ in the lower portion thereof is formed to approximately correspond to the pelvis Dc of the occupant D.

On the other hand, the low stiffness region PSb in the vertical center portion of the seat back 3 is formed to have a required vertical width dimension having its center at a body part of the occupant D corresponding to the vicinity of the joints of the chest Da and a waist Db, i.e., the tenth thoracic vertebra $Da_1$ to the twelfth thoracic vertebra $Da_2$. In the low stiffness region PSb, the backrest surface 3a can be bent in the middle at a vertical center position $PS_0$ of the low stiffness region PSb as a bend point BP, in response to the backrest load.

When the occupant D leans on the seat back 3 and the backrest surface 3a is bent in the middle in the shallow V shape in the side view, the support reaction force fa ($fa_1$ and $fa_2$) gets larger in the downward direction from the center to a lower end portion of the backrest surface 3a. Thus, the pelvis Dc can be firmly supported. Similarly, the support reaction force fa ($fa_1$ and $fa_2$) gets larger in the upward direction from the center to an upper end portion of the backrest surface 3a. Thus, the chest Da can be supported, in particular.

Part (A) of FIG. 6 is a cross-sectional view showing a structure of the seat back 3, and part (B) of FIG. 6 is a perspective view showing a structure of a seat back frame of the seat back 3.

For convenience, FIG. 5 and part (A) of FIG. 6 show the seat back 3 in a state where a trim cover is removed, which includes a surface material covering a cushion pad.

The seat back 3 includes a seat back frame 11, a cushion pad 15 and a pad supporting member 16 to support the cushion pad 15 on the seat back frame 11 at the back side of the cushion pad 15.

The seat back frame 11 includes a pair of left and right side frames 12, an upper frame 13 made of a pipe material connecting upper ends of the side frames, and a lower frame 14 connecting lower ends thereof.

The cushion pad 15 is formed of an elastic material having a required thickness, which is made of urethane foam or the like, for example, to elastically support the occupant D. The cushion pad 15 is provided to entirely cover the front side of the seat back frame 11, as shown in part (A) of FIG. 6. In the cushion pad 15, a groove 15a to facilitate middle bending of the cushion pad 15 is formed extending in the vehicle width direction in the vertical center portion (the vertical center position $PS_0$ in this embodiment) of the low stiffness region PSb. Moreover, the cushion pad 15 is preferably formed such that the backrest surface 3a is formed beforehand into the shallow V shape with the groove 15a provided as the middle bending point in order to facilitate the middle bending in seating.

In the example shown in part (A) of FIG. 6, the groove 15a is provided on the front surface of the cushion pad 15. However, the groove may be provided on a rear surface of the cushion pad 15 as indicated by the chain line in part (A) of FIG. 6 or may be provided on both front and rear surfaces.

The pad supporting member 16 includes an upper pad supporting member 16U, a lower pad supporting member 16L and a center pad supporting member 16C. The upper pad supporting member 16U supports the upper portion of the cushion pad 15 at the position corresponding to the chest Da of the occupant D. The lower pad supporting member 16L supports the lower portion of the cushion pad 15 at the position corresponding to the pelvis Dc of the occupant D. The center pad supporting member 16C supports the vertical direction center part of the cushion pad 15 at the position corresponding to the vicinity of the joints of the chest Da and the waist Db of the occupant D.

These pad supporting members 16U, 16L and 16C are set to have different mechanical properties such as stiffness and softness, thereby setting the high stiffness regions $PHb_1$ and $PHb_2$ and the low stiffness region PSb described above.

In this embodiment, the upper pad supporting member 16U is formed as a horizontally long metal box structure joined to the front surface of the upper frame 13 along the vehicle width direction. The box structure supports the upper end back surface of the cushion pad 15 at a portion corresponding to the upper end of the chest Da of the occupant D, thereby obtaining a large support reaction force $fa_2$.

The horizontally long box structure 16U also serves as a mounting member for the headrest 4, and is provided with vertically penetrating stay insertion holes 17 at both left and right ends, into which a headrest stay is inserted.

The lower pad supporting member 16L is made of a metal rod having left and right ends joined to leading edge flanges of left and right side frames 12. The metal rod supports the lower end back surface of the cushion pad 15 at a portion corresponding to the upper end of the pelvis Dc of the occupant D, thereby obtaining a large support reaction force $fa_2$.

Meanwhile, the center pad supporting member 16C is made of a metal S spring having left and right ends joined to rear edge flanges of the left and right side frames 12 or the leading edge flanges. The S spring 16C is set to have a required small spring constant, and supports the center back surface of the cushion pad 15 at a lower position of the groove 15, thereby obtaining a small support reaction force $fa_1$.

The vehicle seat 1 according to this embodiment exerts the following functions.

<Automatic Adjustment Function for Middle Bend Angle>

In the vehicle seat 1 according to the second embodiment, the vertical center portion of the seat back 3 is provided with the low stiffness region PSb having a small support reaction force $fa_2$ for the occupant D, and the upper and lower portions of the seat back 3 are provided with the high stiffness regions $PHb_1$ and $PHb_2$, each having a large support reaction force $fa_2$ for the occupant D, adjacent to the low stiffness region PSb. Thus, the stiffness distribution having different reaction force characteristics in the vertical direction of the seat back 3 is imparted. Accordingly, the backrest surface 3a of the seat back 3 can be bent in the middle at the low stiffness region PSb at any of various middle bend angles according to the backrest load of the occupant D.

In each of the regions PSb, $PHb_1$ and $PHb_2$ of the stiffness distribution, the support reaction force fa ($fa_1$ and $fa_2$) varies according to the backrest load to act thereon. Thus, the middle bend angle of the backrest surface 3a varies according to the body size of the occupant D. More specifically, when a small person (small-build person) who is lighter than the standard occupant D is seated, the amount of sinking of the center portion of the backrest surface 3a is small, and thus the middle bend angle is small. On the other hand, when a large person (large-build person) who is heavier than the standard occupant D is seated, the amount of sinking of the center portion of the backrest surface 3a is large, and thus the middle bend angle is large.

Accordingly, regardless of whether the occupant is a small-build person or a large-build person, the backrest surface 3a can be automatically bent in the middle at a middle bend angle which achieves a comfortable posture most suitable for the body side of the occupant D, without the need to perform a special adjustment operation, just by leaning back on the seat back 3. Thus, fatigue of the occupant D can be reduced.

Moreover, as in the case of the first embodiment, the vehicle seat 1 according to this embodiment includes the front part 2f of the seat cushion 2 as the low stiffness region PSc and the rear part 2g thereof as the high stiffness region PHc. Thus, as in the case of the first embodiment, an HP guide function, a space expansion function and an HP shift prevention function can be exerted for the series of actions taken by the occupant D for seating described in the first embodiment.

<HP Guide Function>

In the vehicle seat 1 according to this embodiment, the stiffness distribution including the high stiffness region $PHb_1$, the low stiffness region PSb and the high stiffness region $PHb_2$, which have different reaction force characteristics in the vertical direction of the seat back 3, is imparted as described above. Thus, the backrest surface 3a of the seat back 3 can be bent in the middle according to the backrest load of the occupant D. Accordingly, the back of the occupant D leaning back on the seat back 3 is gently curved to protrude backward. As a result, the occupant D can more easily move the hip backward, and guide the hip point HP to the optimum position. Particularly, in the vehicle seat 1 according to this embodiment, the backrest surface 3a of the seat back 3 is bent in the middle at the middle bend angle which allows a comfortable posture most suitable for the body size of the occupant D by the automatic adjustment function for the middle bend angle described above. Thus, regardless of the body size, the occupant D can more easily move the hip backward, and surely guide the hip point HP to the optimum position.

Moreover, when the occupant D makes final adjustments on the position of the hip point HP, the occupant D may adjust the hip position by pushing the floor surface with his/her legs while pressing the back against the backrest surface 3a of the seat back 3. In this event, a reaction force from the high stiffness region $PHb_1$ in the upper portion of the backrest surface 3a acts on the back of the occupant D. However, in the vehicle seat 1 according to this embodiment, as described above, the stiffness distribution having different reaction force characteristics in the vertical direction of the seat back 3 is imparted. Thus, the backrest surface 3a of the seat back 3 can be bent in the middle according to the backrest load of the occupant D. Accordingly, a downward component is added to the reaction force acting on the back of the occupant D from the high stiffness region $PHb_1$ of the backrest surface 3a. Thus, the occupant D can readily support his/her own body with his/her back and legs during the hip position adjustment. As a result, the occupant D can more easily move the hip point HP to the optimum position.

<Space Expansion Function>

In the vehicle seat 1 according to this embodiment, as described above, the stiffness distribution having different reaction force characteristics in the vertical direction of the seat back 3 is imparted. Accordingly, the backrest surface 3a of the seat back 3 can be bent in the middle according to the backrest load of the occupant D. Thus, the size of the space in front of the backrest surface 3a can be changed automatically based on the body size of the occupant D. More specifically, when the large-build person is seated, the backrest surface 3a is bent in the middle at a larger middle bend angle than in the case where the small-build person is seated. Accordingly, a larger space is generated in front of the backrest surface 3a (particularly, the vertical center portion (low stiffness region PSb) of the backrest surface 3a). In other words, the backrest surface 3a receives the back of the occupant D arriving after moving backward along with the movement of the hip on the seating surface 2a, while bending by the middle bend amount (the front-rear direction movement amount of the backrest surface 3a in the low stiffness region PSb relative to the high stiffness regions $PHb_1$ and $PHb_2$, along with the middle bend) according to the body size of the occupant D. Therefore, in the vehicle seat 1 according to this embodiment, even when the large-build person is seated, for example, the backrest surface 3a does not hinder the backward movement of the hip. As a result, smooth backward movement of the hip can be more surely realized. Thus, a knee room of the occupant D is secured at an earlier stage after the start of the seating action, and an actual knee room expansion effect can be more surely achieved.

Moreover, in the vehicle seat 1 according to this embodiment, the backrest surface 3a of the seat back 3 is bent in the middle at the middle bend angle which allows a comfortable posture most suitable for the body size of the occupant D by the automatic adjustment function for the middle bend angle described above. Accordingly, the occupant D can obtain a comfortable posture most suitable for his/her body size just by leaning back on the seat back 3. Thus, a feeling of spaciousness the occupant D experiences, regardless of the body size, is improved.

<HP Shift Prevention Function>

In the vehicle seat 1 according to this embodiment, the high stiffness region PHc is provided in the rear part 2g of the seat cushion 2, thereby reducing the resistance to the backward movement on the seating surface 2a of the occupant D. The hip of the occupant D in the knee-bent posture tends to slide further backward. However, in the vehicle seat 1 according to this embodiment, as described above, the high stiffness region $PHb_2$ having a large support reaction force $fa_2$ for the occupant D is set in the lower portion of the seat back 3. Thus, the hip trying to move further backward is received more surely from the back by the high stiffness region $PHb_2$. As a result, a positional shift in the hip point HP can be more surely prevented.

Furthermore, in the vehicle seat 1 according to this embodiment, as described above, the stiffness distribution having different reaction force characteristics is imparted in the vertical direction of the seat back. Thus, the backrest surface 3a of the seat back 3 can be bent in the middle according to the backrest load of the occupant D. Accordingly, a downward component is added to the reaction force acting on the back of the occupant D from the high stiffness region $PHb_1$ of the backrest surface 3a. The downward component acts to press the hip of the occupant D in a seated state against the seating surface 2a. Thus, the positional shift in the hip point HP in the seated state is more surely prevented.

In summary, the vehicle seat 1 of the second embodiment has the following configuration in addition to the configuration of the first embodiment described above. The low stiffness region PSb having a small support reaction force $fa_1$ for the occupant D is set in the vertical center portion of the seat back 3. Moreover, the high stiffness regions $PHb_1$ and $PHb_2$ having a large support reaction force $fa_2$ for the occupant D are set, adjacent to the low stiffness region PSb, in the upper and lower portions of the seat back 3. Thus, the stiffness distribution having different reaction force characteristics is imparted in the vertical direction of the seat back 3. Accordingly, the backrest surface 3a of the seat back 3 can be bent in the middle at the low stiffness region PSb at any of various middle bend angles according to the backrest load of the occupant D. Thus, regardless of the body size of the occupant D, the above three functions, i.e., the HP guide function, the space expansion function and the HP shift prevention function can be simultaneously achieved during the series of actions taken by the occupant D for seating in the vehicle seat 1.

Furthermore, the vehicle seat 1 according to this embodiment also exerts functions to improve visibility of the outside of the window and seating comfort described below.

<Improvement of Visibility of Outside of Window>

As to the occupant D of the vehicle seat 1, generally, a larger build person tends to use the seat by reclining the seat back 3, while a smaller build person tends to use the seat by putting the seat back 3 up. In the vehicle seat 1 according to this embodiment, as described above, the stiffness distribution including the high stiffness region $PHb_1$, the low stiffness region PSb and the high stiffness region $PHb_2$, which have different reaction force characteristics, is imparted in the vertical direction of the seat back 3. Thus, the backrest surface 3a of the seat back 3 can be bent in the middle according to the backrest load of the occupant D. Therefore, when a light small-build person D1 is seated and puts the seat back 3 up, the sinking amount in the center portion of the backrest surface 3a is small, resulting in a small middle bend angle, as shown in part (A) of FIG. 7. On the other hand, when a heavy large-build person D2 is seated and reclines the seat back 3, the sinking amount in the center portion of the backrest surface 3a is large, resulting in a large middle bend angle, as shown in part (B) of FIG. 7. More specifically, when the seat back 3 is reclined, the middle bend angle of the seat back 3 is increased, and the chest Da of the occupant D is lifted at a moderate angle. On the other hand, when the seat back 3 is lifted up, the middle bend angle of the seat back 3 is reduced, and the chest Da of the occupant D is prevented from being excessively inclined forward. Therefore, according to this embodiment, the chest Da of the occupant D can be lifted at a moderate angle in accordance with the backward inclination angle of the seat back 3 (or the body size of the occupant D). Thus, the visibility of the outside of the window (front and side visibility) of the occupant D can be improved.

<Improvement of Seating Comfort>

When the small-build person D1 is seated and leans back against the seat back 3, the posterior lower legs and the posterior knees come into contact with the front surface of the front part 2f of the seat cushion 2 upon middle bending of the backrest surface 3a since the thigh length is shorter than that of the large-build person D2. As a result, the person tends to feel pressure on the posterior lower legs and the posterior knees. Also, when the backward inclination angle of the seat back 3 is set large, the degree of contact of the seat cushion front part 2f with the posterior lower legs and the posterior knees is increased, and thus the person tends to feel higher pressure. This can happen to the large-build person D2 too. To be more specific, when the occupant D is the large-build person D2, the occupant D makes the middle bend angle of the backrest surface 3a of the seat back 3, large and may strongly feel pressure on the posterior lower legs and the posterior knees as the front part 2f of the seat cushion 2 comes into contact therewith, under the setting of the large backward inclination angle of the seat back 3.

In the vehicle seat 1 according to this embodiment, as in the case of the first embodiment, the front part 2f of the seat cushion 2 is provided with the low stiffness region PSc which is more flexible than the rear part 2g that is the high stiffness region PHc. Thus, the bases of the thighs are firmly supported with the hip of the occupant D, which is the gravity center thereof, received as the load center. Moreover, the lower thighs are flexibly supported with the low stiffness region PSc. Thus, good seating comfort is achieved. Furthermore, since the low stiffness region PSc is provided in the front part 2f of the seat cushion 2, the front part 2f of the seat cushion 2 is flexibly deformed with the load from the lower thighs, the posterior knees and the posterior lower legs, thus reducing the feeling of pressure on the small-build person and on the large-build person in some cases.

As a result, in this embodiment, a synergistic effect is achieved by combining middle bending of the backrest surface 3a of the seat back 3 at an optimum angle based on the body size of the occupant D with reduction in the feeling of pressure on the posterior lower legs and posterior knees by flexible deformation of the front part 2f of the seat cushion 2. More specifically, according to this embodiment, good seating stability and comfortable and easy seating posture can be achieved to reduce the fatigue of the occupant regardless of whether he/she is a large-build person or a small-build person.

The vehicle seat 1 according to this embodiment further exerts the following functions.

In this embodiment, the high stiffness region $PHb_1$ set in the upper portion of the seat back 3 is formed so as to approximately correspond to the chest Da of the occupant D, and the high stiffness region $PHb_2$ set in the lower portion of the seat back 3 is formed so as to approximately correspond to the pelvis Dc of the occupant D. Thus, the chest Da and the pelvis Dc, which are heavy, can be firmly supported.

Moreover, in this embodiment, the low stiffness region PSb set in the vertical center portion of the seat back 3 is formed around the portion approximately corresponding to the joints of the chest Da and the waist Db. Accordingly, the vertical center position $PS_0$ of the low stiffness region PSb approximately corresponds to the joints of the chest Da and the waist Db of the occupant D, and the backrest surface 3a is bent in the middle with the vertical center position $PS_0$ as the bend point BP. Thus, this embodiment establishes the support structure suitable for the human body frame, and allows the occupant D to take the seating posture having less posture change and less muscle burden. As a result, a fatigue reduction effect can be achieved.

Furthermore, in this embodiment, the cushion pad 15 of the seat back 3 includes the groove 15a to facilitate middle bending of the cushion pad 15, the groove 15a extending in the vehicle width direction in the vertical center portion of the low stiffness region PSb. Thus, the groove 15a is set as the bend point BP of the backrest surface 3a to allow for stable middle bending of the backrest surface 3a.

In this embodiment, the seat back 3 includes the pad supporting members 16 configured to support the cushion pad 15 on the seat back frame 11 at the back side thereof. The high stiffness regions $PHb_1$ and $PHb_2$ and the low stiffness region PSb are set by allowing the pad supporting members 16 to have different mechanical properties such as stiffness. Thus, the stiffness of each area can be easily adjusted to the requirements.

Furthermore, in this embodiment, the upper pad supporting member 16U is formed as the metal box structure, i.e., a rigid structure. By setting the spring constant of the cushion pad 15 itself, the high stiffness region $PHb_1$ can be set to have appropriate stiffness which allows the chest Da to be firmly supported. Moreover, in this embodiment, the metal rod is used as the lower pad supporting member 16L, and the S spring is used as the center pad supporting member 16C. The spring constant is arbitrarily set by selecting wire diameters, materials and the like of those members. Thus, the high stiffness region $PHb_2$ and the low stiffness region PSb can be easily set to have stiffness suitable for supporting the pelvis Dc, supporting the waist Db and middle bending, individually.

Note that the bend point BP of the backrest surface 3a of the seat back 3 is determined based on the standard body size of the occupant. However, in the case where the occupant is the large-build person D2, it is conceivable that the joint positions of the chest Da and the waist Db are shifted above the bend point BP as shown in part (B) of FIG. 7.

To solve this problem, for example, the hardness of the cushion pad immediately below the hip point HP of the seat cushion 2 may be set to appropriate hardness. More specifically, the hardness may be set such that the sinking amount below the hip point HP is increased when the large-build person is seated and the sinking amount below the hip point HP is reduced when the small-build person is seated.

FIG. 8 shows an example of hardness adjustment below the hip point HP of the seat cushion 2.

In each of parts (A) and (B) of FIG. 8, a void part 51, such as a hollow space 51A or multiple vertical slits 51B, is provided in the surface of the pad member 41A, which is opposite to the seating surface at the hip point HP. This void part 51 allows large sinking deformation below the hip point HP when the large-build person is seated and small sinking deformation therebelow when the small-build person is seated, thereby absorbing a shift in joint position between the chest Da and the waist Db, which is caused by a difference in body size of the occupant.

With reference to FIGS. 9 to 14, description is given of a modified example of the vehicle seat 1 according to the second embodiment.

Part (A) of FIG. 9 shows a cross-sectional structure of a seat back 3 and part (B) of FIG. 9 shows a structure of a seat back frame 11 according to the first modified example of the second embodiment.

In this modified example, an S spring is used as a lower pad supporting member 16L, as in the case of a center pad supporting member 16C, instead of the metal rod in the second embodiment.

The S spring 16L as the lower pad supporting member is set to have a spring constant larger than that of the S spring 16C as the center pad supporting member, thereby enabling a pelvis Dc of an occupant D to be firmly supported.

As in the first modified example, the S springs are used as the center pad supporting member 16C and the lower pad supporting member 16L, and specifications of the S springs are selected, respectively. Thus, the stiffness of the high stiffness region PHb$_2$ and low stiffness region PSb can be easily adjusted. Moreover, since the lower pad supporting member 16L is formed of the S spring, the supporting area of the portion corresponding to the pelvis Dc is increased. Thus, variations in support reaction force from the low stiffness region PSb to the high stiffness region PHb$_2$ can be smoothed out to achieve good seating comfort.

Part (A) of FIG. 10 shows a cross-sectional structure of a seat back 3 and part (B) of FIG. 9 shows a structure of a seat back frame 11 according to a second modified example of the second embodiment.

In this modified example, a horizontally long load receiving plate is used as a lower pad supporting member 16L instead of the metal rod in the second embodiment.

The load receiving plate 16L is made of a rigid plate such as a metal plate or a hard resin plate, and is connected to left and right side frames 12 such that its position in the front-back direction can be adjusted by rotation using an actuator 18 or manual rotation.

By forming the lower pad supporting member 16L using the rigid load receiving plate as in the second modified example, the high stiffness region PHb$_2$ can be set to have appropriate stiffness that allows the pelvis Dc to be firmly supported, by setting the spring constant of the cushion pad 15 itself. Moreover, the supporting area of the portion corresponding to the pelvis Dc can be increased to stabilize the seating posture.

Furthermore, the position of the load receiving plate 16L in the front-back direction is adjusted based on a difference in the size of the hip of the occupant D. Thus, a hip supporting structure that fits the body size of the occupant D can be realized.

Moreover, a large support reaction force fa$_2$ can be obtained by forming the lower pad supporting member 16L using the load receiving plate made of metal or hard resin and by supporting the lower end back surface of the cushion pad 15 with a large area in the portion corresponding to the pelvis Dc of the occupant D.

Part (A) of FIG. 11 shows a cross-sectional structure of a seat back 3 and part (P) of FIG. 11 shows a structure of a seat back frame 11 according to a third modified example of the second embodiment.

In this modified example, a horizontally long metal load receiving plate is used as a lower pad supporting member 16L instead of the metal rod in the second embodiment.

The load receiving plate 16L is connected to left and right side frames 12 by setting an appropriate forward protrusion amount, and the thickness of the cushion pad 15 in the portion opposite thereto is adjusted. Thus, the high stiffness region PHb$_2$ is set to have stiffness suitable for supporting the pelvis Dc.

By connecting the load receiving plate 16L while setting the appropriate forward protrusion amount, the supporting area in the portion corresponding to the pelvis Dc can be increased to stabilize the seating posture. Moreover, a large support reaction force fa$_2$ can be obtained with a simpler configuration.

FIGS. 12 to 14 show other examples of the pad supporting member 16, respectively.

In a fourth modified example shown in FIG. 12, the pad supporting member 16 includes a pair of left and right rigid rods 21 extending in the vertical direction, and multiple S springs 22 provided in multiple stages in the vertical direction between the rigid rods 21 and 21.

The rigid rods 21 and 21 are connected at its upper and lower ends by wires 23, and the upper and lower ends are connected to side frames 12 in the vicinity thereof by connection rods 24.

The upper S spring 22U and the lower S spring 22L are provided at positions corresponding to the chest Da and the pelvis Dc of the occupant D. Meanwhile, other two center S springs 22C are provided above and below a bend point BP (a groove 15a) of the cushion pad 15, at positions corresponding to the vicinities of the joints of the chest Da and the waist Db of the occupant D.

The upper and lower S springs 22U and 22L are set to have large spring constants required to firmly support the chest Da and the pelvis Dc of the occupant D. On the other hand, each of the center S springs 22C is set to have a small spring constant required to allow the cushion pad 15 to be bent in the middle at the groove 15a by the backrest load.

As described above, in the fourth modified example, the pad supporting member 16 includes the pair of left and right rigid rods 21 extending in the vertical direction, and the multiple S springs 22 provided in multiple stages in the vertical direction between the rigid rods 21. Thus, the arrangement, stiffness and the like of the respective areas PHb₁, PSb and PHb₂ can be easily adjusted by determining the spring constants of the S springs 22U, 22C and 22L and adjusting the arrangement thereof. Furthermore, the upper and lower ends of the rigid rods 21 and 21 are connected by the wires 23, and are connected to the side frames 12 in the vicinity thereof by the connection rods 24. Thus, by adjusting the stiffness of the rigid rods 21 and the connection rods 24, the stiffness of the entire backrest surface 3a can be easily adjusted.

In a fifth modified example shown in FIG. 13, a pad supporting member 16 includes a pair of left and right elastic rods 25 extending in the vertical direction, and coil springs 26 supporting upper, center and lower portions of the elastic rods 25 and 25 on side frames 12 in the vicinities thereof.

The pair of left and right elastic rods 25 are made of a suitable synthetic resin material which allows for flexible deformation by backrest load. The elastic rods are connected to each other by multiple wires 23 provided in multiple stages in the vertical direction, and configured to support the back surface of the cushion pad 15 together with the wires 23.

The upper coil spring 26U and the lower coil spring 26L are arranged in positions corresponding to side portions of the chest Da and the pelvis Dc of the occupant D. Meanwhile, the center coil spring 26c is arranged in a position corresponding to a side portion in the vicinity of the joints of the chest Da and the waist Db of the occupant D.

The upper and lower coil springs 26U and 26L are set to have large spring constants required to firmly support the chest Da and the pelvis Dc of the occupant D. On the other hand, the center coil spring 26C is set to have a small spring constant required to allow the elastic rod 25 to be flexibly deformed into a shallow V shape in its center portion and to allow the cushion pad 15 to be bent in the middle at the groove 15a by the backrest load.

As described above, in the fifth modified example, the arrangement, stiffness and the like of the respective areas PHb₁, PSb and PHb₂ can be easily adjusted by setting the stiffness of the elastic rods 25 and determining the spring constants of the coil springs 26U, 26C and 26L.

In a sixth modified example shown in FIG. 14, a pad supporting member 16 includes a pair of upper and lower load receiving plates 27 and a connection plate 28 connecting those plates.

The upper load receiving plate 27U has its upper end connected to left and right side frames 12 with a support shaft 29 so as to be rotatable in the front-back direction at a position approximately corresponding to the upper end of the chest Da of the occupant D. The lower load receiving plate 27L has its lower end connected to the left and right side frames 12 with a support shaft 29 so as to be rotatable in the front-back direction at a position approximately corresponding to the upper end of the pelvis Dc of the occupant D.

The load receiving plates 27 are formed using rigid plates made of metal or hard synthetic resin, while the connection plate 28 is made of a plate spring.

The connection plate 28 is provided at a position corresponding to the vicinity of the joints of the chest Da and the waist Db of the occupant D. The connection plate 28 is set to have a required small spring constant such that the upper and lower load receiving plates 27U and 27L are rotated in the arrow direction shown in FIG. 14 around the support shaft 29 by the backrest load and the cushion pad 15 can be bent in the middle at the groove 15a.

In the sixth modified example, as described above, the pad supporting member 16 includes the pair of upper and lower load receiving plates 27 and the connection plate 28 connecting those plates. Thus, a bending moment generated by the backrest load can be concentrated on the connection plate 28, and the middle bending of the backrest surface 3a can be more surely realized.

Note that the present invention is not limited to the cushion pad supporting structure described in the above embodiments and modified examples, but is applicable to any cushion pad supporting structure which can achieve the stiffness distribution shown in FIG. 4 in the vertical direction of the seat back 3.

Third Embodiment

With reference to FIGS. 15 and 16, description is given of a vehicle seat 1 for rear seat according to a third embodiment of the present invention. This embodiment is an example where reaction force characteristics described below are imparted to the front part 2f of the seat cushion 2 in the vehicle seat 1 of the first embodiment.

In this embodiment, as shown in FIG. 15, a low stiffness region PSc provided in a front part 2f of a seat cushion 2 is given reaction force characteristics of having a large support reaction force fb for a seating load applied from the above, and a small support reaction force fc for a seating load applied from the front. That is, the low stiffness region PSc is given such reaction force characteristics that the support reaction force fb for the seating load applied from the above is greater than the support reaction force fc for the seating load applied from the front (fb>fc). The seating load is a load applied to the seat cushion 2 from a body part of an occupant D lower than the waist in seating.

FIG. 16 shows a structure of the front part of the seat cushion 2 of this embodiment in a state where a surface material covering a cushion pad 41 is removed for convenience.

As shown in FIG. 16, the seat cushion 2 includes the cushion pad 41 made of urethane foam or the like and a seat cushion base member 47 such as a seat cushion pan and a seat cushion frame supporting the cushion pad 41.

The low stiffness region PSc of the front part 2f of the seat cushion 2 is set to include a portion (lower posterior thigh contact portion) $PSc_1$ to be in contact with the lower posterior thighs of the occupant D, a portion (posterior knee contact portion) $PSc_2$ to be in contact with the posterior knees, and a portion (posterior lower leg contact portion) $PSc_3$ to be in contact with the posterior lower legs, which are shown in FIG. 16.

Support reaction forces of the lower posterior thigh contact portion $PSc_1$, the posterior knee contact portion $PSc_2$, and the posterior lower leg contact portion $PSc_3$ are set to satisfy a relation of the lower posterior thigh contact portion $PSc_1$>the posterior knee contact portion $PSc_2$>the posterior lower leg contact portion $PSc_3$. As a result, the low stiffness region PSc is given the reaction force characteristics of having the large support reaction force fb for the seating load applied from the above and the small support reaction force fc for the seating load applied from the front.

In this embodiment, the cushion pad 41 is formed of: a standard pad material 41A used in a high stiffness region PHc of a rear part 2g of the seat cushion 2 and set to have a required spring constant; and a pad material 41B used in the low stiffness region PSc of the front part 2f of the seat cushion 2. Moreover, as the pad material 41B, used is a pad material 42 with such reaction force characteristics that support reaction forces therefrom have directional properties (for example, such reaction force characteristics that the upward support reaction force fb is greater than the forward support reaction force fc (fb>fc)). Note that the reaction force characteristics of the pad material 42 as above can be easily set through adjustment of the form density inside the pad material 42 or the like, for example.

As in the case of the first embodiment, the vehicle seat 1 according to this embodiment includes the front part 2f of the seat cushion 2 as the low stiffness region PSc and the rear part 2g thereof as the high stiffness region Mc. Thus, as in the case of the first embodiment, an HP guide function, a space expansion function and an HP shift prevention function can be exerted for the series of actions taken by the occupant D for seating described in the first embodiment.

<HP Guide Function>

Further, in the vehicle seat 1 according to this embodiment, the low stiffness region PSc of the seat cushion 2 is given the reaction force characteristics of having the large support reaction force fb for the seating load applied from the above and the small support reaction force fc for the seating load applied from the front. Thus, even in the case where the seating load applied from the above is relatively large, such as when the occupant D is a large-build person, a downward sinking amount of the front part 2f of the seat cushion 2 is suppressed, thereby more stably supporting the lower posterior thighs. Moreover, in the case where the occupant D is a small-build person (or is a large-build person), the front part 2f is flexibly deformed in response to the seating load applied from the front due to contact of the knees or the lower legs therewith. Thus, resistance to a movement or turnaround of the occupant D on a seating surface 2a is surely reduced.

<Space Expansion Function>

Moreover, in the vehicle seat 1 according to this embodiment, as described above, the low stiffness region PSc of the seat cushion 2 is given the reaction force characteristics of having the large support reaction force fb for the seating load applied from the above and the small support reaction force fc for the seating load applied from the front. Thus, even in the case where the seating load applied from the above is relatively large, such as when the occupant D is a large-build person, the downward sinking amount of the front part 2f of the seat cushion 2 is suppressed, thereby more stably supporting the lower posterior thighs. Moreover, in the case where the occupant D is a small-build person, the front part 2f is flexibly deformed in response to the seating load applied from the front. Thus, a foot space can be surely secured.

<HP Shift Prevention Function>

Moreover, in the vehicle seat 1 according to this embodiment, as described above, the low stiffness region PSc of the seat cushion 2 is given the reaction force characteristics of having the large support reaction force fb for the seating load applied from the above and the small support reaction force fc for the seating load applied from the front. Thus, even in the case where the seating load applied from the above is relatively large, such as when the occupant D is a large-build person, the downward sinking amount of the front part 2f of the seat cushion 2 is suppressed, thereby more stably supporting the lower posterior thighs. Moreover, in the case where the occupant D is a small-build person, a reaction force for the seating load applied from the front is small. Thus, a positional shift in a hip point HP can be more surely prevented.

In summary, in addition to the configuration of the first embodiment described above, the vehicle seat 1 of the third embodiment is configured such that the low stiffness region PSc of the seat cushion 2 is given the reaction force characteristics of having the large support reaction force fb for the seating load applied from the above and the small support reaction force fc for the seating load applied from the front, Thus, regardless of the body size of the occupant D, the above three functions, i.e., the HP guide function, the space expansion function and the HP shift prevention function can be simultaneously achieved more surely during the series of actions taken by the occupant D for seating in the vehicle seat 1.

Further, the vehicle seat 1 according to this embodiment exerts functions described below.

In addition to the configuration of the first embodiment described above, the vehicle seat 1 of this embodiment is configured such that the low stiffness region PSc of the seat cushion 2 is given the reaction force characteristics of having the large support reaction force fb for the seating load applied from the above and the small support reaction force fc for the seating load applied from the front, Thus, regardless of whether the occupant is a small-build person or a large-build person, the occupant can obtain stable seating and a comfortable seating posture. Accordingly, fatigue due to long driving can be reduced. Note that stable seating and a comfortable seating posture can be obtained similarly in a case of using the vehicle seat 1 as the driver's seat as well, as a matter of course. The support reaction force for the driver's lower posterior thighs is maintained appropriately, thereby never affecting pedal operations and the like.

Further, in the vehicle seat 1 according to this embodiment, the low stiffness region PSc of the seat cushion 2 is set to include the lower posterior thigh contact portion $PSc_1$, the posterior knee contact portion $PSc_2$ and the posterior lower leg contact portion $PSc_3$. Thus, even when the occupant D is a small-build person, a feeling of pressure on the lower posterior thighs, the posterior knees, and the posterior lower legs are well avoided. Accordingly, the occupant D can be seated in the seating surface 2a of the seat cushion 2 on a side closer to the rear than otherwise.

Moreover, in the vehicle seat 1 according to this embodiment, the support reaction forces of the lower posterior thigh contact portion $PSc_1$, the posterior knee contact portion $PSc_2$ and the posterior lower leg contact portion $PSc_3$ are set to satisfy the relation of the lower posterior thigh contact portion $PSc_1$>the posterior knee contact portion $PSc_2$>the posterior lower leg contact portion $PSc_3$. Thus, the change in the support reaction forces is made gentle, making it possible to provide the occupant D with seating comfort without awkwardness.

Moreover, in this embodiment, as the pad material 41B, used is the pad material 42 with such reaction force characteristics that the support reaction forces thereof have directional properties (for example, such reaction force characteristics that the upward support reaction force fb is greater than the forward support reaction force fc (fb>fc)). Thus, it is possible, with only the pad material 42, to support the lower posterior thighs on the lower posterior thigh contact portion $PSc_1$ with the large support reaction force fb and to support the posterior lower legs on the posterior lower leg contact portion $PSc_3$ with the small support reaction force fc that causes no feeling of pressure. Moreover, a support reaction force between the support reaction forces fb and fc is generated by the posterior knee contact portion $PSc_2$ for a posterior knee load applied from a front side which is slightly from above. Thus, the posterior knees of the occupant D can be supported without imparting a feeling of pressure or impairing support stability.

Further, in this embodiment, in addition to these effects for the seating quality, the above-described reaction force characteristics can be obtained by means of the single pad material 42. Thus, increase in the number of components and the man-hour for assembly can be suppressed, thereby offering an advantage in terms of cost.

With reference to FIGS. 17 to 23, description is given of modified examples of the vehicle seat 1 according to the third embodiment.

FIG. 17 shows a first modified example of this embodiment. In this modified example, the configuration is such that the pad material 41B used in the low stiffness region PSc is divided into a pad material 43 disposed in a portion corresponding to the lower posterior thigh contact portion PSc1, a pad material 44 disposed in a portion corresponding to the posterior knee contact portion PSc2, and a pad material 45 disposed in a portion corresponding to the posterior lower leg contact portion PSc3.

As the pad materials 43, 44, and 45, used are ones obtained through simple foaming at uniform densities, respectively.

The pad material 43 is set to have a required spring constant which can provide the upward support reaction force fb, and the pad material 45 is set to have a required spring constant which can provide a forward support reaction force fc1 for load from the front. On the other hand, the pad material 44 is set to have a required spring constant which can provide a forward support reaction force fc2 between the pad material 43 and the pad material 45.

In the first modified example, as described above, the front part 2f of the seat cushion 2 is formed by using the pad materials 43, 44 and 45 having different spring constants in the portions corresponding to the lower posterior thigh contact portion PSc1, the posterior knee contact portion PSc2 and the posterior lower leg contact portion PSc3, respectively. Thus, in addition to effects for the seating quality similar to the third embodiment, it is possible to achieve an effect which allows appropriate but easy reaction force adjustment in given portions of the low stiffness region PSc, by appropriately selecting pad materials 43, 44 and 45 with spring constants that are suitable for supporting the lower posterior thighs, the posterior knees and the posterior lower legs of the occupant D.

FIG. 18 shows a second modified example of this embodiment. In this modified example, the pad material used in the portion corresponding to the lower posterior thigh contact portion $PSc_1$ (the pad material 43 in the first modified example) is divided in the front-rear direction to be formed of a rear pad material 43a which dominates over the rear half of the lower posterior thigh contact portion $PSc_1$, and a front pad material 43b adjacent to the pad materials 44 and 45.

The rear pad material 43a is set to have a required spring constant which can provide an upward support reaction force $fb_1$. On the other hand, the front pad material 43b is set to have a required spring constant which can provide an upward support reaction force $fb_2$ between the upward support reaction force $fb_1$ of the rear pad material 43a and the forward support reaction force $fc_2$ of the pad material 44 disposed in the posterior knee contact portion $PSc_2$.

In the second modified example, as described above, the pad material 43 used in the portion corresponding to the lower posterior thigh contact portion $PSc_1$ is divided in the front-rear direction to be formed of the multiple pad materials 43a and 43b. The spring constant of the pad material 43a disposed in the rear side is set smaller than the spring constant of the pad material 43b disposed in the front side. Thus, in addition to the effect of the first modified example, it is possible to achieve an effect which allows further improvement in the seating comfort in a range from the lower posterior thighs to the posterior knees of the occupant D, by making gentle the change in the support reaction forces in a range from the lower posterior thigh contact portion $PSc_1$ to the posterior knee contact portion $PSc_2$.

FIG. 19 show a third modified example of this embodiment. In this modified example, a single pad material 46 obtained through simple foaming at a required uniform density is used as the pad material 41B used in the front part 2f of the seat cushion 2.

The pad material 46 is set to have a smaller spring constant than the pad material 41A used in the rear part 2g of the seat cushion 2.

An inclined surface facing downward and inclined downward toward the rear is formed at a front portion of the pad material 41A. An inclined surface facing upward and inclined downward toward the rear at the same angle as the inclined surface at the front portion of the pad material 41A is formed at a rear portion of the pad material 46. The inclined surface at the front portion of the pad material 41A and the inclined surface at the rear portion of the pad material 46 face each other and are in contact with each other. A parting line PL along which both pad materials 41A and 46 face and contact each other is extended from around the boundary between the lower posterior thigh contact portion $PSc_1$ and the posterior knee contact portion $PSc_2$ and is inclined downward toward the rear. Specifically, in the region of the lower posterior thigh contact portion $PSc_1$, the configuration is such that the thickness of the front portion of the pad material 41A changes to be smaller toward the front and that the thickness of the rear portion of the pad member 46 changes to be smaller toward the rear (or to be larger toward the bottom).

Thus, in the lower posterior thigh contact portion $PSc_1$, the upward support reaction force $fb_1$ is obtained in a rear side of the front portion of the pad material 41A while the upward support reaction force $fb_2$ smaller than the upward support reaction force $fb_1$ is obtained in a front side of the front portion, due to the change in the thickness of the front portion. On the other hand, the forward support reaction force $fc_1$ is obtained from the posterior lower leg contact portion $PSc_3$ while the forward support reaction force $fc_2$ slightly greater than the forward support reaction force $fc_1$ is obtained from the posterior knee contact portion $PSc_2$, due to the change, in the front-rear direction, in the thickness of the rear portion of the pad material 46.

As described above, in the third modified example, the above reaction force characteristics of the low stiffness region PSc are obtained by: forming the front part 2f of the seat cushion 2 by using the pad material 46 having a smaller spring constant than the pad material 41A used in the rear part 2g; and extending the parting line PL, along which the pad material 46 of the front part 2f of the seat cushion 2 and the pad material 41A of the rear part 2g face and contact each other, from around the boundary between the lower posterior thigh contact portion $PSc_1$ and the posterior knee contact portion $PSc_2$ and inclining the parting line PL downward toward the rear. Thus, according to this modified example, reaction force characteristics similar to the second modified example can be imparted easily to the low stiffness region PSc of the front part 2f of the seat cushion 2 by changing the shapes of the connected portions of the pad material 41A and the pad material 46. Moreover, the change in the support reaction forces in the range from the lower posterior thigh contact portion $PSc_1$ to the posterior knee contact portion $PSc_2$ can be made gentler by extending the parting line PL from around the boundary between the lower posterior thigh contact portion $PSc_1$ and the posterior knee contact portion $PSc_2$ and inclining the parting line PL downward toward the rear. Thus, the seating comfort in the range from the lower posterior thighs to the posterior knees of the occupant D can be improved further, thereby making it possible to further improve the seating quality.

Moreover, according to this modified example, the front part 2f of the seat cushion 2 is formed by the single pad material 46. Thus, the reaction force characteristics of the low stiffness region PSc can be obtained advantageously in terms of cost.

FIG. 20 shows a fourth modified example of this embodiment. In this modified example, a single pad material 46 similar to that in the third modified example is used as the pad material 41B used in the low stiffness region PSc of the front part 2f of the seat cushion 2.

Meanwhile, a load receiving member 48 projecting upward is arranged in the low stiffness region PSc on a front portion of the seat cushion base member 47.

The load receiving member 48 is made of an appropriate synthetic resin material or light metal material formed into a substantially channel cross-sectional shape and is disposed within the low stiffness region PSc in front of the boundary between the high stiffness region PHc and the low stiffness region PSc.

An upper wall and a front wall of the load receiving member 48 are formed as suitably inclined surfaces. In the lower posterior thigh contact portion $PSc_1$, inclination of the upper wall of the load receiving member 48 is used to adjust the thickness, in the vertical direction, of the pad material 46 on an upper surface side of the load receiving member 48. Moreover, in the posterior lower leg contact portion $PSc_3$ and the posterior knee contact portion $PSc_2$, inclination of the front wall of the load receiving member 48 is used to adjust the thickness, in the front-rear direction, of the pad material 46 on a front surface side of the load receiving member 48.

Thus, in the lower posterior thigh contact portion $PSc_1$, the upward support reaction force $fb_1$ is obtained in a rear side of the pad material 46 while the upward support reaction force $fb_2$ smaller than the upward support reaction force $fb_1$ is obtained in a front side of the pad material 46, due to the adjustment of the thickness of the pad material 46 in the vertical direction. On the other hand, the forward support reaction force $fc_1$ is obtained from the posterior lower leg contact portion $PSc_3$ while the forward support reaction force $fc_2$ slightly greater than the forward support reaction force $fc_1$ is obtained from the posterior knee contact portion $PSc_2$, due to the adjustment of the thickness of the pad material 46 in the front-rear direction.

In the fourth modified example, as described above, the above-described reaction force characteristics of the low stiffness region PSc are obtained by: forming the front part 2f of the seat cushion 2 by using the pad material 46 with a smaller spring constant than the pad material 41A used in the rear part 2g; arranging the upwardly projecting load receiving member 48 in the low stiffness region PSc on the front portion of the seat cushion base member 47; and adjusting the thickness of the pad material 46 of the front part 2f of the seat cushion 2 on the upper surface side and the front surface side of the load receiving member 48. Thus, according to the fourth modified example, the thickness of the pad material 46 can be adjusted by appropriately adjusting the shape of the load receiving member 48. Accordingly, the change in the support reaction forces in the range from the lower posterior thigh contact portion $PSc_1$ to the posterior knee contact portion $PSc_2$ can be adjusted freely, thereby making it possible to further improve the seating comfort in the range from the lower posterior thighs to the posterior knees of the occupant D.

FIG. 21 shows a fifth modified example of this embodiment. In this modified example, a spring mechanism 49 capable of retreating in response to a seating load applied from the front, i.e. a load from the posterior lower legs is arranged on the front surface of the load receiving member 48 in the fourth modified example.

The spring mechanism 49 includes: a movable plate 49a disposed facing the region of the posterior lower leg contact portion $PSc_3$; an advance-retreat guide 49 for the movable plate 49a provided on a front surface of the load receiving member 48; and a set spring 49c elastically set therebetween.

Thus, in the lower posterior thigh contact portion $PSc_1$, the upward support reaction force $fb_1$ is obtained in the rear side of the pad material 46 while the upward support reaction force $fb_2$ smaller than the upward support reaction force $fb_1$ is obtained in the front side of the pad material 46, due to the adjustment of the thickness of the pad material 46 in the vertical direction. On the other hand, in the posterior lower leg contact portion $PSc_3$, the forward support reaction force $fc_1$ is obtained by the spring mechanism 49 which retreats in response to a load from the posterior lower legs. Thus, in the posterior knee contact portion $PSc_2$, obtained is the forward support reaction force $fc_1$ slightly greater than the support reaction force obtained by the adjustment of the thickness of the pad material 46.

In the fifth modified example, as described above, the above-described reaction force characteristics of the low stiffness region PSc are obtained by: forming the front part 2f of the seat cushion 2 by using the pad material 46 with a smaller spring constant than the pad material 41A used in the rear part 2g; arranging the upwardly projecting load receiving member 48 in the low stiffness region PSc on the front portion of the seat cushion base member 47; adjusting the thickness of the pad material 46 of the front part 2f of the seat cushion 2 on the upper surface side and the front surface side of the load receiving member 48; and providing, on the front surface of the load receiving member 48, the spring mechanism 49 capable of retreating in response to a seating load applied from the front. Thus, according to the fifth modified example, by appropriately adjusting the spring constant of the spring mechanism 49, it is possible to obtain a greater support reaction force than the support reaction obtained by simply adjusting the thickness of the pad material 46. Accordingly, the change in the support reaction forces in the range from the lower posterior thigh contact portion $PSc_1$ to the posterior knee contact portion $PSc_2$ can be adjusted more freely.

FIGS. 22 and 23 show other modified examples of the cushion pad 41.

Both of the modified examples shown in FIGS. 22 and 23 use, as the cushion pad 41, a single pad material 41A set to have a standard spring constant required for the aforementioned general vehicle seat cushion. Moreover, the low stiffness region PSc is formed in the front part 2f of the seat cushion 2 with a hollow portion(s) 50 provided in a front part of the pad material 41A, while the rear part 2g is set as the high stiffness region PHc.

In a sixth modified example shown in FIG. 22, multiple vertical slits 50A extending in the vehicle width direction are provided side by side in the front-rear direction in the region of the posterior lower leg contact portion $PSc_3$ of the pad material 41A to reduce the hardness of the front part of the pad material 41A and thereby form the low stiffness region PSc.

The vertical slits 50A are designed to change the hardness of the pad material 41A in the vertical direction and the front-rear direction through adjustment of their lengths, positions in the vertical direction and the like. In the sixth modified example, the lengths, positions in the vertical direction and the like of the vertical slits 50A are adjusted so as to obtain the forward support reaction force $fc_1$ from the posterior lower leg contact portion $PSc_3$ and obtain the forward support reaction force $fc_2$ slightly greater than the forward support reaction force $fc_1$ from the posterior knee contact portion $PSc_2$.

Moreover, in the sixth modified example, the vertical slits 50A extend to a middle portion of the pad material in the front side of the lower posterior thigh contact portion $PSc_1$. Thus, obtained in the rear side of the lower posterior thigh contact portion $PSc_1$ is the upward support reaction force $fb_1$ which is uniquely determined by the spring constant of the pad material 41A; obtained in the front side is the upward support reaction force $fb_2$ which is slightly smaller than the upward support reaction force $fb_1$.

As described above, in the sixth modified example, the multiple vertical slits 50A extending in the vehicle width direction are provided side by side in the front-rear direction in the region of the posterior lower leg contact portion $PSc_3$ of the pad material 41A. Thus, it is possible to reduce the weight of the seat cushion 2 and also to further smoothen the change in the support reaction forces in the range from the lower posterior thigh contact portion $PSc_1$ to the posterior knee contact portion $PSc_2$. Moreover, since the cushion pad 41 can be formed of the single pad material 41A in this modified example, the above-described reaction force characteristics can be obtained advantageously in terms of cost.

In a seventh modified example shown in FIG. 23, a cavity 50B is provided along the vehicle width direction in the region of the posterior lower leg contact portion $PSc_3$ of the pad material 41A to reduce the hardness of the front part of the pad material 41A and thereby form the low stiffness region PSc.

The cavity 50B is designed to change the hardness of the pad material 41A in the vertical direction and the front-rear direction through adjustment of its cross-sectional shape, cross-sectional area, positions in the vertical and front-rear directions and the like. In the seventh modified example, the cross-sectional shape, cross-sectional area, positions in the vertical and front-rear directions and the like of the cavity 50B are adjusted so as to obtain the upward support reaction forces $fb_1$ and $fb_2$ from the lower posterior thigh contact portion $PSc_1$ and obtain the forward support reaction forces $fc_1$ and $fc_2$ from the posterior lower leg contact portion $PSc_3$ and the posterior knee contact portion $PSc_2$.

As described above, in the seventh modified example, the cavity 50B is provided along the vehicle width direction in the region of the posterior lower leg contact portion $PSc_3$ of the pad material 41A. Thus, it is possible to obtain the above-described reaction force characteristics while further reducing the weight of the seat cushion 2. Moreover, since the cushion pad 41 can be formed of the single pad material 41A in this modified example as well, the reaction force characteristics can be obtained advantageously in terms of cost.

Note that the structure of the cushion pad is not limited to the instances shown in this embodiment and its modified examples. The structure of the cushion pad only needs to be a design in which the low stiffness region PSc is present in the front part $2f$ of the seat cushion 2 and which offers reaction force characteristics imparting such directional properties that the support reaction forces thereof are large in the vertical direction and small in the front-rear direction.

In the sixth and seventh modified examples, as described above, the seat cushion 2 is formed by using the single pad material 41A, and the hollow portion(s) 50 (50A, 50B) is provided in the front part of the pad material 41A to form the low stiffness region PSc of the cushion 2 and also to obtain the above-described reaction force characteristics in the low stiffness region PSc. Thus, by appropriately adjusting the cross-sectional shape, cross-sectional area, positions in the vertical and front-rear directions and the like of the hollow portion(s) 50 provided in the pad material 41A, it is possible to set more freely the change in the support reaction forces in the range from the lower posterior thigh contact portion $PSc_1$ to the posterior knee contact portion $PSc_2$.

Forth Embodiment

With reference to FIGS. 24 and 25, description is given of a vehicle seat 1 for rear seat according to a fourth embodiment of the present invention.

As in the case of the first embodiment, as shown in FIG. 24, the vehicle seat 1 of this embodiment includes a front part $2f$ of a seat cushion 2 as a low stiffness region PSc and a rear part $2g$ thereof as a high stiffness region PHc. Moreover, as in the case of the third embodiment, the low stiffness region PSc of the seat cushion 2 is given reaction force characteristics of having a large support reaction force fb for a seating load applied from the above and a small support reaction force fc for a seating load applied from the front.

Moreover, as in the case of the second embodiment, as shown in FIGS. 24 and 25, in a seat back 3, a low stiffness region PSb having a small support reaction force $fa_1$ for an occupant D is set in the center portion in the vertical direction thereof. High stiffness regions $PHb_1$ and $PHb_2$ each having a large support reaction force $fa_2$ for the occupant D are set, adjacent to the low stiffness region PSb in the vertical direction, in upper and lower portions of the seat back 3. Thus, the seat back 3 is provided with a stiffness distribution having different reaction force characteristics in the vertical direction.

Thus, a backrest surface $3a$ of the seat back 3 can be bent in the middle at the foregoing low stiffness region PSb at any of various middle bend angles, in a shallow V shape in the side view, for example, according to a backrest load of the occupant D.

In this embodiment, as shown in FIG. 25, the high stiffness region $PHb_1$ in the upper portion of the seat back 3 is formed to approximately correspond to a chest Da of the occupant D, and the high stiffness region $PHb_2$ in the lower portion thereof is formed to approximately correspond to a pelvis Dc of the occupant D. On the other hand, the low stiffness region PSb in the center portion of the seat back is formed to have a required vertical width dimension having its center at a body part of the occupant D corresponding to the vicinity of the joints of the chest Da and a waist Db, i.e., the tenth thoracic vertebra $Da_1$ to the twelfth thoracic vertebra $Da_2$. In the low stiffness region PSb, the backrest surface $3a$ can be bent in the middle at a vertical center position $PS_0$ of the low stiffness region PSb as a bend point BP, in response to the backrest load.

When the occupant D leans on the seat back 3 and the backrest surface $3a$ is bent in the middle in the shallow V shape in the side view, the support reaction force fa ($fa_1$ and fa$_2$) gets larger in the downward direction from the center to the lower end portion of the backrest surface 3a. Thus, the pelvis Dc can be particularly supported. Similarly, the support reaction force fa (fa$_1$ and fa$_2$) gets larger in the upward direction from the center to the upper end portion of the backrest surface 3a. Thus, the chest Da can be firmly supported.

In summary, the fourth embodiment is an example where the stiffness distribution in the second embodiment is imparted to the seat back 3 in the vehicle seat 1 of the first embodiment, and the reaction force characteristics in the third embodiment are imparted to the front part 2f of the seat cushion 2.

As in the case of the first embodiment, the vehicle seat 1 according to this embodiment includes the front part 2f of the seat cushion 2 as the low stiffness region PSc and the rear part 2g thereof as the high stiffness region PHc. Thus, as in the case of the first embodiment, an HP guide function, a space expansion function and an HP shift prevention function can be exerted for the series of actions taken by the occupant D for seating described in the first embodiment.

<HP Guide Function>

More specifically, as in the case of the first embodiment, the vehicle seat 1 according to this embodiment includes the front part 2f of the seat cushion 2 as the low stiffness region PSc and the rear part 2g thereof as the high stiffness region PHc. This structure, as in the case of the first embodiment, suppresses the resistance to the series of actions (particularly, backward movement and turnaround of the occupant D on the seat cushion 2) taken by the occupant D after getting into the rear seat until the completion of the turnaround, thereby easily guiding a hip point HP of the occupant D to an optimum position.

Moreover, in the vehicle seat 1 according to this embodiment, the low stiffness region PSc of the seat cushion 2 is given the reaction force characteristics of having the large support reaction force fb for the seating load applied from the above and the small support reaction force fc for the seating load applied from the front. Thus, even in the case where the seating load applied from the above is relatively large, such as when the occupant D is a large-build person, a downward sinking amount of the front part 2f of the seat cushion 2 is suppressed, thereby more stably supporting the lower posterior thighs. Moreover, in the case where the occupant D is a small-build person (or is a large-build person), the front part 2f is flexibly deformed in response to the seating load applied from the front due to contact of the knees or the lower legs therewith. Thus, the resistance to the movement or turnaround of the occupant D on a seating surface 2a is surely reduced.

Further, in the vehicle seat 1 according to this embodiment, as described above, the stiffness distribution including the high stiffness region PHb$_1$, the low stiffness region PSb and the high stiffness region PHb$_2$, which have different reaction force characteristics in the vertical direction of the seat back 3, is imparted. Thus, the backrest surface 3a of the seat back 3 can be bent in the middle according to the backrest load of the occupant D. Accordingly, the back of the occupant D leaning back on the seat back 3 is gently curved to protrude backward. As a result, the occupant D can more easily move the hip backward, and guide the hip point HP to the optimum position. Particularly, in the vehicle seat 1 according to this embodiment, the backrest surface 3a of the seat back 3 is bent in the middle at the middle bend angle which allows a comfortable posture most suitable for the body size of the occupant D by the automatic adjustment function for the middle bend angle described in the second embodiment. Thus, regardless of the body size, the occupant D can more easily move the hip backward, and surely guide the hip point HP to the optimum position.

Moreover, when the occupant D makes final adjustments on the position of the hip point HP, the occupant D may adjust the hip position by pushing the floor surface with his/her legs while pressing the back against the backrest surface 3a of the seat back 3. In this event, a reaction force from the high stiffness region PHb$_1$ in the upper portion of the backrest surface 3a acts on the back of the occupant D. However, in the vehicle seat 1 according to this embodiment, as described above, the stiffness distribution having different reaction force characteristics in the vertical direction of the seat back 3 is imparted. Thus, the backrest surface 3a of the seat back 3 can be bent in the middle according to the backrest load of the occupant D. Accordingly, a downward component is added to the reaction force acting on the back of the occupant D from the high stiffness region PHb$_1$ of the backrest surface 3a. Thus, the occupant D can readily support his/her own body with his/her back and legs during the hip position adjustment. As a result, the occupant D can more easily move the hip point HP to the optimum position.

As described above, the vehicle seat 1 according to this embodiment can handle variations in the body size of the occupant D. Thus, it is possible to more securely achieve the HP guide function for the series of actions taken by the occupant D for seating in the vehicle seat 1.

<Space Expansion Function>

Further, as in the case of the first embodiment, in the vehicle seat 1 according to this embodiment, the low stiffness region PSc is provided in the front part 2f of the seat cushion 2, and the low stiffness region PSc can be deformed with a relatively small load. Thus, the occupant D can position the hip further backward on the seating surface 2a. As a result, an actual foot space of the vehicle seat 1 is expanded.

Moreover, in the final adjustment of the position of the hip point HP, the occupant D may shift the position of the hip point HP with the load of the hip reduced by pushing the floor surface with the legs while pressing the back against the backrest surface 3a of the seat back 3. In the vehicle seat 1 according to this embodiment, the low stiffness region PSc is provided in the front part 2f of the seat cushion 2, and the low stiffness region PSc is deformed with a relatively small load. Thus, the occupant D can easily stretch his/her legs when pushing the floor surface with the legs.

Further, in the vehicle seat 1 according to this embodiment, the low stiffness region PSc of the seat cushion 2 is given the reaction force characteristics of having the large support reaction force fb for the seating load applied from the above and the small support reaction force fc for the seating load applied from the front. Thus, even in the case where the seating load applied from the above is relatively large, such as when the occupant D is a large-build person, the downward sinking amount of the front part 2f of the seat cushion 2 is suppressed, thereby stably supporting the lower posterior thighs. Moreover, in the case where the occupant D is a small-build person, the front part 2f is flexibly deformed in response to the seating load applied from the front. Thus, the foot space can be surely secured.

Moreover, in the vehicle seat 1 according to this embodiment, the high stiffness region PHc is provided in the rear part 2g of the seat cushion 2, and the resistance to the backward movement of the occupant D is suppressed. Thus, the hip of the occupant D is readily guided backward along the seating surface 2a, and the occupant D is readily guided to a knee-bent posture. Accordingly, a knee room positioned in front of the knees of the occupant D is secured at an early stage after the start of the seating action. As a result, an effect that is equivalent to actually expanding a knee room can be achieved.

Further, in the vehicle seat 1 according to this embodiment, the stiffness distribution having different reaction force characteristics in the vertical direction of the seat back 3 is imparted. Accordingly, the backrest surface 3a of the seat back 3 can be bent in the middle according to the backrest load of the occupant D. Thus, the size of the space in front of the backrest surface 3a can be changed automatically based on the body size of the occupant D. In other words, the backrest surface 3a receives the back of the occupant D arriving after moving backward along with the movement of the hip on the seating surface 2a, while bending by a middle bend amount according to the body size of the occupant D. Therefore, in the vehicle seat 1 according to this embodiment, even when a large-build person is seated, for example, the backrest surface 3a does not hinder the backward movement of the hip. As a result, smooth backward movement of the hip can be more surely realized. Thus, the knee room of the occupant D is secured at an earlier stage after the start of the seating action, and an actual knee room expansion effect can be more surely achieved.

Moreover, in the vehicle seat 1 according to this embodiment, the backrest surface 3a of the seat back 3 is bent in the middle at the middle bend angle which allows a comfortable posture most suitable for the body size of the occupant D by the automatic adjustment function for the middle bend angle described in the second embodiment. Accordingly, the occupant D can obtain a comfortable posture most suitable for his/her body size just by leaning back on the seat back 3. Thus, a feeling of spaciousness the occupant D experiences, regardless of the body size, is improved.

As described above, the vehicle seat 1 according to this embodiment can handle variations in the body side of the occupant D. Thus, it is possible to more securely achieve the space expansion function for the series of actions taken by the occupant D for seating in the vehicle seat 1.

<HP Shift Prevention Function>

As in the case of the first embodiment, the vehicle seat 1 according to this embodiment includes the front part $2f$ of the seat cushion 2 as the low stiffness region PSc and the rear part $2g$ thereof as the high stiffness region PHc, and the stiffness of the cushion pad below the hip of the occupant D is higher. Thus, even when the load applied to the seating surface 2a by the occupant D is changed by the movement of the occupant D himself/herself, vibration of the vehicle generated during running, and the like, variations in the sinking amount of the cushion pad are suppressed. As a result, a positional shift in the hip point HP is more surely prevented.

Moreover, the occupant D is in the knee-bent posture while seated in the vehicle seat 1, and the gravity center thereof is closer to the back side. Thus, the hip of the occupant D tends to slide further backward. In the vehicle seat 1 according to this embodiment, the high stiffness region PHc is provided in the rear part $2g$ of the seat cushion 2, thus reducing the resistance to the backward movement of the occupant D on the seating surface 2a. Accordingly, the hip of the occupant D is likely to slide further backward. Meanwhile, the vehicle seat 1 includes the seat back 3, and the hip trying to move further backward is received from the back by the seat back 3. Thus, the hip of the occupant D is stably held at a position where the backward sliding force and the forward pressing force of the seat back 3 are balanced with each other. As a result, the positional shift in the hip point HP is more surely prevented. Particularly, as described above, in the vehicle seat 1 according to this embodiment, the high stiffness region $PHb_2$ having a large support reaction force $fa_2$ for the occupant D is set in the lower portion of the seat back 3. Thus, the hip trying is received more surely from the back by the high stiffness region $PHb_2$. As a result, the positional shift in the hip point HP can be more surely prevented. Further, in the vehicle seat 1 according to this embodiment, the low stiffness region PSc of the seat cushion 2 is given the reaction force characteristics of having the large support reaction force fb for the seating load applied from the above and the small support reaction force fc for the seating load applied from the front. Thus, even in the case where the seating load applied from the above is relatively large, such as when the occupant D is a large-build person, the downward sinking amount of the front part $2f$ of the seat cushion 2 is suppressed, thereby more stably supporting the lower posterior thighs. Moreover, in the case where the occupant D is a small-build person, a reaction force for the seating load applied from the front is small. Thus, the positional shift in the hip point HP can be more surely prevented.

Further, in the seating surface 2a of the vehicle seat 1, as described above, a rearward inclined surface is formed in front of a region right below the hip by a load applied therefrom in seating. Thus, the seating surface 2a has a maximum deformation part LP between the rearward inclined surface and the backrest surface 3a of the seat back 3. The vehicle seat 1 according to this embodiment supports the pelvis Dc of the occupant D with the maximum deformation part LP, and thus the pelvis Dc is stably held in a constant posture. Thus, the positional shift in the hip point HP is more surely prevented.

Further, in the vehicle seat 1 according to this embodiment, as described above, the stiffness distribution having different reaction force characteristics in the vertical direction of the seat back is imparted. Thus, the backrest surface 3a of the seat back 3 can be bent in the middle according to the backrest load of the occupant D. Accordingly, a downward component is added to the reaction force acting on the back of the occupant D from the high stiffness region $PHb_1$ of the backrest surface 3a. The downward component to press the hip of the occupant D in a seated state against the seating surface 2a. Thus, the positional shift in the hip point HP of the occupant in the seated state is more surely prevented.

As described above, the vehicle seat 1 according to this embodiment can handle variations in the body size of the occupant D. Thus, it is possible to more securely achieve the HP shift prevention function for the series of actions taken by the occupant D for seating in the vehicle seat 1.

In summary, in addition to the configuration of the first embodiment, the vehicle seat 1 of the fourth embodiment is configured as follows. The low stiffness region PSb having a small support reaction force $fa_1$ of the occupant D is set in the vertical center portion of the seat back 3. Moreover, the high stiffness regions $PHb_1$ and $PHb_2$ having a large support reaction force $fa_2$ of the occupant D are set in the upper and lower portions of the seat hack 3 so as to be adjacent to the low stiffness region PSb. Thus, the stiffness distribution having different reaction force characteristics in the vertical direction of the seat back 3 is imparted. Accordingly, the backrest surface 3a of the seat back 3 can be bent in the middle at the low stiffness region PSb at any of various middle bend angles. Further, the low stiffness region PSc of the seat cushion 2 is given the reaction force characteristics of having the large support reaction force fb for the seating load applied from the above and the small support reaction force fc for the seating load applied from the front. Thus, vehicle seat 1 according to this embodiment handles variations in the body size of the occupant D regardless of whether the occupant D is large or small. Accordingly, the HP guide function, the space expansion function and the HP shift prevention function can be simultaneously achieved more surely during the series of actions taken by the occupant D for seating in the vehicle seat 1.

Further, since having a configuration similar to those of the first to third embodiments, the fourth embodiment can, of course, achieve operations and effects similar to the operations and effects of the first to third embodiments, such as the automatic adjustment mechanism for the middle bend angle of the seat back. However, description thereof is omitted herein to avoid redundancy.

The above has shown the example where the HP guide function, the space expansion function and the HP shift prevention function can be simultaneously achieved during the series of actions taken by the occupant D for seating in the vehicle seat 1, by imparting a predetermined stiffness distribution to the seat cushion 2 and/or the seat back 3. However, the above three functions can be simultaneous achieved also by: imparting the above-mentioned predetermined stiffness distribution to the seat cushion 2 and/or the seat back 3; and then adjusting some other mechanical properties (stiffness, friction coefficient, shape, etc.) of the seat cushion 2 and/or the seat back 3.

Specifically, it is possible to set the front part 2f of the seat cushion 2 as the low stiffness region PSc and the rear part 2g thereof as the high stiffness region PHc, as in the case of the first embodiment, and then adjust some other mechanical properties of the seat cushion 2 and/or the seat back 3. For example, the seating surface 2a of the seat cushion 2 may be such that adjacent portions of the seating surface 2a differ from each other in at least one of stiffness, friction coefficient and shape. Moreover, the backrest surface 3a of the seat back 3 may be such that adjacent portions of the backrest surface 3a differ from each other in at least one of stiffness, friction coefficient and shape.

The contact region between the seating surface 2a and/or the backrest surface 3a and the occupant D moves over the seating surface 2a and/or the backrest surface 3a while continuously changing its contact area, along the series of actions by the occupant D for seating in the vehicle seat 1. Thus, if the above-described mechanical properties of the seating surface 2a and/or the backrest surface 3a are set such that adjacent portions of the seating surface 2a and/or the backrest surface 3a differ from each other in the mechanical properties, the force acting on the occupant D from the contact region can be changed continuously or stepwise along the series of actions taken by the occupant D, for example. Particularly, the mechanical properties of the seating surface 2a may be set so as to change continuously or stepwise over portions of the seating surface 2a adjacent to each other in the front-rear direction. In this way, it is possible to further improve the comfort the occupant D experiences while the hip of the occupant D is moving on the seating surface 2a in the front-rear direction, i.e. while the vehicle seat 1 is exerting the HP guide function. Moreover, the mechanical properties of the backrest surface 3a may be set so as to change continuously or stepwise over portions of the backrest surface 3a adjacent to each other in the vertical direction. In this way, it is possible to further improve the comfort the occupant D experiences when the occupant D leans back on the seat back 3 or when the occupant D presses his/her back against the backrest surface 3a to adjust the position of the hip point HP. Furthermore, the mechanical properties of the seating surface 2a and/or the backrest surface 3a may be set so as to change continuously or stepwise over portions of the seating surface 2a and/or the backrest surface 3a adjacent to each other in the left-right direction. In this way, it is possible to further improve comfortability in seating and also to adjust hold performance on the hip and the chest Da.

The following properties are possible as the mechanical properties of the seat cushion 2 and/or the seat back 3 to be adjusted, for example.

(a) Portions of the seat cushion 2 adjacent to each other in the front-rear direction (front portion, center portion, rear portion, etc.) are made different from each other in stiffness or reaction force characteristics to impart a stiffness distribution to the seat cushion 2 in the front-rear direction.

(b) Portions of the seat back 3 adjacent to each other in the vertical direction (upper portion, center portion, lower portion, etc.) are made different from each other in stiffness or reaction force characteristics to impart a stiffness distribution to the seat back 3 in the vertical direction.

(c) Portions of the seating surface 2a of the seat cushion 2 adjacent to each other in the front-rear direction (front portion, center portion, rear portion, etc.) are made different from each other in friction coefficient to impart a friction coefficient distribution to the seating surface 2a of the seat cushion 2 in the front-rear direction.

(d) Portions of the backrest surface 3a of the seat back 3 adjacent to each other in the vertical direction (upper portion, center portion, lower portion, etc.) are made different differ from each other in friction coefficient to impart a friction coefficient distribution to the backrest surface 3a of the seat back 3 in the vertical direction.

(e) Portions of the seating surface 2a of the seat cushion 2 adjacent to each other in the front-rear direction (front portion, center portion, rear portion, etc.) are made different from each other in shape (inclination angle, curvature, etc.).

(f) Portions of the backrest surface 3a of the seat back 3 adjacent to each other in the vertical direction (upper portion, center portion, lower portion, etc.) are made different from each other in shape (inclination angle, curvature, etc.).

Here, the following combinations are possible as combinations of the properties to be adjusted. First, there are a total of six cases in which only one of the properties (a) to (f) is employed. Moreover, it is possible to employ a combination of two properties among the properties (a) to (f), in which case there are a total of 15 cases in which the combination is employed. Further, it is possible to employ a combination of three properties among the properties (a) to (f), in which case there are a total of 20 such cases. There are a total of 15 cases in which a combination of four properties among the properties (a) to (f) is employed. There are a total of six ways in which a combination of five properties is employed. It is also possible to employ the combination of all the properties (a) to (f) to obtain the effect of simultaneously achieving the three functions described above. In sum, there are a total of 63 combinations of the properties to be adjusted.

Among them, a case employing (a) on the assumption that the front part 2f of the seat cushion 2 is the low stiffness region PSc and that the rear part 2g thereof is the high stiffness region PHc is the third embodiment. Moreover, cases employing combinations of (a) and (b) with the stiffness distribution of the seat cushion 2 are the second and fourth embodiments.

As a representative example of the remaining combinations in the 63 cases, a case employing (e) (or (f)) on the assumption that the front part 2f of the seat cushion 2 is the low stiffness region PSc and that the rear part 2g thereof is the high stiffness region PHc is described below as a fifth embodiment. Moreover, a case employing a combination of (c) with the stiffness distribution of the seat cushion 2 is described as a sixth embodiment, and a case employing a combination of (c) and (d) is described as a modified example of the sixth embodiment. Similarly, a case employing a combination of (e) with the stiffness distribution of the seat cushion 2 is described as a seventh embodiment, and a case employing a combination of (e) and (f) is described as a modified example of the seventh embodiment. A case employing a combination of the four properties (c) to (f) is described as an eighth embodiment.

Fifth Embodiment

With reference to FIGS. 26 to 29, description is given of a vehicle seat 1 for rear seat according to a fifth embodiment of the present invention. This embodiment is an example in which an inclined surface 71 to be described below is provided in the vehicle seat 1 of the first embodiment.

As shown in FIG. 26, the vehicle seat 1 according to this embodiment includes the inclined surface 71 configured to support the hip of an occupant D in a corner region δ where a seating surface 2a of a seat cushion 2 and a backrest surface 3a of a seat back 3 are joined to each other.

As shown in FIGS. 26 and 27, an intersection A between the inclined surface 71 and the seating surface 2a of the seat cushion 2 is set at a position slightly behind the ischial tuberosity $Dc_1$ in the pelvis Dc of the occupant D. Moreover, an intersection B between the inclined surface 71 and the backrest surface 3a of the seat back 3 is set at a position corresponding to the vicinity of the sacrum $Dc_2$ in the pelvis Dc of the occupant D. Specifically, as shown in FIG. 27, a distance $\delta_1$ from an intersection C between an extended line of the seating surface 2a and an extended line of the backrest surface 3a to the intersection A in a side view of the corner region δ is preferably set to a value smaller than ⅙ of the length $L_1$ from the intersection C to a front end of the seat cushion 2 ($\delta_1 < L_1/6$). Moreover, a distance $\delta_2$ from the intersection C to the intersection B is preferably set to a value smaller than ⅕ of the length $L_2$ from the intersection C to an upper end of the seat back 3 ($\delta_2 < L_2/5$).

In addition, as shown in FIG. 27, an inclination angle $\theta_1$ (angle of the inclined surface 71 to a horizontal plane) of the inclined surface 71 is set to be smaller than an inclination angle $\theta_2$ of the backrest surface 3a (angle of the backrest surface 3a to the horizontal plane).

As in the case of the first embodiment, the vehicle seat 1 according to this embodiment includes a front part 2f of the seat cushion 2 as a low stiffness region PSc and a rear part 2g thereof as a high stiffness region PHc. Thus, as in the case of the first embodiment, an HP guide function, a space expansion function, and an HP shift prevention function can be exerted for the series of actions taken by the occupant D for seating which is described in the first embodiment.

<HP Guide Function>

The vehicle seat 1 according to this embodiment includes the inclined surface 71 configured to support the hip of the occupant D in the corner region δ where the seating surface 2a of the seat cushion 2 and the backrest surface 3a of the seat back 3 are joined to each other. Thus, when the occupant D is seated on the seat cushion 2, the hip of the occupant D comes into contact with the inclined surface 71 in the corner region δ and is guided to the optimum position by the inclined surface 71. This prevents the position of the hip from varying every time the occupant D is seated.

<Space Expansion Function>

The vehicle seat 1 according to this embodiment includes the inclined surface 71 configured to support the hip of the occupant D in the corner region δ and the inclined surface 71 supports a back surface of the pelvis Dc of the occupant D. Thus, backward rotation of the pelvis Dc is suppressed even in a long-hour drive. This prevents reduction in a knee room in front of the knees, which might otherwise occur if the hip of the occupant D shifts forward and the occupant D loses the seating posture. The knee room in front of the knees is restricted to be small particularly in the rear seat. However, a large knee room can be secured by the effect of suppressing the frontward and a comfortable seating posture for the occupant D can be also obtained. Hence, fatigue of the occupant D can be reduced.

<HP Shift Prevention Function>

In the vehicle seat 1 according to this embodiment, the high stiffness region PHc is provided in the rear part 2g of the seat cushion 2, thereby reducing the resistance to the rearward movement of the occupant D on the seating surface 2a. Accordingly, the hip of the occupant D in the knee-bent posture tends to slide further rearward. However, the vehicle seat 1 according to this embodiment includes the inclined surface 71 configured to support the hip of the occupant D in the corner region S. Thus, the entire pelvis Dc of the hip which tends to move further rearward can be received from the rear side and surely supported by the inclined surface 71. Hence, a positional shift in the hip point HP can be more surely prevented.

As described above, in the seating surface 2a of the vehicle seat 1, a rearward inclined surface is formed in front of a region right below the hip by the seating load. The seating surface 2a has a maximum deformation part LP between the rearward inclined surface and the backrest surface 3a of the seat back 3. The vehicle seat 1 according to this embodiment includes the inclined surface 71 configured to support the hip of the occupant D in the corner region δ and the pelvis Dc of the occupant D is supported by the inclined surface 71 and the maximum deformation part LP. Accordingly, the pelvis Dc is stably held in a constant posture. As a result, the positional shift in the hip point HP is more surely prevented.

Moreover, in the embodiment, the intersection A between the inclined surface 71 and the seating surface 2a of the seat cushion 2 is set at a position slightly behind the ischial tuberosity $Dc_1$ in the pelvis Dc of the occupant D. Accordingly, the hip of the occupant D can be prevented from being pushed forward by the inclined surface 71. Meanwhile, the intersection B between the inclined surface 71 and the backrest surface 3a of the seat back 3 is set at the position corresponding to the vicinity of the sacrum $Dc_2$ in the pelvis Dc of the occupant D. Accordingly, the entire pelvis Dc can be surely supported by the inclined surface 71. This improves the effect of suppressing the frontward shift of the hip of the occupant D and the collapse of seating posture can be more surely prevented.

Furthermore, the inclination angle of the inclined surface 71 is set to be smaller than the inclination angle of the backrest surface 3a. Accordingly, the inclined surface 71 surely acts on the pelvis Dc and the pelvis Dc of the occupant D is maintained at a posture rotated slightly backward. Hence, a comfortable seating posture for the occupant D is obtained and fatigue of the occupant D can be reduced.

In summary, in addition to the configuration of the first embodiment described above, the vehicle seat 1 of the fifth embodiment includes the inclined surface 71 configured to support the hip of the occupant D in the corner region δ where the seating surface 2a of the seat cushion 2 and the aforementioned backrest surface 3a of the seat back 3 are joined to each other. Accordingly, the function of guiding the hip of the occupant D to the optimum position and the frontward shift suppressing function of the pelvis supporting can be exerted more effectively and the HP guide function, the space expansion function, and the HP shift prevention function can be surely achieved during the series of actions taken by the occupant D for seating in the vehicle seat 1.

The vehicle seat 1 of the fifth embodiment includes the inclined surface 71 configured to support the hip of the occupant D in the corner region δ in addition to the configuration of the first embodiment described above. Accordingly, a stable seating posture having only a small collapse of the posture of the occupant D is achieved by the frontward shift suppressing function of the pelvis supporting by the inclined surface 71 and a good fatigue reducing effect can be thereby obtained.

FIG. 28 shows a first modified example of this embodiment. The modified example is an example in which the inclined surface 71 of the embodiment is applied to the fourth embodiment.

As shown in FIG. 28, in the vehicle seat 1 according to this embodiment, the front part 2f of the seat cushion 2 is set as the low stiffness region PSc and the rear part 2g is set as the high stiffness region PHc as in the case of the first embodiment. Moreover, as in the case of the third embodiment, the low stiffness region PSc of the seat cushion 2 is given reaction force characteristics of having a large support reaction force fb for a seating load applied from the above and a small support reaction force fc for a seating load applied from the front. Furthermore, as in the case of the second embodiment, in the seat back 3, a low stiffness region PSb having a small support reaction force $fa_1$ for the occupant D is set in a vertical center portion of the seat back 3 and high stiffness regions $PHb_1$ and $PHb_2$ having a large support reaction force $fa_2$ for the occupant D are set, adjacent to the low stiffness region PSb in the vertical direction, in upper and lower portions of the seat back 3. Thus, a stiffness distribution in which the reaction force characteristics vary in the vertical direction of the seat back 3 is imparted. Accordingly, the backrest surface 3a of the seat back 3 can be bent in the middle at the low stiffness region PSb described above, at various middle bend angles, in a shallow V shape in the side view, for example, according to backrest load of the occupant D.

In the embodiment, as shown in FIG. 28, the high stiffness region $PHb_1$ in the upper portion of the seat back 3 is formed to approximately correspond to the chest Da of the occupant D, and the high stiffness region $PHb_2$ in the lower portion is formed to approximately correspond to the pelvis Dc of the occupant D. Meanwhile, the low stiffness region PSb in the center portion of the seat back 3 is formed to have a required vertical width around a body part of the occupant D corresponding to the vicinity of the joints of the chest Da and the waist Db, i.e., the tenth thoracic vertebra $Da_1$ to the twelfth thoracic vertebra $Da_2$. In the low stiffness region PSb, the backrest surface 3a can be bent in the middle with the vertical center position $PS_0$ of the low stiffness region PSb as a bend point BP, with respect to the backrest load.

When the occupant D leans on the seat back 3 and the backrest surface 3a is bent in the middle in the shallow V shape in the side view, the support reaction force fa ($fa_1$ and $fa_2$) gets larger in the downward direction from the center to the lower end portion of the backrest surface 3a. Thus, the pelvis Dc can be particularly supported. Similarly, the support reaction force fa ($fa_1$ and $fa_2$) gets larger in the upward direction from the center to the upper end portion of the backrest surface 3a. Thus, the chest Da can be firmly supported.

Since the modified example has a configuration similar to those of the first to fifth embodiments described above, the operations and effects of these embodiments can be obtained simultaneously. Moreover, in the modified example, synergy of bending of the backrest surface 3a of the seat back 3 in the middle at an optimum angle according to the body size of the occupant D and the effect of suppressing the frontward of the hip from the optimum position on the seat cushion 2 is obtained in addition the operations and effects of the embodiments described above. Accordingly, it is possible to further obtain an effect of achieving seating stability and a comfortable seating quality regardless of whether the occupant is a small-build person or a large-build person.

FIG. 29 shows examples of configurations for the inclined surface 71 described above. Part (A) of FIG. 29 shows an example in which an inclination fulcrum P of the seat back 3 with respect to the seat cushion 2 is above the intersection B. A protruding portion 2A which has substantially the same thickness and width as the lower end of the seat back 3 and which protrudes upward is formed integral with a rear end portion of the seat cushion 2. The inclined surface 71 is formed by adjusting the shape of a pad material 41A on a front surface side of the protruding portion 2A.

In such a vehicle seat 1 that the rearward inclination angle of the seat back 3 is fixed which is common in many rear seats, the inclined surface 71 may be formed of a protruding portion 2A formed integral with either the seat cushion 2 or the seat back 3. Specifically, for example, the inclined surface 71 can be formed by shaping either the pad material 41A of the seat cushion 2 or a pad material (cushion pad) 15 of the seat back 3. Since the inclined surface 71 with relatively higher stiffness can be obtained in this configuration, the function of guiding the hip of the occupant D to the optimum position and the frontward shift suppressing function of the pelvis supporting can be exerted more effectively. Moreover, no major changes in structure and design of the seat cushion 2 and the seat back 3 are made in this configuration and the obtaining of the inclined surface 71 can be achieved advantageously in terms of cost.

Parts (B) and (C) of FIG. 29 each show an example in which the inclination fulcrum P is below the intersection B.

In the example shown in part (B) of FIG. 29, the inclined surface 71 is formed of an elastic band-shaped member 72 laid between the seating surface 2a of the seat cushion 2 and the backrest surface 3a of the seat back 3 across the corner region δ. An end portion of the elastic band-shaped member 72 on the intersection A side is tied and fixed by effective use of cushion wires in the seat cushion 2 and is stitched at a penetrating lead-out portion (intersection A) of the seating surface 2a. The elastic band-shaped member 72 penetrates the backrest surface 3a of the seat back 3 through a slit 73 provided at the intersection B and the other end portion of the elastic band-shaped member 72 is tied and fixed to the inclination fulcrum P. An intermediate portion of the elastic band-shaped member 72 is slidably supported near the slit 73 (near the intersection B) by effective use of a lower pad supporting member 16L of a pad supporting member 16 for example. By this configuration, both of the arrangement of the inclined surface 71 and the free inclination adjustment of the seat back 3 are achieved. Moreover, since an adjustment range of the angle of the seat back 3 is small in a reclining rear seat, the inclined surface 71 can be formed by stitching and fixing the elastic band-shaped member 72 to the seating surface 2a of the seat cushion 2 and the backrest surface 3a of the seat back 3 at the intersections A and B.

In this configuration example, the inclined surface 71 is formed of the elastic band-shaped member 72 laid between the seating surface 2a of the seat cushion 2 and the backrest surface 3a of the seat back 3 across the corner region δ. In this configuration, the stiffness of the inclined surface 71 can be controlled by adjusting the tension of the elastic band-shaped member 72. Accordingly, the function of guiding the hip of the occupant D to the optimum position and the frontward shift suppressing function of the pelvis supporting can be controlled easily on demand. Thus, it is possible to exert these functions more effectively. Moreover, no major changes in structure and design of the seat cushion 2 and the seat back 3 are made in this configuration and the obtaining of the inclined surface 71 can be achieved advantageously in terms of cost.

In the example shown in part (C) of FIG. 29, the inclined surface 71 is formed by disposing a shape retaining member 74 near a surface of the inclined surface 71 of the backrest surface 3a.

For example, the shape retaining member 74 is made of an appropriate synthetic resin and is formed in a wedge shape in the side view. The shape retaining member 74 can be moved parallel in the front-rear direction by moving means 75 which moves along with the inclination of the seat back 3. The moving means 75 is a rack-and-pinion mechanism including a pinion 75a arranged eccentric to the inclination fulcrum P and a rack 75b provided continuously with the shape retaining member 74 and meshing with the pinion 75a.

In the configuration example, as described above, the inclined surface 71 is formed by disposing the shape retaining member 74 near the surface of the inclined surface 71 of the backrest surface 3a and the shape retaining member 7 can be moved parallel in the front-rear direction by the moving means 75 which moves along with the inclination of the seat back 3. Accordingly, the inclined surface 71 can be disposed at the optimum position in the corner region δ according to the rearward inclination angle of the seat back 3. Thus, both of the inclination adjustment of the seat back 3 in a larger angle range and the optimum arrangement of the inclined surface 71 can be achieved. Although the rack-and-pinion mechanism described above is used as the moving means 75 in this example, the moving means 75 is not limited to this and a wire mechanism having a self-return function, a link mechanism, or the like may be selectively used.

The inclined surface 71 may be applied not only to the first embodiment but also in combination with any of the second to fourth embodiments and the modified examples thereof. In each of examples of these combinations, it is possible to simultaneously obtain the effects of the embodiments and the like included in the combination.

Sixth Embodiment

With reference to FIG. 30, description is given of a vehicle seat 1 for rear seat according to a sixth embodiment of the present invention. The embodiment is an example in which a friction coefficient distribution described below is imparted to a seat cushion 2 in the vehicle seat 1 of the first embodiment. In the drawing, HF ($HF_1$, $HF_2$, $HF_3$, and $HF_4$) means that the friction coefficient in a direction indicated by an arrow is high while LF ($LF_1$, $LF_2$, $LF_3$, and $LF_4$) means that the friction coefficient in a direction indicated by an arrow is low.

In the embodiment, a seating surface 2a of the seat cushion 2 is configured such that, in a portion (hereinafter referred to as front portion) R1 located in front of a maximum deformation part LP in seating, a friction coefficient $LF_1$ against sliding from the front to the rear is set to be lower than a friction coefficient $HF_1$ against sliding from the rear to the front ($LF_1 < HF_1$). Moreover, in a portion (hereinafter referred to as rear portion) R2 located behind the maximum deformation part LP, a friction coefficient $LF_2$ against sliding from the rear to the front is set to be lower than a friction coefficient $HF_2$ against sliding from the front to the rear ($LF_2 < HF_2$). The magnitude of the friction coefficient of a supporting surface (for example, the seating surface 2a) can be determined based on a resistance force obtained as follows. For example, a material generally used for clothing of an occupant D is cut into predetermined shape and size and the cut material is made to slide on the supporting surface while being pressed against the supporting surface at a predetermined pressure. It can be said that a surface with small resistance force at this time has a low friction coefficient and a surface with large resistance force at this time has a high friction coefficient.

As in the case of the first embodiment, the vehicle seat 1 according to this embodiment includes a front part 2f of the seat cushion 2 as a low stiffness region PSc and a rear part 2g thereof as the high stiffness region PHc. Thus, as in the case of the first embodiment, an HP guide function, a space expansion function, and an HP shift prevention function can be exerted for the series of actions taken by the occupant D for seating which is described in the first embodiment.

<HP Guide Function>

In vehicle seat 1 according to this embodiment, the seating surface 2a of the seat cushion 2 is configured such that the friction coefficient $LF_1$ against sliding from the front to the rear is set to be lower than the friction coefficient $HF_1$ against sliding from the rear to the front in the front portion R1 while the friction coefficient $LF_2$ against sliding from the rear to the front is set to be lower than a friction coefficient $HF_2$ against sliding from the front to the rear in the rear portion R2. Accordingly, resistance against movement of the hip of the occupant D toward an optimum position (rearward movement in a region in front of the maximum deformation part LP and frontward movement in a region behind the maximum deformation part LP) is further suppressed and the hip point HP of the occupant D can be easily guided to the optimum position. Thus, the HP guide function can be more surely exerted for series of actions taken by the occupant D for seating.

<Space Expansion Function>

In vehicle seat 1 according to this embodiment, the seating surface 2a of the seat cushion 2 is configured such that the friction coefficient $LF_1$ against sliding from the front to the rear is set to be lower than the friction coefficient $HF_1$ against sliding from the rear to the front in the front portion R1. Accordingly, the resistance against movement of the hip of the occupant D toward the optimum position (typically rearward movement) is further suppressed and the hip of the occupant D further tends to slide backward. Thus, the hip of the occupant D is readily guided to the optimum position along the seating surface 2a after the start of the action for seating and a knee room of the occupant D is secured at an early stage after the start of the action for seating. As a result, an effect of substantial expansion of the knee room is surely obtained.

<HP Shift Prevention Function>

In the vehicle seat 1 according to this embodiment, the seating surface 2a of the seat cushion 2 is configured such that the friction coefficient $LF_1$ against sliding from the front to the rear is set to be lower than the friction coefficient $HF_1$ against sliding from the rear to the front in the front portion R1 while the friction coefficient $LF_2$ against sliding from the rear to the front is set to be lower than the friction coefficient $HF_2$ against sliding from the front to the rear in the rear portion R2. Accordingly, resistance against frontward or rearward movement from the optimum position is further increased. Thus, the positional shift of the hip after the placement of the hip at the optimum position is more surely prevented.

In summary, in addition to the configuration of the first embodiment described above, in the vehicle seat 1 of the sixth embodiment, the seating surface 2a of the seat cushion 2 is configured such that the friction coefficient $LF_1$ against sliding from the front to the rear is set to be lower than the friction coefficient $HF_1$ against sliding from the rear to the front in the front portion R1 in front of the maximum deformation part LP in seating while the friction coefficient $LF_2$ against sliding from the rear to the front is set to be lower than the friction coefficient $HF_2$ against sliding from the front to the rear in the rear portion R2 behind the maximum deformation part LP in seating. Accordingly, the function of guiding the hip of the occupant D to the optimum position and the function of maintaining the seating posture by the seating surface 2a are more effectively exerted and the HP guide function, the space expansion function, and the HP shift prevention function can be more surely achieved during the series of actions taken by the occupant D for seating in the vehicle seat 1.

Modified examples of the vehicle seat 1 according to the sixth embodiment are described with reference to FIGS. 31 to 35.

FIG. 31 shows a first modified example of this embodiment. The modified example is an example in which a seat back 3 is configured to be bendable in the middle as in the case of the second embodiment, in the vehicle seat 1 according to the sixth embodiment. Moreover, in the modified example, in a backrest portion 3a of the seat back 3a, a friction coefficient $HF_3$ of a portion (portion R3 above a bend point BP (hereinafter referred to as, upper portion R3)) corresponding to the chest Da of the occupant D is set to be higher than a friction coefficient $LF_4$ of a portion (portion R4 below a bend point BP (hereinafter referred to as, lower portion R4)) below this portion (upper portion R3) ($LF_4$<$HF_3$).

In the modified example, the friction coefficient $HF_3$ of the portion (upper portion R3) of the backrest surface 3a corresponding to the chest Da is set to be higher. This allows the relatively heavy chest Da to be firmly supported with the seat back 3. Accordingly, the muscle burden of the occupant D can be reduced. This can prevent collapse of seating posture of the occupant D and reduce fatigue of the occupant D. Moreover, in the modified example, the friction coefficient $LF_4$ of the portion (upper portion R4) below the portion (upper portion R3) corresponding to the chest Da is set to be lower. This improves sliding characteristics of the backrest surface 3a and the ischium of the occupant D tends to slide down to the maximum deformation part LP of the seat cushion 2. Accordingly, the function of guiding the hip point HP to the optimum position can be further exerted. Although the friction coefficients $LF_4$ and $HF_3$ of the backrest surface 3a are different from each other in the upper portion and the lower portion with the bend point BP being the boundary in the example shown in FIG. 31, the position where the friction coefficient changes is not limited to the bend point BP. Effects similar to those described above can be exerted as long as the friction coefficient of the portion of the backrest surface 3a corresponding to the chest Da of the occupant D is set to be higher than the friction coefficient of the portion therebelow.

FIG. 32 shows a second modified example of the embodiment. The modified example is an example in which a raised fabric is used as a seat surface material 81 in the first modified example and the raised direction of the fabric is changed depending on the position on the seating surface 2a of the seat cushion 2 or the position on the backrest surface 3a of the seat back 3. The seat surface material 81 is attached with an adhesion layer 83 to a surface of a surface urethane layer 82 provided in an outermost surface layer of a cushion pad 41 of the seat cushion 2 or a cushion pad 15 of the seat back 3.

In the modified example, the raised direction is set to an upward direction in the upper portion R3 above the bend point BP of the backrest surface 3a and a friction coefficient $LF_3$ against sliding from the bottom to the top is thereby set to be lower than a friction coefficient $HF_3$ against sliding from the top to the bottom in the upper portion R3 ($LF_3$<$HF_3$).

Moreover, in the modified example, the raised direction is set to a downward direction in the lower portion R4 below the bend point BP of the backrest surface 3a and a friction coefficient $LF_4$ against sliding from the top to the bottom is thereby set to be lower than a friction coefficient $HF_4$ against sliding from the bottom to the top in the lower portion R4 ($LF_4$<$HF_4$).

Furthermore, in the modified example, the raised direction is set to a frontward direction in the front portion R1 in front of the maximum deformation part LP of the seating surface 2a of the seat cushion 2 while the raised direction is set to a rearward direction in the rear portion R2 behind the maximum deformation part LP. By setting the raised directions as described above, the friction coefficient $LF_1$ against sliding from the front to the rear is set to be lower than the friction coefficient $HF_1$ against sliding from the rear to the front in the front portion R1 ($LF_1$<$HF_1$) while the friction coefficient $LF_2$ against sliding from the rear to the front is set to be lower than the friction coefficient $HF_2$ against sliding from the front to the rear in the rear portion R2 ($LF_2$<$HF_2$). The seat surface material 81 is particularly not limited as long as it is a raised material. The seat surface material 81 may be, in addition to the fabric, materials such as synthetic leather, artificial leather, or a combination of these materials.

In the second modified example, the same seat surface material 81 can be used for the entire vehicle seat 1. Accordingly, the vehicle seat 1 can have a uniform appearance. Moreover, similar effects as those of the first modified example of the sixth embodiment can be achieved at a low cost.

FIG. 33 shows a third modified example of the embodiment. In the modified example, the seating surface 2a of the seat cushion 2 is configured such that a surface layer of the front portion R1 in front of the maximum deformation part LP in seating is set to be set to be softer than (deform at a greater degree to the same pressure) a surface layer of the rear portion R2 behind the maximum deformation part LP. In other words, the stiffness SSc of the surface layer of the front portion R1 is set to be lower than the stiffness HSc of the surface layer of the rear portion R2 (SSc<HSc).

The surface layer of the vehicle seat 1 is elastically deformed by a load pressure applied when the occupant D is seated. The larger the deformation amount at this time is, the larger the contact area between the body of the occupant D and the vehicle seat 1 is and the resistance against sliding thereby increases. Accordingly, even if the friction coefficient of the seat surface material is the same, reducing the stiffness of the surface layer can achieve effects similar to those obtained when the friction coefficient is increased for the resistance against sliding.

In the modified example, the surface layer of the front portion R1 in front of the maximum deformation part LP is set to be softer (deform at a greater degree to the same pressure). Accordingly, a forward positional shift of the hip in the seated state can be prevented. Moreover, in the modified example, the surface layer of the rear portion R2 behind the maximum deformation part LP is set to be stiffer (deform at a smaller degree to the same pressure). Accordingly, the ischium of the occupant D tends to slide down to the maximum deformation part LP of the seat cushion 2. Thus, in the modified example, the function of guiding the hip point HP to the optimum position can be further exerted. Here, the thickness of each of the surface layers is appropriately adjusted depending on the body size of the occupant D and the stiffness of the pad material (the cushion pad 41 of the seat cushion 2 in the modified example) supporting the surface layer, which are design conditions, and is thus not particularly limited. However, it is preferable that the thickness is within a range of 5 mm to 30 mm.

FIG. 34 shows a fourth modified example of the embodiment. The modified example is an example as follows. In the vehicle seat 1 according to the third modified example described above, the backrest surface 3a of seat back 3 is configured such that a surface layer of a portion (upper portion R3) corresponding to the chest Da of the occupant D is set to be softer than a surface layer of a portion (lower portion R4) below this portion (upper portion R3). In other words, in the modified example, the stiffness SSb of the surface layer of the portion (upper portion R3) corresponding to the chest Da is set to be lower than the stiffness HSb of the surface layer of the portion (lower portion R4) therebelow (SSb<HSb).

In the modified example, the portion (upper portion R3) of the backrest surface 3a corresponding to the chest Da is set to be softer. This allows the relatively heavy chest Da to be firmly supported with the seat back 3. Accordingly, the muscle burden of the occupant D can be reduced. This can prevent collapse of seating posture of the occupant D and reduce fatigue of the occupant D. Moreover, in the modified example, the surface layer of the portion (lower portion R4) below the portion (upper portion R3) corresponding to the chest Da is set to be to be stiffer. This improves sliding characteristics of the backrest surface 3a and the ischium of the occupant D tends to slide down to the maximum deformation part LP of the seat cushion 2. Accordingly, the function of guiding the hip point HP to the optimum position can be further exerted in the modified example. Although the stiffness SSb and the stiffness HSb of the surface layers of the backrest surface 3a of the backrest surface 3a are different from each other in the upper portion and the lower portion with the bend point BP being the boundary in the example shown in FIG. 34, the position where the stiffness changes is not limited to the bend point BP. Effects similar to those described above can be exerted as long as the stiffness of the surface layer of the portion in the backrest surface 3a corresponding to the chest Da of the occupant D is set to be lower than the stiffness of the surface layer of the portion therebelow.

Note that a stiffness distribution in the width direction of the seat back 3 may be imparted to the upper portion R3 of the backrest surface 3a of the seat back 3. For example, a surface layer of a width-direction center region of the seat back 3 may be set to be softer than surface layers of both width-direction end portions provided outside and adjacent to the center region in the width direction. By such a configuration, an excellent fit between the backrest surface 3a and the back of the occupant D can be obtained in seating and the back of the occupant D is less likely to slide on the backrest surface 3a. Accordingly, the chest Da of the occupant D can be more surely supported.

FIG. 35 shows a fifth modified example of the embodiment. The modified example is an example in which the stiffness of the surface urethane layer 82 (82F, 82R, 82U, and 82L) under the seat surface material 81 of the fourth modified example is changed depending on the position on the seating surface 2a of the seat cushion 2 or the position on the backrest surface 3a of the seat back 3. The surface urethane layer 82 is a layer provided in the outermost layer of the cushion pad 41 of the seat cushion 2 or the cushion pad 15 of the seat back 3 and the seat surface material 81 is attached to the surface of the surface urethane layer 82 with an adhesion layer. For example, a urethane slab with a thickness of about 10 mm which is made of molded polyurethane foam can be used as the surface urethane layer 82.

In the modified example, as shown in part (B) of FIG. 35, in the backrest surface 3a of the seat back 3a, the stiffness SSb of a surface urethane layer 82U in the upper portion R3 above the bend point BP is set to be lower than the stiffness HSb1 of a surface urethane layer 82L in the lower portion R4 below the bend point BP. The stiffness SSb and the stiffness HSb respectively of the surface urethane layers 82U and 82L and the stiffness Wb of elastic material such as urethane foam forming the cushion pad 15 of the seat back 3 are set such that the relationship of Wb>HSb>SSb is established among them.

Moreover, a stiffness distribution in the width direction of the backrest surface 3a is also imparted to the upper portion R3 of the seat back 3 and, as shown in part (C) of the FIG. 35, the stiffness SSb of a surface urethane layer 82Ua in a width-direction center region is set to be lower than the stiffness $HSb_2$ of surface urethane layers 82Ub in both width-direction end portions provided outside and adjacent to the center region in the width direction (SSb<$HSb_2$).

Furthermore, in the modified example, as shown in part (A) of FIG. 35, in the seating surface 2a of the seat cushion 2, the stiffness SSc of a surface urethane layer 82F in the front portion R1 in front of the maximum deformation part LP in seating is set to be lower than the stiffness HSc of a surface urethane layer 82R in the rear portion R2 behind the maximum deformation part LP. The stiffness SSc and the stiffness HSc respectively of the surface urethane layers 82F and 82R and the stiffness Wc of elastic material such as urethane foam forming the cushion pad 41 of the seat cushion 2 are set such that the relationship of Wc>HSc>SSc is established among them.

In the modified example, as described above, the stiffness of the surface urethane layer 82 under the seat surface material 81 is changed depending on the position on the seating surface 2a of the seat cushion 2 or the position on the backrest surface 3a of the seat back 3. Accordingly, a surface stiffness distribution similar to that in the fourth modified example described above can be achieved at a low cost by adjusting the material, the thickness, and the like of the surface urethane layer depending on the position on the seating surface 2a or the backrest surface 3a. Furthermore, as described above, in the modified example, the stiffness distribution in the width direction is imparted to the backrest surface 3a of the upper portion R3 of the seat back 3 and the stiffness SSb of the surface urethane layer 82Ua in the width-direction center region is set to be lower than the stiffness $HSb_2$ of the surface urethane layers 82Ub in both width-direction end portions. This causes the width-direction center region of the backrest surface 3a to sink and deform at a greater degree than the both width-direction end portions when backrest load is applied to the backrest surface 3a and the contact area between the backrest surface 3a and the back of the occupant D can be thereby increased. Accordingly, the chest Da of the occupant D can be more firmly supported.

Note that the friction coefficient distributions and the surface stiffness distributions shown in the embodiment and the modified examples thereof can be used in combination with any of the second to fifth embodiments and the modified examples thereof. Moreover, the friction coefficient distributions and the surface stiffness distributions can be used in combination with a combination of the inclined surface 71 of the fifth embodiment described above and any of the second to fourth embodiments and the modified examples thereof. In each of examples of these combinations, it is possible to simultaneously obtain all of the effects of the embodiments and the like included in the combination.

Moreover, the friction coefficient distributions described above and the surface stiffness distributions described above can be used in combination as a matter of course. In this case, the operations and effects of the distributions can be improved or suppressed by appropriately combining a large friction coefficient and a small friction coefficient and high (stiff) surface stiffness and low (soft) surface stiffness. Thus, sliding characteristics of the seating surface 2a and the backrest surface 3a and a distribution of the supporting force for the chest Da, the pelvis Dc, and the like can be adjusted at a greater accuracy in a simple configuration. Note that only the seat back 3 may be given the friction coefficient shown in the first modified example of the embodiment and the surface stiffness distribution shown in the fourth modified example.

Seventh Embodiment

With reference to FIG. 36, description is given of a vehicle seat 1 for rear seat according to a seventh embodiment of the present invention. The embodiment is an example in which a seat cushion 2 has the shape described below in the vehicle seat 1 of the first embodiment.

In the embodiment, as shown in FIG. 36, in a seating surface 2a of the seat cushion 2, a rear portion R2 behind a maximum deformation part LP in seating is formed such that a surface thereof is substantially horizontal in a normal state (when an occupant D is not seated thereon). Moreover, a front portion R1 of the seating surface 2a in front of the maximum deformation part LP is formed to be inclined in such a way that the height level thereof becomes lower toward the rear (rearward inclination).

As in the case of the first embodiment, the vehicle seat 1 according to this embodiment includes a front part 2f of the seat cushion 2 as a low stiffness region PSc and a rear part 2g thereof as a high stiffness region PHc. Thus, as in the case of the first embodiment, an HP guide function, a space expansion function, and an HP shift prevention function can be exerted for the series of actions taken by the occupant D for seating which is described in the first embodiment.

[HP Guide Function]

In the vehicle seat 1 according to the embodiment, in the seating surface 2a of the seat cushion 2, the rear portion R2 behind the maximum deformation part LP in seating is formed such that the surface thereof is substantially horizontal. Since the surface of the rear portion R2 inclines downward toward the front due to sinking of pad material 41A when the occupant D sits down, the ischium of the occupant D can more surely slide down to the maximum deformation part LP. The hip point HP of the occupant D can be thereby stably guided to an optimum position.

Moreover, in the vehicle seat 1 according to the embodiment, the front portion R1 in front of the maximum deformation part LP in the seating surface 2a is formed to have the rearward inclination. In other words, rearward inclined surface is formed in the high stiffness region PHc. Accordingly, the hip of the occupant D further tends to slide rearward. This makes it possible to guide the ischium of the occupant D to the maximum deformation part LP in seating and more surely guide the hip point HP of the occupant D to the optimum position.

<Space Expansion Function>

In the vehicle seat 1 according to the embodiment, the front portion R1 in front of the maximum deformation part LP in the seating surface 2a is formed to have the rearward inclination. Thus, the hip of the occupant D can be readily guided rearward along the rearward inclined surface and the occupant D is readily guided to the knee-bent posture. Accordingly, a knee room in front of the knees of the occupant D is secured at an early stage after the start of the action for seating. As a result, an effect of substantial expansion of the knee room is surely obtained.

<HP Shift Prevention Function>

Moreover, in the vehicle seat 1 according to the embodiment, in the seating surface 2a of the seat cushion 2, the rear portion R2 behind the maximum deformation part LP in seating is formed such that the surface thereof is substantially horizontal. The surface of the rear portion R2 inclines downward toward the front due to the sinking of the pad material 41A when the occupant D is seated. This can prevent the case where the position of the hip point HP in the seated state is shifted rearward and the seating posture thereby collapses.

Moreover, in the vehicle seat 1 according to the embodiment, the front portion R1 in front of the maximum deformation part LP in the seating surface 2a is formed to have the rearward inclination. This can prevent the case where the hip point HP shifts forward from the optimum position in the seated state and the seating posture thereby collapses.

In summary, in addition to the configuration of the first embodiment described above, in the vehicle seat 1 of the seventh embodiment, the rear portion R2 behind the maximum deformation part LP in seating is formed such that the surface thereof is substantially horizontal and the front portion R1 in front of the maximum deformation part LP in the seating surface 2a is formed to have the rearward inclination. Accordingly, the function of guiding the hip of the occupant D to the optimum position, the function of expanding the space by readily guiding the hip rearward, and the function of preventing positional shift of the hip after the placement of the hip at the optimum position by the seating surface 2a are more effectively exerted. Thus, the HP guide function, the space expansion function, and the HP shift prevention function can be more surely achieved during the series of actions taken by the occupant D for seating in the vehicle seat 1.

In the rear portion R2 behind the maximum deformation part LP, the length L (length from a turning axis of a reclining mechanism 5 to the maximum deformation part LP in a front-rear direction) of a region in which the surface is formed to be substantially horizontal is preferably within a range of 100 mm to 130 mm. When the length L is within this range, the position of the ischial tuberosity in the case where the hip point HP is at the optimum position coincides with the position of the maximum deformation part LP and the function of preventing the shift of the hip point HP can be exerted more effectively.

A modified example of the vehicle seat 1 according to the seventh embodiment is described with reference to FIG. 37.

In the modified example, the seat back 3 is divided into a seat back upper portion 3U on the upper side and a seat back lower portion 3L on the lower side. The seat back lower portion 3L is supported by a lower frame 91 and a lower end portion of the lower frame 91 is turnably connected to a rear end portion of the seat cushion 2 via a reclining mechanism 5. Moreover, the seat back upper portion 3U is supported by an upper frame 92 and a lower end portion of the upper frame 92 is turnably connected to an upper end of the lower frame 91 via a link mechanism 93.

As shown in part (A) of FIG. 37, $\beta$ is set to be ½ to ⅔ of $\alpha$ ($\beta/\alpha$=½ to ⅔), where $\alpha$ is an angle formed between the vertical line and a backrest surface 3La of the seat back lower portion 3L and $\beta$ is an angle formed between an extended line of the backrest surface 3La of the seat back lower portion 3L and a backrest surface 3Ua of the seat back upper portion 3U. In other words, the inclination angle of the backrest surface 3Ua of the seat back upper portion 3U (angle of the backrest surface 3Ua to a horizontal plane: 90°−$\alpha$+$\beta$) is larger than the inclination angle of the backrest surface 3La of the seat back lower portion 3L (angle of the backrest surface 3La to the horizontal plane: 90°−$\alpha$).

Moreover, the link mechanism 93 connecting the upper frame 92 and the lower frame 91 to each other is configured to maintain the ratio between $\alpha$ and $\beta$ ($\beta/\alpha$) to a substantially constant value even when $\alpha$ changes along with the inclining of the seat back 3. Specifically, as shown in part (B) of FIG. 37, when the seat back 3 is inclined rearward, $\alpha$ and $\beta$ are respectively increased to $\alpha_1$ and $\beta_1$. However, the ratio $\beta_1/\alpha_1$ is maintained to a value from ½ to ⅔. Moreover, when the seat back 3 is inclined forward, $\alpha$ and $\beta$ are respectively decreased to $\alpha_2$ and $\beta_2$. However, also in this case, the ratio $\beta_2/\alpha_2$ is maintained to a value from ½ to ⅔.

In the modified example, the seat back lower portion 3L supported by the lower frame 91 and the seat back upper portion 3U supported by the upper frame 92 are inclined at different angle change ratio, with the link mechanism 93. Accordingly, the backrest surface 3a of the seat back 3 bends in the middle and a bend point BP is formed between the seat back upper portion 3U and the seat back lower portion 3L. The height H of this bend point BP (distance from the turning axis of the reclining mechanism 5 to the bend point BP in a direction substantially parallel to the backrest surface 3a of the seat back 3) can be adjusted to a desired height by adjusting the length of the lower frame. The bend point BP is preferably disposed to correspond to the joints of the chest Da and the waist Db, i.e., the tenth thoracic vertebra $Da_1$ to the twelfth thoracic vertebra $Da_2$, and the height H of the bend point BP is preferably in a range of 250 mm to 350 mm.

In the modified example, the inclination angle of the backrest surface 3Ua of the seat back upper portion 3U (90°−$\alpha$+$\beta$) is larger than the inclination angle of the backrest surface 3La of the seat back lower portion 3L (90°−$\alpha$). Accordingly, the posture of the occupant D becomes close to a comfortable posture and the muscle burden of the occupant D is reduced. Hence, the occupant D can support the relatively heavy chest Da and the pelvis Dc for a longer period without losing his/her seating posture and the positional shift in the hip point HP is thereby prevented.

Moreover, in the modified example, the bend point BP is set in the vicinity of the joints of the chest Da and the waist Db of the occupant D. Accordingly, the backrest surface 3a can follow the shape of the back of the occupant D in the comfortable posture and firmly hold the chest of the occupant D. In the modified example described above, both of the seat cushion 2 and the seat back 3 have the predetermined shapes. However, only the seat back 3 may have the predetermined shape, as a matter of course.

Although the seat back 3 is divided into the seat back upper portion 3U on the upper side and the seat back lower portion 3L on the lower side in the example described above, the seat back 3 is not necessary divided into two parts and may be divided into three parts or more. Moreover, elements of the divided seat back 3 may be connected to each other by a pad material with relatively low stiffness disposed between these elements to increase the number of the bend points in the deformation at the middle. This allows the inclination angle of the backrest surface 3a to change continuously or stepwise. The backrest surface 3a can thereby curve gently along the backbone of the occupant D in the comfortable posture. Accordingly, the backrest surface 3a can hold the back of the occupant D more firmly. Moreover, as a result, the collapse of the seating posture can be more surely prevented and the positional shift in the hip point HP is more surely prevented.

The shapes shown in the embodiment and the modified example thereof can be used in combination with any of the second to sixth embodiments and the modified examples thereof. Moreover, the shapes can be used in combination with a combination of the inclined surface 71 of the fifth embodiment described above and any of the second to fourth embodiments and the modified examples thereof. Moreover, the shapes may be used in combination with a combination of the friction coefficient distributions or the surface stiffness distributions, which are shown in the above-mentioned sixth embodiment and the modified examples thereof, and any of the second to fifth embodiments and the modified examples thereof. In each of examples of these combinations, it is possible to simultaneously obtain all of the effects of the embodiments and the like included in the combination.

Eighth Embodiment

With reference to FIG. 38, description is given of a vehicle seat 1 for rear seat according to an eighth embodiment of the present invention.

This embodiment is a combination of the fifth embodiment shown in FIG. 26, the first modified example of the sixth embodiment shown in FIG. 37, and the modified example of the seventh embodiment.

Specifically, as shown in FIG. 38, the vehicle seat 1 according to this embodiment includes a seat cushion 2 having a front part 2f set as a low stiffness region PSc and a rear part 2g set as a high stiffness region PHc. In addition, an inclined surface 71 for supporting the hip of an occupant D is provided to a corner region δ where the seating surface 2a of the seat cushion 2 and a backrest surface 3a of a seat back 3 are joined to each other.

In the seating surface 2a of the seat cushion 2, a front portion R1 in front of the maximum deformation part LP in seating is set such that a friction coefficient $LF_1$ against sliding from the front to the rear is lower than a friction coefficient $HF_1$ against sliding from the rear to the front ($LF_1<HF_1$). In addition, a rear portion R2 behind the maximum deformation part LP is set such that a friction coefficient $LF_2$ against sliding from the rear to the front is lower than a friction coefficient $HF_2$ against sliding from the front to the rear ($LF_2<HF_2$). Moreover, the backrest surface 3a of the seat back 3 is set such that a friction coefficient $HF_3$ of an upper portion R3 above the bend point BP is higher than a friction coefficient $LF_4$ of a lower portion R4 below the bent point BP ($LF_4<HF_3$). The friction coefficient of the inclined surface 71 is set to a value approximately equal to the friction coefficient $LF_4$ of the lower portion R4.

Furthermore, in the seating surface 2a of the seat cushion 2, a rear portion behind the maximum deformation part LP in seating is formed to have a surface which is substantially horizontal under normal conditions (when the occupant D is not seated). Moreover, the seat back 3 has a middle bent mechanism like that in the seventh embodiment, and is configured such that the inclination angle of the backrest surface 3Ua of the seat back upper portion 3U is larger than the inclination angle of the backrest surface 3La of the seat back lower portion 3L.

The eighth embodiment has the structure including the fifth embodiment, the first modified example of the sixth embodiment, and the modified example of the seventh embodiment, and therefore produces effects similar to those in these embodiments, as a matter of course. Description of the effects, however, is omitted herein to avoid repetition.

<Improvement of Effects of Friction Coefficient Distribution>

Moreover, by exerting the effects of the middle bent mechanism of the seat back 3 as in the case in the modified example of the seventh embodiment, and the automatic adjustment function for a middle bend angle in the first modified example of the sixth embodiment at the same time, the vehicle seat 1 according to this embodiment can flexibly and appropriately respond to a body size difference between occupants D and make the posture of any occupant D closer to a much more comfortable posture. Specifically, according to this embodiment, the shapes of the seating surface 2a and the backrest surface 3a can be deformed along the shapes of the back, hip and thighs of the occupant D with higher accuracy, and thereby the contact area where the body of the occupant D is in contact with the seating surface 2a and the backrest surface 3a can be increased. Thus, the effects produced by the friction coefficient distribution imparted to the sheet cover material can be further enhanced.

<Improvement in Effects of Inclined Surface>

Still further, the vehicle seat 1 according to this embodiment includes the inclined surface 71 at the corner region δ where the seating surface 2a of the seat cushion 2 and the backrest surface 3a of the foregoing seat back 3 are joined to each other, and thus can guide the hip of the occupant D to the optimum position by means of the inclined surface 71 in the process where the occupant D is getting seated in the seat cushion 2. This can prevent the position of the hip from varying every time the occupant D is seated. In addition, the friction coefficient of the inclined surface 71 is set to the value approximately equal to the friction coefficient $LF_4$ of the lower portion R4 of the backrest surface 3a of the seat back 3. Thus, the vehicle seat 1 can more effectively exert the guide function of the hip of the occupant D to the optimum position.

Incidentally, the friction coefficient of the inclined surface 71 may be set larger than the friction coefficient $LF_4$ of the lower portion R4. In this case, the force supporting the back side surface of the pelvis Dc of the occupant D is so increased that the pelvis Dc is more surely prevented from rotating backward even in driving for a long time. This prevents collapse of the seating posture due to the frontward shift of the hip, which consequently leads to avoidance of reduction in the knee room in front of the knees.

Hereinabove, the description is provided for the embodiments and their modified examples of the present invention. These embodiments are only for illustrative purposes to facilitate the understanding of the present invention, and the present invention is not limited to the above embodiments and the like. The technical scope of the present invention is not limited to the specific technical matters disclosed in the embodiments and the like, but includes various modifications, alterations, alternative techniques and the like that can be derived easily from these embodiments and the like. For instance, the vehicle seat applied to the rear seat is illustrated in the foregoing embodiments, the vehicle seat is obviously applicable to a front seat such as a driver's seat or assistant driver's seat.

In this connection, in the vehicle front seat, an occupant is seated with his/her legs extending relatively frontward. Accordingly, in the vehicle front seat, the gravity center of the occupant is located closer to the front than that in the rear seat, and some occupant performs pedal operations as a driver. Hence, the front seat needs to have the low stiffness region PSc within a range shorter in the front-rear direction than the rear seat does. In the case where the rear seat is set to have the low stiffness region PSc within a range of about ⅓ of the thigh length, the front seat is preferably set to have the low stiffness region PSc within a range of about ⅙ of the thigh length.

This application claims priority based on Japanese Patent Application No. 2010-223340 filed on Oct. 1, 2010, Japanese Patent Application No. 2010-223341 filed on Oct. 1, 2010, Japanese Patent Application No. 2010-223342 filed on Oct. 1, 2010, and Japanese Patent Application No. 2011-069127 filed on Mar. 28, 2011, the contents of which are incorporated herein by reference in its entirety.

INDUSTRIAL APPLICABILITY

In the vehicle seat of the present invention, the seat cushion is provided with the low stiffness region at its front part and the high stiffness region at its rear part. This structure can give seating comfort to an occupant by reducing feelings of pressure on the posterior lower legs and posterior knees of the occupant. In addition, in a series of actions taken by an occupant for seating in the vehicle seat, the vehicle seat can achieve the HP guide function, the space expansion function and the HP shift prevention function simultaneously.

REFERENCE SIGNS LIST 1 vehicle seat
2 seat cushion
2f front part
2g rear part
3 seat back
11 seat back frame
15 cushion pad
15a groove
16 pad supporting member
41 cushion pad
41A, 41B, 42, 43, 44, 45, 46 pad material 47 seat cushion frame member
48 load receiving member
49 spring mechanism
50, 50A, 50B hollow portion
51, 51A, 51B hollow portion
71 inclined surface
72 elastic band-shaped member
82, 82F, 82R, 82U, 82L surface urethane layer
91 lower frame
92 upper frame
93 link mechanism
δ corner region
BP middle bend point
D, D1, D2 occupant
Da chest
Db waist
Dc pelvis
LP maximum deformation part
HP hip point
Da1 tenth thoracic vertebra
Da2 twelfth thoracic vertebra
Dc1 ischial tuberosity
Dc2 sacrum
PHc, PHb$_1$, PHb$_2$ high stiffness region
PSc, PSb low stiffness region
PSc1 lower posterior thigh contact portion
PSc2 posterior knee contact portion
PSc3 posterior lower leg contact portion
fa$_1$, fa$_2$ support reaction force
fb, fb1, fb2 upward support reaction force
fc, fc1, fc2 forward support reaction force

The invention claimed is:

1. A vehicle seat comprising a seat cushion and a seat back, wherein:
the seat cushion has a stiffness distribution in a front-rear direction such that a front part of the seat cushion has a low stiffness region which is more flexible than a rear part of the seat cushion that has a high stiffness region,
the seat back has a stiffness distribution having different reaction force characteristics in a vertical direction of the seat back such that a low stiffness region having a small support reaction force for an occupant is set in a vertical center portion of the seat back while high stiffness regions each having a large support reaction force for the occupant are set, adjacent to the low stiffness region, in upper and lower portions of the seat back,
a backrest surface of the seat back is bendable in a middle portion at the low stiffness region at a plurality of middle bend angles,
the low stiffness region of the seat cushion has reaction force characteristics such that a deformation amount when a pressing surface having a predetermined shape and size is pressed against the low stiffness region from above with a predetermined pressure is smaller than a deformation amount when the same pressing surface is pressed against the low stiffness region of the seat cushion from in front of the low stiffness region with the same predetermined pressure,
an inclined outer surface comprising part of an outer surface of the vehicle seat is provided at a center portion of the vehicle seat in a vehicle width direction and at a corner region where a seating surface of the seat cushion and the backrest surface of the seat back are joined to each other,
the inclined outer surface is planar and elongated in the vehicle width direction, and has lower and upper edges substantially parallel to each other,
when the occupant is seated and when the occupant is not seated, the lower edge of the inclined outer surface is positioned on the seating surface at a first intersection which is located forward of a second intersection, at which an extended line of the seating surface and an extended line of the backrest surface meet in a side view of the corner region, and the upper edge of the inclined outer surface is positioned on the backrest surface at a third intersection which is located above the second intersection,
the lower edge of the inclined outer surface is located rearward of a maximum deformation part which is positioned at a center in the front-rear direction of the high stiffness region of the seat cushion, and the upper edge of the inclined outer surface is located below a boundary between the low stiffness region of the seat back and at least one of the high stiffness regions of the seat back in which the at least one of the high stiffness regions is below the low stiffness region of the seat back, and
an inclination angle of the inclined outer surface to a horizontal plane is smaller than an inclination angle of a lower portion of the backrest surface to the horizontal plane.

2. The vehicle seat according to claim 1, wherein
the low stiffness region of the seat cushion is set in a lower posterior thigh contact portion to contact with the lower posterior thighs of the occupant, a posterior knee contact portion to contact with the posterior knees of the occupant, and a posterior lower leg contact portion to contact with the posterior lower legs of the occupant, and
the reaction force characteristics of the low stiffness region of the seat cushion are set such that support reaction forces of the respective lower posterior thigh contact portion, posterior knee contact portion and posterior lower leg contact portion satisfy a relation of the support reaction forces of the posterior knee contact portion being greater than the support reaction forces of the posterior lower leg contact portion and less than the support reaction forces of the lower posterior thigh contact portion.

3. The vehicle seat according to claim 2, wherein
the seat cushion is formed of at least two parts which are the rear part and the front part including a front end portion thereof, and
the front part is formed of a pad material having the reaction force characteristics.

4. The vehicle seat according to claim 1, wherein
the low stiffness region set in the vertical center portion of the seat back is formed such that a center of the low stiffness region is in a range of 250 mm to 350 mm from a turning axis of a reclining mechanism.

5. The vehicle seat according to claim 1, wherein
the seat back includes a cushion pad to elastically support the occupant, and
in the cushion pad, a groove to facilitate middle bending of the cushion pad is formed to extend in the vehicle width direction at a vertical center portion of the low stiffness region of the seat back.

6. The vehicle seat according to claim 5, wherein
the seat back includes a pad supporting member to support the cushion pad on a seat back frame at a back side of the cushion pad, and the high stiffness regions and the low stiffness region of the seat back are set by providing the pad supporting member with different mechanical properties of stiffness and softness.

7. The vehicle seat according to claim 2, wherein the front part of the seat cushion is made of a pad material in which portions corresponding to the lower posterior thigh contact portion, the posterior knee contact portion and the posterior lower leg contact portion have different spring constants.

8. The vehicle seat according to claim 7, wherein the pad material used in the portion corresponding to the lower posterior thigh contact portion includes a plurality of pad materials divided in a front-rear direction, and
the spring constant of the pad material arranged on a rear side is set smaller than the spring constant of the pad material arranged on a front side.

9. The vehicle seat according to claim 2,
wherein the reaction force characteristics are imparted in such a way that:
the front part of the seat cushion is made of a pad material having a smaller spring constant than a pad material used in the rear part of the seat cushion; and
wherein a parting line along which the pad materials of the front and rear parts of the seat cushion face and contact each other is extended from around a boundary between the lower posterior thigh contact portion and the posterior knee contact portion and is inclined downwardly and in a rearward direction.

10. The vehicle seat according to claim 2, wherein the reaction force characteristics are imparted in such a way that:
the front part of the seat cushion is made of a pad material having a smaller spring constant than a pad material used in the rear part of the seat cushion;
a load receiving member is provided to a front portion of a seat cushion frame member, the load receiving member protruding upward in the low stiffness region; and
a thickness of the pad material in the front part of the seat cushion is adjusted by using an upper side and a front side of the load receiving member.

11. The vehicle seat according to claim 2, wherein the reaction force characteristics are imparted in such a way that:
the front part of the seat cushion is made of a pad material having a smaller spring constant than a pad material used in the rear part of the seat cushion;
a load receiving member is provided to a front portion of a seat cushion frame member, the load receiving member protruding upward in the low stiffness region;
a thickness of the pad material in the front part of the seat cushion is adjusted by using an upper side and a front side of the load receiving member; and
a spring mechanism is provided to the front side of the load receiving member, the spring mechanism being capable of retreating rearward in response to a seating load acting from the front.

12. The vehicle seat according to claim 2, wherein the seat cushion is made of a single pad material, and
a hollow portion is provided in the front part of the pad material to form the low stiffness region in the seat cushion and to impart the reaction force characteristics to the low stiffness region.

13. The vehicle seat according to claim 1, wherein
a distance from the first intersection to the second intersection is set to a value smaller than ⅙ of a length from the second intersection to a front end of the seat cushion, and
a distance from the third intersection to the second intersection is set to a value smaller than ⅕ of a length from the second intersection to an upper end of the seat back.

14. The vehicle seat according to claim 1, wherein the inclined outer surface is formed of a protruding portion formed integral with one of the seat cushion and the seat back.

15. The vehicle seat according to claim 1, wherein the inclined outer surface is formed of an elastic band-shaped member laid between the seating surface of the seat cushion and the backrest surface of the seat back across the corner region.

16. The vehicle seat according to claim 1, wherein:
the seating surface of the seat cushion is set such that adjacent portions in the seating surface are different from each other in at least one of stiffness, friction coefficient and shape.

17. The vehicle seat according to claim 16, wherein the seating surface of the seat cushion is configured such that
a portion in front of the maximum deformation part has a lower friction coefficient against sliding from the front to the rear than a friction coefficient against sliding from the rear to the front, and
a portion behind the maximum deformation part has a lower friction coefficient against sliding from the rear to the front than a friction coefficient against sliding from the front to the rear.

18. The vehicle seat according to claim 16, wherein the seating surface of the seat cushion is configured such that a surface layer in a portion in front of the maximum deformation part is softer than a surface layer of a portion behind the maximum deformation part.

19. The vehicle seat according to claim 16, wherein the seating surface of the seat cushion is formed such that a surface of a portion behind the maximum deformation part is substantially horizontal.

20. The vehicle seat according to claim 16, wherein the seating surface of the seat cushion is formed such that a surface of a portion in front of the maximum deformation part inclines downwardly toward the rear.

21. The vehicle seat according to claim 1, wherein the backrest surface of the seat back is set such that adjacent portions in the backrest surface are different from each other in at least one of stiffness, friction coefficient and shape.

22. The vehicle seat according to claim 21, wherein the backrest surface of the seat back is set such that a friction coefficient of a portion above a bend point of bending in the middle portion is higher than a friction coefficient of a portion below the bend point.

23. The vehicle seat according to claim 21, wherein the backrest surface of the seat back is configured such that a surface layer of the portion above the bend point is softer than a surface layer of a portion below the portion that is above the bend point.

24. The vehicle seat according to claim 21, wherein in the backrest surface of the seat back, an inclination angle of an upper portion is larger than an inclination angle of a lower portion.

25. A stiffness setting method for a vehicle seat including a seat cushion and a seat back, the method comprising:

giving the seat cushion a stiffness distribution in a front-rear direction such that a front part of the seat cushion has a low stiffness region which is more flexible than a rear part of the seat cushion that has a high stiffness region;

giving the seat back a stiffness distribution having different reaction force characteristics in a vertical direction of the seat back such that a low stiffness region having a small support reaction force for an occupant is set in a vertical center portion of the seat back while high stiffness regions each having a large support reaction force for the occupant are set, adjacent to the low stiffness region, in upper and lower portions of the seat back;

making a backrest surface of the seat back bendable in a middle portion at the low stiffness region at a plurality of middle bend angles when the backrest surface receives the back of the occupant arriving after moving backward on the high stiffness region of the seat cushion, giving the low stiffness region of the seat cushion reaction force characteristics such that a deformation amount when a pressing surface having a predetermined shape and size is pressed against the low stiffness region from above with a predetermined pressure is smaller than a deformation amount when the same pressing surface is pressed against the low stiffness region of the seat cushion from in front of the low stiffness region with the same predetermined pressure, and providing an inclined outer surface as part of an outer surface of the vehicle seat at a center portion of the vehicle seat in a vehicle width direction and at a corner region where a seating surface of the seat cushion and the backrest surface of the seat back are joined to each other, wherein the inclined outer surface is planar and elongated in the vehicle width direction, and has lower and upper edges substantially parallel to each other, wherein, when the occupant is seated and when the occupant is not seated, the lower edge of the inclined outer surface is positioned on the seating surface at a first intersection which is located forward of a second intersection, at which an extended line of the seating surface and an extended line of the backrest surface meet in a side view of the corner region, and the upper edge of the inclined outer surface is positioned on the backrest surface at a third intersection which is located above the second intersection, wherein the lower edge of the inclined outer surface is located rearward of a maximum deformation part which is positioned at a center in the front-rear direction of the high stiffness region of the seat cushion, and the upper edge of the inclined outer surface is located below a boundary between the low stiffness region of the seat back and at least one of the high stiffness regions of the seat back in which the at least one of the high stiffness regions is below the low stiffness region of the seat back, and wherein an inclination angle of the inclined outer surface to a horizontal plane is smaller than an inclination angle of a lower portion of the backrest surface to the horizontal plane.

26. The vehicle seat according to claim 1, wherein:

the low stiffness region of the front part has a length in the front-rear direction and a width in the vehicle width direction that is larger than the length in the front-rear direction, the low stiffness region of the front part extends in the front-rear direction from a front edge of the front part to a rear edge of the front part, and the high stiffness region of the rear part is arranged adjacent to the low stiffness region of the front part in the front-rear direction and extends in the front-rear direction from the rear edge of the front part to a rear end of the seat cushion.

27. The vehicle seat according to claim 4, wherein the high stiffness region set in the upper portion of the seat back is formed to substantially correspond to a range from an upper end of the seat back to an upper edge of the low stiffness region, and the high stiffness region set in the lower portion of the seat back is formed to substantially correspond to a range from a lower end of the seat back to a lower edge of the low stiffness region.

28. The vehicle seat according to claim 1, wherein the inclined outer surface and the backrest surface meet in a crease.

29. The stiffness setting method according to claim 25, wherein the inclined outer surface and the backrest surface meet in a crease.

* * * * *